United States Patent
Yamada et al.

(10) Patent No.: US 11,586,121 B2
(45) Date of Patent: Feb. 21, 2023

(54) ELECTROPHOTOGRAPHIC ELECTRO-CONDUCTIVE MEMBER, PROCESS CARTRIDGE, AND ELECTROPHOTOGRAPHIC IMAGE FORMING DEVICE

(71) Applicant: CANON KABUSHIKI KAISHA, Tokyo (JP)

(72) Inventors: Masaki Yamada, Shizuoka (JP); Yuichi Kikuchi, Shizuoka (JP); Kenji Takashima, Kanagawa (JP); Tetsuo Hino, Kanagawa (JP); Kazuhiro Yamauchi, Shizuoka (JP); Takumi Furukawa, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/658,685

(22) Filed: Apr. 11, 2022

(65) Prior Publication Data

US 2022/0244658 A1 Aug. 4, 2022

Related U.S. Application Data

(63) Continuation of application No. PCT/JP2020/038692, filed on Oct. 14, 2020.

(30) Foreign Application Priority Data

Oct. 18, 2019 (JP) .............................. JP2019-191549

(51) Int. Cl.
*G03G 15/02* (2006.01)
*G03G 15/08* (2006.01)
*G03G 15/16* (2006.01)

(52) U.S. Cl.
CPC ..... *G03G 15/0233* (2013.01); *G03G 15/0806* (2013.01); *G03G 15/0808* (2013.01);
(Continued)

(58) Field of Classification Search
CPC .......... G03G 15/0233; G03G 15/0808; G03G 15/0812; G03G 15/0818; G03G 15/162; G03G 15/1685
See application file for complete search history.

(56) References Cited

U.S. PATENT DOCUMENTS 3,640,708 A 2/1972 Humphriss
5,581,329 A 12/1996 Kosmider
(Continued)

FOREIGN PATENT DOCUMENTS

JP 57-5047 U 1/1982
JP 9-279015 A 10/1997
(Continued)

OTHER PUBLICATIONS

U.S. Appl. No. 17/658,696, Kenji Takashima, filed Apr. 11, 2022.
(Continued)

*Primary Examiner* — Joseph S Wong
(74) *Attorney, Agent, or Firm* — Venable LLP

(57) ABSTRACT

Provided is an electrophotographic electro-conductive member including a support having an electro-conductive outer surface, and an electro-conductive layer. The electro-conductive layer has a matrix containing a crosslinked product of a first rubber and domains containing a crosslinked product of a second rubber and an electron conductive agent. When measuring an impedance by applying alternating voltage between the outer surface of the support and a platinum electrode on an outer surface of the electro-conductive layer while changing a frequency, a slope at specific frequencies is −0.8 to −0.3 in a double logarithmic plot, and
(Continued)

an impedance at specific frequency range is $1.0 \times 10^4 \Omega$ to $1.0 \times 10^{11} \Omega$. When measuring an impedance by applying alternating voltage between the outer surface of the support and a platinum electrode on an outer surface of the electrophotographic electro-conductive member while changing a frequency, an impedance at specific frequency range is $1.0 \times 10^5 \Omega$ to $1.0 \times 10^{11} \Omega$.

16 Claims, 8 Drawing Sheets

(52) U.S. Cl.
CPC ..... *G03G 15/0812* (2013.01); *G03G 15/0818* (2013.01); *G03G 15/162* (2013.01); *G03G 15/1685* (2013.01)

(56) References Cited

U.S. PATENT DOCUMENTS

| | | | |
|---|---|---|---|
| 6,070,040 A | 5/2000 | Goto | |
| 7,693,457 B2 | 4/2010 | Kuruma et al. | |
| 7,797,833 B2 | 9/2010 | Nakamura et al. | |
| 7,799,398 B2 | 9/2010 | Nakamura et al. | |
| 7,962,068 B2 | 6/2011 | Kuroda et al. | |
| 8,298,670 B2 | 10/2012 | Muranaka et al. | |
| 8,445,113 B2 | 5/2013 | Furukawa et al. | |
| 8,449,975 B2 | 5/2013 | Hirakoso et al. | |
| 8,600,273 B2 | 12/2013 | Yamada et al. | |
| 8,622,881 B1 | 1/2014 | Harada et al. | |
| 8,628,854 B2 | 1/2014 | Yamauchi et al. | |
| 8,655,222 B2 | 2/2014 | Nakamura et al. | |
| 8,668,987 B2 | 3/2014 | Yamauchi et al. | |
| 8,685,601 B2 | 4/2014 | Nose et al. | |
| 8,706,011 B2 | 4/2014 | Anan et al. | |
| 8,715,830 B2 | 5/2014 | Yamada et al. | |
| 8,768,226 B2 | 7/2014 | Koyanagi et al. | |
| 8,768,227 B2 | 7/2014 | Urushihara et al. | |
| 8,771,818 B2 | 7/2014 | Nishioka et al. | |
| 8,774,677 B2 | 7/2014 | Sakurai et al. | |
| 8,798,508 B2 | 8/2014 | Yamada et al. | |
| 8,837,985 B2 | 9/2014 | Ishida et al. | |
| 8,846,287 B2 | 9/2014 | Yamada et al. | |
| 8,852,743 B2 | 10/2014 | Kikuchi et al. | |
| 8,874,007 B2 | 10/2014 | Kawamura et al. | |
| 8,874,012 B2 | 10/2014 | Yamada et al. | |
| 8,913,930 B2 | 12/2014 | Ishii et al. | |
| 8,991,053 B2 | 3/2015 | Watanabe et al. | |
| 9,023,465 B2 | 5/2015 | Yamada et al. | |
| 9,086,643 B2 | 7/2015 | Kikuchi et al. | |
| 9,128,403 B2 | 9/2015 | Yamauchi et al. | |
| 9,146,482 B2 | 9/2015 | Watanabe et al. | |
| 9,360,789 B1 | 6/2016 | Masu et al. | |
| 9,360,833 B2 | 6/2016 | Terada et al. | |
| 9,442,408 B2 | 9/2016 | Yamauchi et al. | |
| 9,442,451 B2 | 9/2016 | Yamauchi et al. | |
| 9,541,854 B2 | 1/2017 | Kikuchi et al. | |
| 9,547,250 B2 | 1/2017 | Kikuchi et al. | |
| 9,551,949 B2 | 1/2017 | Yamauchi et al. | |
| 9,581,931 B2 | 2/2017 | Yamada et al. | |
| 9,599,913 B2 | 3/2017 | Nishioka et al. | |
| 9,639,009 B2 | 5/2017 | Yamaguchi et al. | |
| 9,651,888 B2 | 5/2017 | Muranaka et al. | |
| 9,665,028 B2 | 5/2017 | Arimura et al. | |
| 9,665,029 B2 | 5/2017 | Hino et al. | |
| 9,740,133 B2 | 8/2017 | Yamauchi et al. | |
| 9,811,009 B2 | 11/2017 | Yamada et al. | |
| 9,811,021 B2 | 11/2017 | Muranaka et al. | |
| 9,897,931 B2 | 2/2018 | Nishioka et al. | |
| 9,904,199 B2 | 2/2018 | Terada et al. | |
| 9,910,379 B2 | 3/2018 | Furukawa et al. | |
| 9,958,802 B2 | 5/2018 | Kikuchi et al. | |
| 9,964,914 B2 | 5/2018 | Arimura et al. | |
| 9,977,353 B2 | 5/2018 | Nishioka et al. | |
| 9,977,359 B2 | 5/2018 | Koyanagi et al. | |
| 10,018,927 B2 | 7/2018 | Yamada et al. | |
| 10,018,934 B2 | 7/2018 | Yamada et al. | |
| 10,108,129 B2 | 10/2018 | Yamaguchi et al. | |
| 10,146,149 B2 | 12/2018 | Watanabe et al. | |
| 10,197,930 B2 | 2/2019 | Yamada et al. | |
| 10,280,148 B2 | 5/2019 | Nishioka et al. | |
| 10,303,079 B2 | 5/2019 | Utsuno et al. | |
| 10,317,811 B2 | 6/2019 | Tomomizu et al. | |
| 10,331,054 B2 | 6/2019 | Urushihara et al. | |
| 10,379,460 B2 | 8/2019 | Arimura et al. | |
| 10,416,588 B2 | 9/2019 | Masu et al. | |
| 10,545,453 B2 | 1/2020 | Iwasaki et al. | |
| 10,558,136 B2 | 2/2020 | Furukawa | |
| 10,649,350 B2 | 5/2020 | Yamaguchi et al. | |
| 10,663,913 B2 | 5/2020 | Yamaai et al. | |
| 10,678,154 B2 | 6/2020 | Takashima et al. | |
| 10,678,158 B2 | 6/2020 | Kikuchi et al. | |
| 10,845,724 B2 | 11/2020 | Kikuchi | |
| 10,884,352 B2 | 1/2021 | Yamada et al. | |
| 10,996,581 B2 | 5/2021 | Muranaka et al. | |
| 11,022,904 B2 | 6/2021 | Arimura et al. | |
| 11,061,342 B2 | 7/2021 | Umeda et al. | |
| 11,112,718 B2 | 9/2021 | Uno et al. | |
| 11,112,719 B2 | 9/2021 | Makisumi et al. | |
| 11,112,748 B2 | 9/2021 | Yamada et al. | |
| 11,137,716 B2 | 10/2021 | Hiyama et al. | |
| 11,169,454 B2 | 11/2021 | Nishioka et al. | |
| 11,169,464 B2 | 11/2021 | Komatsu et al. | |
| 11,175,602 B2 | 11/2021 | Nishioka et al. | |
| 11,307,509 B2 | 4/2022 | Hino et al. | |
| 11,320,756 B2 | 5/2022 | Kototani et al. | |
| 11,340,553 B2 | 5/2022 | Watariguchi et al. | |
| 11,347,156 B2 | 5/2022 | Kurachi et al. | |
| 11,360,405 B2 | 6/2022 | Tomono et al. | |
| 11,366,402 B2 | 6/2022 | Ishiduka et al. | |
| 2002/0022142 A1 | 2/2002 | Harada | |
| 2005/0227089 A1 | 10/2005 | Hirakawa | |
| 2006/0142131 A1 | 6/2006 | Iwamura | |
| 2011/0013939 A1 | 1/2011 | Ono | |
| 2012/0224887 A1 | 9/2012 | Harada | |
| 2012/0237863 A1 | 9/2012 | Wu | |
| 2012/0308261 A1 | 12/2012 | Tsuru et al. | |
| 2013/0195517 A1 | 8/2013 | Jansen | |
| 2013/0281276 A1 | 10/2013 | Watanabe et al. | |
| 2014/0219679 A1 | 8/2014 | Liu | |
| 2014/0219680 A1 | 8/2014 | Hagiwara | |
| 2015/0177642 A1* | 6/2015 | Yoneima | G03G 15/09 399/276 |
| 2015/0177652 A1* | 6/2015 | Shimizu | G03G 15/0928 399/267 |
| 2015/0331346 A1 | 11/2015 | Yamauchi et al. | |
| 2016/0033894 A1 | 2/2016 | Tokiwa | |
| 2017/0102633 A1 | 4/2017 | Yoshidome | |
| 2020/0225593 A1 | 7/2020 | Yamaguchi et al. | |
| 2020/0310265 A1 | 10/2020 | Nishioka | |
| 2021/0033996 A1 | 2/2021 | Kikuchi et al. | |
| 2021/0080874 A1* | 3/2021 | Ikeda | G03G 15/162 |
| 2021/0116826 A1 | 4/2021 | Nishida et al. | |
| 2021/0116827 A1 | 4/2021 | Fukudome et al. | |
| 2021/0116831 A1 | 4/2021 | Tominaga et al. | |
| 2021/0116859 A1 | 4/2021 | Unno et al. | |
| 2021/0116860 A1 | 4/2021 | Suzumura et al. | |
| 2022/0011684 A1 | 1/2022 | Nishioka et al. | |
| 2022/0026825 A1 | 1/2022 | Nishioka et al. | |

FOREIGN PATENT DOCUMENTS

| | | |
|---|---|---|
| JP | 11-231637 A | 8/1999 |
| JP | 2002-3651 A | 1/2002 |
| JP | 2004-151695 A | 5/2004 |
| JP | 2005-321764 A | 11/2005 |
| JP | 2006-207807 A | 8/2006 |
| JP | 2007-163849 A | 6/2007 |
| JP | 2011-22410 A | 2/2011 |
| JP | 2012-163954 A | 8/2012 |
| JP | 2013-20175 A | 1/2013 |
| JP | 2014-153488 A | 8/2014 |
| JP | 2016-18154 A | 2/2016 |

(56) References Cited

FOREIGN PATENT DOCUMENTS

| JP | 2017-15800 A | 1/2017 |
| JP | 2017-58639 A | 3/2017 |
| JP | 2017-72833 A | 4/2017 |
| JP | 6291953 B2 | 3/2018 |
| JP | 2018-151615 A | 9/2018 |
| WO | 2012/098834 A1 | 7/2012 |
| WO | 2016/002208 A1 | 1/2016 |

OTHER PUBLICATIONS

U.S. Appl. No. 17/658,755, Atsushi Uematsu, filed Apr. 11, 2022.
U.S. Appl. No. 17/711,229, Shota Kaneko, filed Apr. 1, 2022.
U.S. Appl. No. 17/806,015, Yuichi Kikuchi, filed Jun. 8, 2022.

* cited by examiner 2  3  4

2  5  3  4

ELECTROPHOTOGRAPHIC ELECTRO-CONDUCTIVE MEMBER, PROCESS CARTRIDGE, AND ELECTROPHOTOGRAPHIC IMAGE FORMING DEVICE

CROSS-REFERENCE TO RELATED APPLICATIONS

This application is a Continuation of International Patent Application No. PCT/JP2020/038692, filed Oct. 14, 2020, which claims the benefit of Japanese Patent Application No. 2019-191549, filed Oct. 18, 2019, both of which are hereby incorporated by reference herein in their entirety.

BACKGROUND

Technical Field

The present disclosure relates to an electrophotographic electro-conductive member to be used in an electrophotographic image forming apparatus, and to a process cartridge and an electrophotographic image forming apparatus each including the electrophotographic electro-conductive member.

Description of the Related Art

An electrophotographic image forming apparatus (hereinafter also referred to as "electrophotographic apparatus") includes conductive members, such as a developing roller, a toner-supplying roller, a charging roller, a transfer roller, and a developing blade. An electrophotographic electro-conductive member including an electro-conductive layer having an electrical resistance value (hereinafter referred to as "resistance value") of, for example, $1 \times 10^5 \Omega$ to $1 \times 10^{12} \Omega$ has been used as such conductive member. An electron conductive agent such as carbon black or an ion conductive agent such as a quaternary ammonium salt has heretofore been used for imparting conductivity to the electro-conductive layer to form a stable conduction mechanism.

The electrophotographic electro-conductive member is required to have various functions, such as the conveyance of toner to an electrophotographic photosensitive member (hereinafter referred to as "photosensitive member"), the charging of the photosensitive member, the impartment of charge to the toner, and resistance to the contamination of its surface, and hence various measures have been disclosed to achieve these functions.

In particular, an elastic roller having an electrical resistance of $10^3$ $\Omega \cdot cm$ to $10^{10}$ $\Omega \cdot cm$ has been generally used as a developer-carrying member. In addition, in view of demands for a further improvement in durability of the developer-carrying member and a further improvement in image quality of an electrophotographic image, a developer-carrying member obtained by arranging a surface layer on the surface of an elastic layer has started to be used.

In Japanese Patent Application Laid-Open No. 2017-15800, there is a disclosure of a method of improving toner releasability and abrasion resistance through use of a roll-shaped developer-carrying member having a continuous phase and a discontinuous phase in its surface.

There is a disclosure of an electrophotographic electro-conductive member for an electrophotographic device that has a continuous phase and a discontinuous phase, that is, an electro-conductive phase and a nonconductive phase, and hence has low hardness, a low permanent set, and excellent chargeability.

In addition, in Japanese Patent Application Laid-Open No. 2011-22410, there is a disclosure of a method of reducing discharge unevenness by causing the surface layer of an electrophotographic electro-conductive member to have a matrix-domain structure formed of a nonconductive sea portion and an island portion containing an electron conductive agent.

In recent years, an electrophotographic apparatus has been required to be capable of maintaining high image quality and high durability even in a high-speed process under a severe environment.

For example, when an electron conductive agent such as carbon black is dispersed in an electro-conductive layer, charge moves in an electro-conductive path connected from an electro-conductive support to the surface of an electrophotographic electro-conductive member by the electron conductive agent to express conductivity. Accordingly, the electro-conductive path is responsible for the transportation of the charge consumed by electrification, and hence a certain time period is required until the supply of charge for next electrification.

In the case of a developing member, in the high-speed process, when the supply of charge to be applied to toner cannot follow a process speed, variation in quantity of the charge to be applied to the toner occurs. Thus, it becomes difficult to achieve uniform development, and for example, a fogged image resulting from the toner having a poor charge amount has occurred in some cases.

In addition, in an electrophotographic electro-conductive member for expressing conductivity through the dispersion of an ion conductive agent in its conductive layer, the conductivity is expressed by the migration of an anion and a cation in, for example, a quaternary ammonium salt. Accordingly, in the high-speed process, when the migration speed of the anion or the cation is slow, the migration cannot follow the process speed. Accordingly, as in the foregoing, the supply of the charge to the toner for next development becomes insufficient, and hence a fogged image has occurred in some cases.

SUMMARY

At least one aspect of the present disclosure is directed to providing an electrophotographic electro-conductive member that can maintain high image quality and high durability even in a high-speed process. In addition, other aspects of the present disclosure are directed to providing an electrophotographic image forming apparatus that can stably output a high-quality electrophotographic image, and a process cartridge to be used in the apparatus.

According to one aspect of the present disclosure, there is provided an electrophotographic electro-conductive member including:

a support having an electro-conductive outer surface;

an electro-conductive layer on the outer surface of the support; and a surface layer on an outer surface of the electro-conductive layer, the electro-conductive layer having a matrix containing a crosslinked product of a first rubber and a plurality of domains dispersed in the matrix, the domains each comprising a crosslinked product of a second rubber and an electron conductive agent, wherein when a platinum electrode is directly provided on an outer surface of the electro-conductive layer, and impedance is measured under an environment of a temperature of 23° C. and a relative humidity of 50% by applying an alternating voltage having an amplitude of 1 V between the electro-conductive outer surface of the support and the platinum electrode while changing a frequency thereof between $1.0 \times 10^{-2}$ Hz and $1.0 \times 10^7$ Hz, in a double logarithmic plot with a frequency on an abscissa and an impedance on an ordinate, a slope at frequencies of $1.0 \times 10^6$ Hz to $1.0 \times 10^7$ Hz is −0.8 or more and −0.3 or less, and an impedance at a frequency of $1.0 \times 10^{-2}$ Hz to $1.0 \times 10^1$ Hz is $1.0 \times 10^4 \Omega$ to $1.0 \times 10^{11} \Omega$, and wherein when a platinum electrode is directly provided on an outer surface of the electrophotographic electro-conductive member, and impedance is measured under the environment having a temperature of 23° C. and a relative humidity of 50% by applying an alternating voltage having an amplitude of 1 V between the electro-conductive outer surface of the support and the platinum electrode while changing a frequency thereof between $1.0 \times 10^{-2}$ Hz and $1.0 \times 10^7$ Hz, an impedance at a frequency of $1.0 \times 10^{-2}$ Hz to $1.0 \times 10^1$ Hz is $1.0 \times 10^5 \Omega$ to $1.0 \times 10^{11} \Omega$.

In addition, according to another aspect of the present disclosure, there is provided a process cartridge, which is removably mounted onto a main body of an electrophotographic image forming apparatus, the process cartridge including the above-mentioned conductive member. Further, according to another aspect of the present disclosure, there is provided an electrophotographic image forming apparatus including the above-mentioned conductive member.

Further features of the present disclosure will become apparent from the following description of exemplary embodiments with reference to the attached drawings.

DESCRIPTION OF THE EMBODIMENTS

Figure 1A:
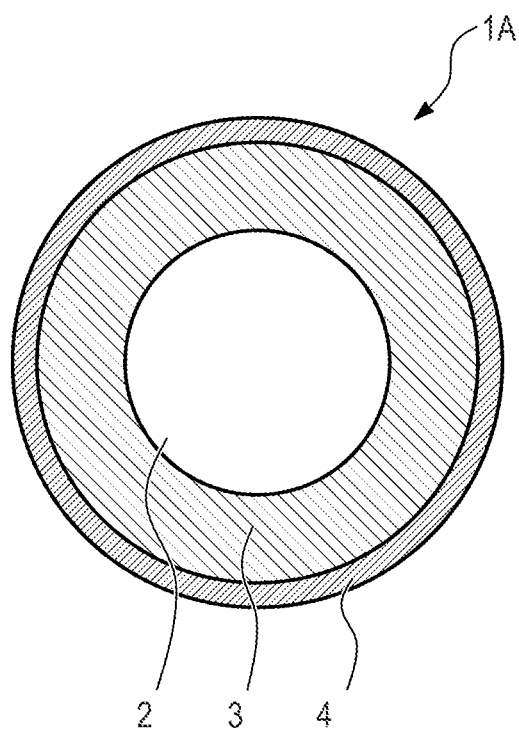
FIG. 1A is a schematic sectional view of an electrophotographic electro-conductive roller according to one embodiment of the present disclosure.

The movement of charge in the electro-conductive path of an electro-conductive layer in a related-art developing member and a process for the impartment of the charge to toner are assumed as described below.

First, a voltage is applied to an electro-conductive support connected to an power source, and hence the charge is supplied. The charge passes through the electro-conductive layer of the electrophotographic electro-conductive member to be transported (supplied) to the surface of the developing member.

When the surface of the developing member is brought into contact with the toner under the state, the charge on the surface of the developing member moves to the toner, that is, the charge is supplied to the toner.

Although the amount of the charge on the surface of the developing member is reduced by the amount of the charge that has moved to the toner, as long as the electro-conductive support of the developing member is connected to the power source, new charge is supplied to the surface of the developing member through the electro-conductive support.

When the new charge is continuously supplied to the developing member as described above, the charge can be continuously supplied to the toner.

Meanwhile, in a development process including using a developing roller or a developing sleeve and a developing blade, toner particles form a toner layer having a thickness roughly corresponding to 2 or 3 particles on the surface of a toner-carrying member to be developed onto a photosensitive member.

In a two-layer type developing member obtained by arranging a surface layer on an electro-conductive layer, charge is imparted to the toner particles mainly by triboelectric charging between the surface layer of the developing member and the toner particles.

While the toner rolls on the surface of the toner-carrying member, the charge is supplied from the toner-carrying member to the toner in an extremely short time period for which the toner passes through a space between the toner-carrying member and the developing blade. Thus, the charge is imparted to the toner. Accordingly, the charge lost from the surface layer by the impartment of triboelectric charge to the toner needs to be immediately supplied from an elastic layer.

Accordingly, when the supply of the charge on the elastic layer stagnates, and hence the rate at which the charge moves to the surface layer of the developing member is slow, the amount of new charge to be supplied to the surface of the developing member is limited. In a high-speed process in which the charge needs to be supplied to a large amount of the toner per unit time, when the amount of the new charge to be supplied to the surface layer of the developing member is limited, insufficient supply of the charge to the toner occurs. As a result, variation in amount of the charge received by the toner at the time of its contact with the surface of the developing member and its rolling thereon occurs, and hence the charge amount distribution of the toner becomes larger. Further, toner that moves to the photosensitive member without being controlled in a developing portion (position at which the photosensitive member and the developing member face each other) is produced, and hence so-called fogging is liable to appear.

To increase the rate at which the charge of the electro-conductive layer moves to the surface layer of the developing member, the inventors have blended the electro-conductive layer with a large amount of an electro-conductive agent to reduce the resistance of the electro-conductive layer.

However, even when any one of an ion conductive agent and an electron conductive agent was used, a reducing effect on the ratio of the toner that was not sufficiently charged in the developing portion of the high-speed process was small, and hence a fogging-reducing effect as high as an expected one was not obtained.

As described above, it is not easy to provide a developing member that can form a high-quality image even in a high-speed process. According to an investigation by the inventors, each of an electro-conductive roll according to Japanese Patent Application Laid-Open No. 2017-15800 and an electro-conductive roller according to Japanese Patent Application Laid-Open No. 2011-22410 has caused a fogged image probably due to an insufficient supply amount of charge in an image evaluation in the high-speed process in some cases.

The inventors have made investigations with a view to solving such problem as described above. In the case of a developing member to be used in the impartment of charge to toner, the conduction mechanism via which the charge is imparted to the toner has conventionally been the electro-conductive path of an electron conductive agent such as carbon black or the electro-conductive path of an ion conductive agent as described above.

The application of a voltage transports the charge to the surface of the developing member through the electro-conductive path to generate an electric field between the toner and the developing member. Further, on the surface on which the surface of the developing member and the toner are brought into contact with each other, the charge is moved from the surface of the developing member to the toner by the electric field. The toner is typically carried as a toner layer having a thickness corresponding to 2 or 3 toner particles on the surface of the developing member, and receives the supply of the charge at the time of its contact with the developing member while rolling thereon.

In addition, the region of contact between the toner and the developing member has a certain area. In the area, the impartment of the charge to the toner occurs a plurality of times. For example, when a developing device includes a developing roller and a developing blade, the impartment of the charge to the toner occurs a plurality of times during the passage of the toner through the contact region with the developing blade by the rotation of the developing roller and the rolling of the toner.

Once the charge impartment occurs, the impartment of the charge supplied from the surface of the developing member continues for a certain time period, and hence the charge transported to the surface of the developing member is consumed. When the charge impartment ends, charge corresponding to the consumed amount is supplied from the electro-conductive path in the developing member to the surface of the developing member again, and hence next charge impartment occurs. Accordingly, the final charge amount of the toner may be the integration of the quantities of the charge imparted by the plurality of times of impartment.

As described above, an environment surrounding the toner and the history of the development thereof affect the amount of the charge imparted in its contact portion with the surface of the developing member, and hence the charge amount of the toner has a distribution in typical cases. In particular, in the case of a high-speed process, after the first charge impartment to the toner has occurred, the supply of a charge amount for the next charge impartment cannot follow a process speed in some cases. In particular, the first charge impartment immediately after the penetration of the toner into a developing nip region formed by the developing blade and the developing member has a sufficient charge amount, but charge supply for subsequent charge impartment cannot follow the speed in some cases.

In view of the foregoing, the inventors have made investigations with a view to obtaining an electrophotographic electro-conductive member that can accumulate sufficient charge in a short time period and can immediately supply the charge. As a result, the inventors have found that an electrophotographic electro-conductive member having the following configuration can satisfactorily respond to the requirement.

The electrophotographic electro-conductive member includes a support having an electro-conductive outer surface, an electro-conductive layer arranged on the outer surface of the support, and a surface layer arranged on an outer surface of the electro-conductive layer.

The electro-conductive layer has a matrix containing a crosslinked product of a first rubber and a plurality of domains dispersed in the matrix, and the domains each contain a crosslinked product of a second rubber and an electron conductive agent.

To measure the impedance of the electro-conductive layer, a platinum electrode is directly arranged on the outer surface thereof, and an alternating voltage having an amplitude of 1 V is applied between the outer surface of the support and the platinum electrode under an environment having a temperature of 23° C. and a relative humidity of 50%. At that time, the voltage is applied while its frequency is changed between $1.0 \times 10^{-2}$ Hz and $1.0 \times 10^{7}$ Hz. When the measurement result is plotted on a log-log scale whose axis of abscissa indicates the frequency and whose axis of ordinate indicates the impedance, the electro-conductive layer according to this aspect satisfies both the following first requirement and second requirement.

<First Requirement>

A slope at frequencies of $1.0 \times 10^{6}$ Hz to $1.0 \times 10^{7}$ Hz is $-0.8$ or more and $-0.3$ or less.

<Second Requirement>

The impedance at a frequency of $1.0 \times 10^{-2}$ Hz to $1.0 \times 10^{1}$ Hz is $1.0 \times 10^{4} \Omega$ to $1.0 \times 10^{11} \Omega$.

Further, a platinum electrode is directly arranged on the outer surface of the electrophotographic electro-conductive member, that is, the outer surface of the surface layer, and an impedance between the outer surface of the support and the platinum electrode is measured under the same conditions as those described above. When the measurement result is plotted on a log-log scale whose axis of abscissa indicates the frequency and whose axis of ordinate indicates the impedance, the impedance at a frequency of $1.0 \times 10^{-2}$ Hz to $1.0 \times 10^{1}$ Hz is $1.0 \times 10^{5} \Omega$ to $1.0 \times 10^{11} \Omega$.

That is, the electrophotographic electro-conductive member according to this aspect enables a development process in which variation in charge amount of toner is extremely small. Further, the electrophotographic electro-conductive member according to the present disclosure includes the surface layer as its outermost layer, and hence the development process in which the variation in charge amount of the toner is extremely small can be maintained over a long time period. In the present disclosure, the frequency region of $1.0 \times 10^{-2}$ Hz to $1.0 \times 10^{1}$ Hz is sometimes referred to as "low-frequency region."

The electrophotographic electro-conductive member according to this aspect is described below by taking the aspect of a developing roller as an example. The electrophotographic electro-conductive member according to this aspect is not limited to the developing roller, and may be applied to, for example, a charging roller, a fixing roller, a developing blade, or a toner-supplying roller.

The electrophotographic electro-conductive member according to this aspect includes the support having the electro-conductive outer surface, the electro-conductive layer arranged on the outer surface of the support, and the surface layer arranged on the outer surface of the electro-conductive layer. The electro-conductive layer has conductivity. The term "conductivity" as used herein is defined as a volume resistivity of less than $1.0 \times 10^8$ Ω·cm. In addition, the electro-conductive layer has the matrix containing the crosslinked product of the first rubber and the plurality of domains dispersed in the matrix, and the domains each contain the crosslinked product of the second rubber and the electron conductive agent. In addition, the electro-conductive layer of the electrophotographic electro-conductive member satisfies <First Requirement> and <Second Requirement> described above.

<First Requirement>

The first requirement specifies that the stagnation of charge in the electrophotographic electro-conductive member at high frequencies hardly occurs.

Figure 3:
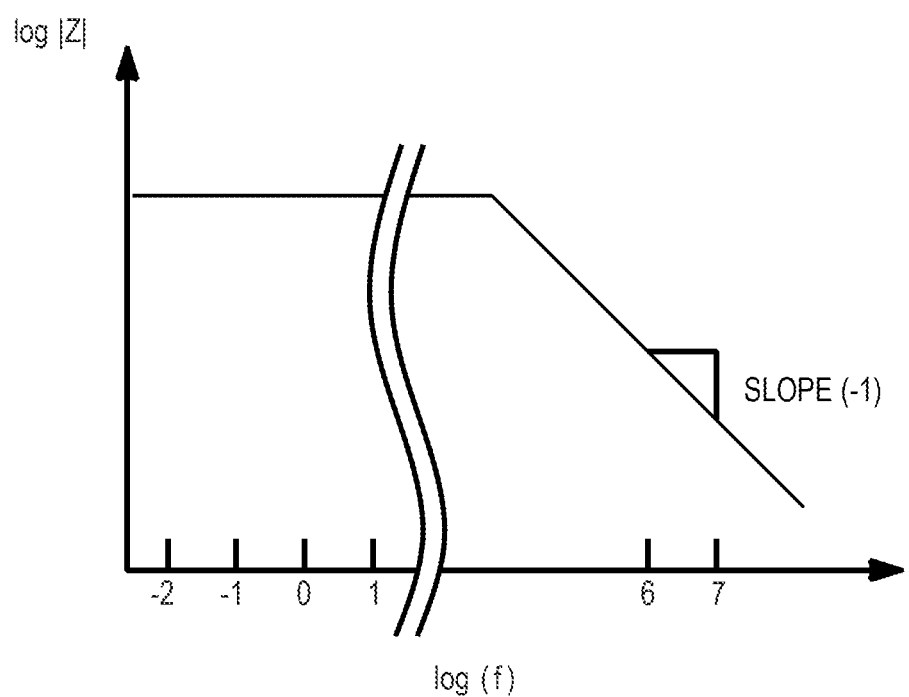
FIG. 3 is an explanatory view of a graph of an impedance characteristic.

When the impedance of the electro-conductive layer of a related-art conductive member is measured, its slope is necessarily −1 at high frequencies. The term "slope" as used herein refers to a slope with respect to an axis of abscissa when the impedance characteristic of the electrophotographic electro-conductive member is plotted on a log-log scale against the frequency as shown in FIG. 3.

The equivalent circuit of the electro-conductive layer in the electrophotographic electro-conductive member is represented by the parallel circuit of an electrical resistance value R and an electrostatic capacitance value C, and the absolute value |Z| of the impedance may be represented by the following formula (1). At this time, "f" in the formula (1) represents the frequency.

$$|Z| = \sqrt{\frac{1}{R^{-2} + (2\pi f)^2 C^2}} \quad (1)$$

The fact that the impedance shows a straight line having a slope of −1 at high frequencies may be assumed to be a state in which the movement of the charge cannot follow a high-frequency voltage and stagnates, and hence such a so-called insulating electrostatic capacitance that the electrical resistance value R is largely increased is measured. A state in which the charge stagnates may be assumed to be a state in which the R in the formula (1) is approximated to infinity. At this time, the following approximation can be made: in the elements $(R^{-2}+(2\pi f)^2 C^2)$ of the denominator of the formula (1), the $R^{-2}$ has an extremely small value as compared to the $(2\pi f)^2 C^2$. Accordingly, the formula (1) can be deformed into a formula having applied thereto an approximation like the formula (2) from which the $R^{-2}$ is removed. Finally, when formula deformation in which the logarithm of both the sides of the formula (2) is taken is performed, the formula (3) is obtained and the slope of log f becomes −1.

$$|Z| = \sqrt{\frac{1}{(2\pi f)^2 C^2}} \quad (2)$$

$$\log|Z| = -\log f - \log(2\pi C) \quad (3)$$

Figure 4:
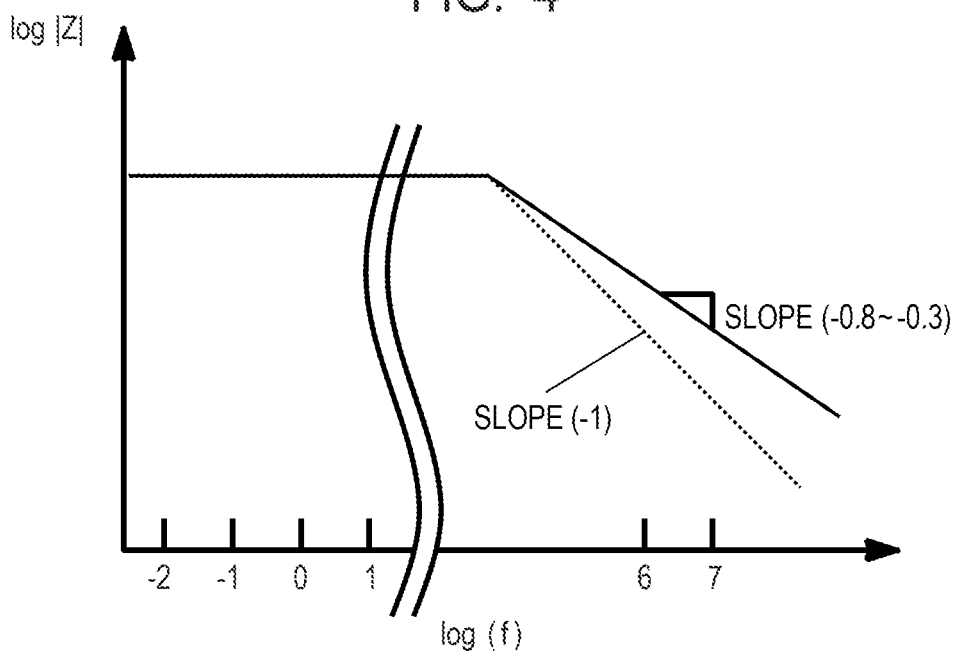
FIG. 4 is an explanatory graph of the behavior of an impedance.

The meanings of the formulae (1) to (3) are described with reference to FIG. 4. In FIG. 4, an axis of ordinate indicates the logarithm (log|Z|) of the absolute value of an impedance, and an axis of abscissa indicates the logarithm (log f) of the frequency of a measuring vibration voltage. The behavior of the impedance represented by the formula (1) is shown in FIG. 4. First, as described above, as the frequency becomes larger, the absolute value of the impedance satisfying the formula (1) starts to reduce at a certain frequency. In addition, in such a log-log plot as shown in FIG. 4, the reduction behavior shows a straight line having a slope of −1, the slope being independent of, for example, the electrical resistance value and electrostatic capacitance of the electrophotographic electro-conductive member, as represented by the formula (3).

The measurement of the impedance characteristic of an insulating resin layer provides a straight line having a slope of −1, and hence a state in which a slope of −1 is obtained in the measurement of the impedance of the electro-conductive layer of the electrophotographic electro-conductive member is assumed to mean the appearance of such a characteristic that the movement of the charge stagnates at high frequencies. When the movement of the charge stagnates at high frequencies, the movement cannot follow the frequency at which the charge is supplied to the surface layer in a high-speed process. It is assumed that as a result of the foregoing, the timing at which the charge supply cannot be performed occurs, and hence variation in charge amount of the toner occurs.

Meanwhile, in the electrophotographic electro-conductive member according to this aspect, the slope of the impedance of the electro-conductive layer is −0.8 or more and −0.3 or less in the high-frequency region of $1.0 \times 10^6$ Hz to $1.0 \times 10^7$ Hz, and hence the supply of the charge hardly stagnates at high frequencies. As a result, the supply of the charge at frequencies ranging from the low-frequency region in which the impedance has a constant value to the high-frequency region, in particular, the supply of the charge at high frequencies where the movement of the charge is liable to stagnate can be performed.

The supply of the charge can be sufficiently performed in a wide frequency region. Accordingly, variation in supply of the charge to the surface layer is suppressed, and hence the total charge amount of the toner can be increased. The range of the high-frequency region may correspond to a region in which the variation in supply of the charge to the surface layer is liable to occur because the range is the highest frequency region in which charge consumption by electrification occurs out of the frequencies at which the charge generated from the electrophotographic electro-conductive member is supplied. When the slope shows a value within the above-mentioned range larger than −1 in such frequency region, a slope larger than −1 is obtained even in a high-frequency region lower than the frequency region. As a result, the occurrence of the variation in supply of the charge to the surface layer is suppressed, and hence the total charge amount of the toner can be increased through the surface layer.

As a process speed becomes higher, the number of times that the charge is supplied needs to be increased by making the frequency at which the charge is supplied higher. Accordingly, the control of the charge supply and a conduction mechanism particularly in the high-frequency region of, for example, $1.0 \times 10^6$ Hz to $1.0 \times 10^7$ Hz out of the above-mentioned range is important.

As described above, the deviation of the slope of the impedance of the electro-conductive layer in the high-frequency region from −1 is effective in increasing the number of times that the charge is supplied to the toner through the surface layer. Thus, the characteristic by which the supply of the charge to the toner and the supply of charge for next charge supply are rapidly performed can be satisfactorily achieved. The deviation of the slope of the impedance from −1 means that the supply of the charge in the electrophotographic electro-conductive member does not stagnate, and hence such conductive member obtains a characteristic directed to suppress variation in supply of the charge to the toner.

<Second Requirement>

The impedance in the low-frequency region according to the second requirement represents such a characteristic that the stagnation of the charge hardly occurs.

The foregoing is understood from the fact that the region is a region in which the slope of the impedance at low frequencies is not −1. In addition, when the frequency "f" in the formula (1) is approximated to 0, the absolute value of the impedance can be approximated to the electrical resistance value R. Accordingly, it is found that the electrical resistance value R represents an ability at the time of the movement of the charge in a single direction.

Accordingly, it can be assumed that measurement simultaneous with the application of a low-frequency voltage simulates the movement amount of the charge in a state in which the movement of the charge can follow the vibration of the voltage.

The movement amount of the charge at low frequencies is an indicator of the ease with which the charge moves between the electro-conductive layer of the electrophotographic electro-conductive member and the measuring electrode (platinum electrode). Further, the amount may be used as an indicator of the amount of the charge moved from the electro-conductive layer of the electrophotographic electro-conductive member to the surface layer by electrification at an interface therebetween.

In addition, the alternating voltage to be used in the measurement of the impedance according to the first and second requirements has an amplitude of 1 V. The measuring vibration voltage is significantly low in view of the fact that a voltage to be actually applied to the electrophotographic electro-conductive member in an electrophotographic image forming apparatus is from several hundreds of volts to several thousands of volts. Accordingly, the measurement of the impedance according to the first and second requirements may enable the evaluation of the ease with which the charge is discharged from the surface of the electro-conductive layer of the electrophotographic electro-conductive member at a higher level.

In addition, the satisfaction of the second requirement enables the control of the ease with which the charge is discharged within an appropriate range. When the impedance is less than $1.0 \times 10^4 \Omega$, the amount of the charge to be supplied at one time becomes so large that the supply of charge for next charge supply cannot follow the amount. The inability to follow acts in the direction of the occurrence of variation in charge supply, and hence it becomes difficult to suppress fogging. Meanwhile, when the impedance is more than $1.0 \times 10^{11} \Omega$, the ease with which the charge is discharged reduces, and hence falls short of an electrification amount enough to compensate for the variation in charge supply.

As described with reference to FIG. 4, in the electro-conductive layer of the electrophotographic electro-conductive member, the absolute value of the impedance in the low-frequency region has a constant value. Accordingly, the impedance at $1.0 \times 10^{-2}$ Hz to $1.0 \times 10^1$ Hz may be substituted with, for example, an impedance value at a frequency of 1 Hz.

The electro-conductive layer achieving both the first requirement and the second requirement can suppress variation in supply of the charge to the surface layer in a frequency region from low frequencies to high frequencies to reduce fogging. The satisfaction of the first requirement can suppress variation in charge supply at high frequencies. In addition, the satisfaction of the second requirement further increases the amount of the charge to be supplied, and hence can effectively suppress the occurrence of fogging.

<Method of Measuring Impedance>

The impedance may be measured by the following method.

At the time of the measurement of the impedance, the influence of a contact resistance between the electro-conductive layer and the measuring electrode needs to be eliminated. To that end, platinum in the form of a low-resistance thin film is directly deposited onto the outer surface of the electro-conductive layer, and the thin film is used as the electrode. In addition, the impedance is preferably measured with 2 terminals including the electro-conductive support of the electrophotographic electro-conductive member serving as a ground electrode.

Examples of a method of forming the electrode may include formation methods, such as metal deposition, sputtering, the application of a metal paste, and the application of a metal tape. Of those, a method including forming a platinum thin film as the electrode through deposition is preferred from the viewpoint of a reduction in contact resistance with the outer surface of the electro-conductive layer.

When the platinum thin film is directly formed on the outer surface of the electro-conductive layer, it is preferred to provide a vacuum deposition device with a mechanism capable of gripping the electrophotographic electro-conductive member in consideration of its simplicity and the uniformity of the thin film. In addition, for an electrophotographic electro-conductive member having a columnar section, it is preferred to use a vacuum deposition device further provided with a rotation mechanism.

It is preferred that the measurement be performed by forming a platinum thin film electrode having a width of about 10 mm in the longitudinal direction of the electrophotographic electro-conductive member, and connecting a metal sheet wound around the platinum thin film electrode without any gap in a direction intersecting the longitudinal direction to a measuring electrode coming out of a measuring device. In the case of a columnar conductive member, a metal sheet wound in the circumferential direction of its conductive layer without any gap is preferably used. Thus, the impedance measurement can be performed without being affected by the runout of the size (an outer diameter in the columnar conductive member) of an outer edge in a section perpendicular to the longitudinal direction of the electro-conductive layer and the surface shape of the layer. Aluminum foil, a metal tape, or the like may be used as the metal sheet.

An impedance-measuring device only needs to be a device that can measure an impedance in a frequency region up to the order of $10^7$ Hz, such as an impedance analyzer, a network analyzer, or a spectrum analyzer. The measurement is preferably performed with the impedance analyzer out of those devices in view of the electrical resistance region of the electrophotographic electro-conductive member.

Conditions for the measurement of the impedance are described.

The impedance in the frequency region of $1.0\times10^{-2}$ Hz to $1.0\times10^7$ Hz is measured with an impedance-measuring device. The measurement is performed under an environment having a temperature of 23° C. and a relative humidity of 50%. To reduce measurement variation, 5 or more measurement points are arranged for each order of magnitude of the frequency, and a vibration voltage is 1 Vpp.

With regard to a measurement voltage, the measurement may be performed while a direct voltage is applied in consideration of a shared voltage to be applied to the electrophotographic electro-conductive member in an electrophotographic apparatus. Specifically, measurement simultaneous with the application of a direct voltage of 10 V or less, which is superimposed on the vibration voltage, is suitable for quantifying the charge-transporting and accumulating characteristics of the electrophotographic electro-conductive member.

Next, a method of calculating the slope of the impedance is described.

With regard to the measurement results measured under the above-mentioned conditions, the absolute value of the impedance is plotted on a log-log graph against the measurement frequency with commercial spreadsheet software. The slope of the absolute value of the impedance in the frequency region of $1.0\times10^6$ Hz to $1.0\times10^7$ Hz of the graph obtained by the log-log plotting only needs to be determined by utilizing measurement points in the frequency region of $1.0\times10^6$ Hz to $1.0\times10^7$ Hz. Specifically, the following only needs to be performed: an approximate straight line representing a linear function is calculated for the plots of the graph in the frequency range by a least-squares method; and its slope is calculated.

Next, a value obtained as follows only needs to be adopted as the impedance at low frequencies: the arithmetic average of values at measurement points in the low-frequency region of $1.0\times10^{-2}$ Hz to $1.0\times10^1$ Hz in the log-log graph is calculated.

In the measurement of the slope of the impedance, the following only needs to be performed: the electrophotographic electro-conductive member is divided into 5 equal regions in its longitudinal direction; the measurement is performed at 5 arbitrary sites in each of the regions; and the arithmetic average of the measured values of the slope at the 5 sites is calculated.

Further, the electrophotographic electro-conductive member of this aspect is characterized in that an impedance on the outer surface of the electrophotographic electro-conductive member at a frequency of $1.0\times10^{-2}$ Hz to $1.0\times10^1$ Hz is $1.0\times10^5\Omega$ to $1.0\times10^{11}\Omega$. The impedance on the outer surface of the electrophotographic electro-conductive member is measured by the same method as that of the impedance on the outer surface of the electro-conductive layer, and is similarly plotted on a log-log scale.

As described above, in the electrophotographic electro-conductive member of this aspect, when the electro-conductive layer satisfies the first requirement and the second requirement, the movement of charge hardly stagnates, and sufficient charge can be supplied to the surface layer.

As in the second requirement for the electro-conductive layer described above, when the frequency "f" in the formula (1) is approximated to 0, the absolute value of the impedance can be approximated to the electrical resistance value R. Accordingly, it is found that the electrical resistance value R represents an ability at the time of the movement of the charge in a single direction. Accordingly, it can be assumed that measurement simultaneous with the application of a low-frequency voltage in a state in which the platinum electrode is arranged on the outer surface of the electrophotographic electro-conductive member simulates the movement amount of the charge in a state in which the movement of the charge can follow the vibration of the voltage. The movement amount of the charge at low frequencies is an indicator of the ease with which the charge moves between the surface layer of the electrophotographic electro-conductive member and the measuring electrode. Further, the amount may be used as an indicator of the amount of the charge moved from the surface layer of the electrophotographic electro-conductive member to the toner by contact therebetween.

The fact that the impedance in the above-mentioned low-frequency region measured on the outer surface of the electrophotographic electro-conductive member is $1.0\times10^5\Omega$ to $1.0\times10^{11}\Omega$ means that the charge supplied from the electro-conductive layer without stagnation is also supplied to the toner through the surface layer without stagnation.

To resupply the charge, which is supplied from the electro-conductive layer, from the surface layer to the toner without stagnation, the volume resistivity of the surface layer needs to be adjusted within a suitable range.

The use of a surface layer material having a proper volume resistivity can set the impedance in the above-mentioned low-frequency region to $1.0\times10^5\Omega$ to $1.0\times10^{11}\Omega$.

(Surface Layer)

The charge of the surface layer lost by triboelectric charge impartment is supplied from the electro-conductive layer satisfying <First Requirement> and <Second Requirement> described above to the toner without stagnation.

To resupply the charge, which is supplied from the electro-conductive layer, from the surface layer to the toner without stagnation, the volume resistivity of the surface layer is preferably $1.0\times10^4$ $\Omega$·cm or more and $1.0\times10^{15}$ $\Omega$·cm or less.

When the volume resistivity of the surface layer is $1.0\times10^4$ $\Omega$·cm or more, charge generated by its friction with the toner leaks to the surface layer side, and hence the supply of the charge to the toner can be suppressed from becoming insufficient. In addition, when the volume resistivity of the surface layer is $1.0\times10^{15}$ $\Omega$·cm or less, the movement amount of the charge in the surface layer can be sufficiently secured, and hence the supply of the charge to the toner does not become insufficient.

In each case, the impedance in the low-frequency region measured on the outer surface of the electrophotographic electro-conductive member can be set to $1.0\times10^5\Omega$ to $1.0\times10^{11}\Omega$.

<Method of Measuring Volume Resistivity>

The volume resistivity of the surface layer of the electrophotographic electro-conductive member may be measured by the following method.

A measured value measured with an atomic force microscope (AFM) by an electro-conductive mode may be adopted as the volume resistivity of the surface layer. First, the surface layer of the electrophotographic electro-conductive member is cut out into a sheet piece with a manipulator, and one surface of the surface layer is subjected to metal deposition. A DC power source is connected to the surface subjected to the metal deposition, and a voltage is applied thereto. The free end of a cantilever is brought into contact with the other surface of the surface layer, and a current image is obtained through the main body of the AFM. Current values on 100 randomly selected surfaces are measured, and the volume resistivity may be calculated from the average current value of the 10 lowest current values measured, the average thickness of the surface layer, and the contact area of the cantilever.

(1) Conductive Member

The electrophotographic electro-conductive member for electrophotography according to this aspect includes an electro-conductive support, at least one conductive layer on the support, and a surface layer arranged on the outer surface of the electro-conductive layer.

Figure 1B:
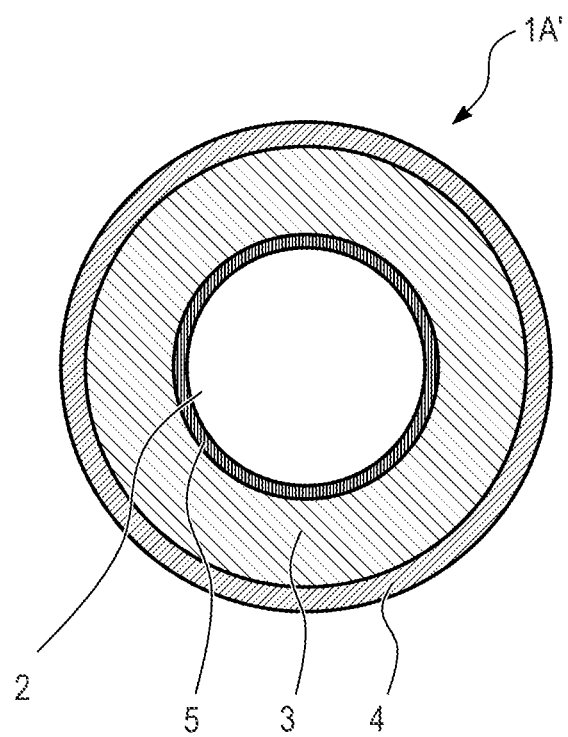
FIG. 1B is a schematic sectional view of an electrophotographic electro-conductive roller according to one embodiment of the present disclosure.

A roller-shaped conductive member (developing roller) is illustrated as an example thereof in each of FIG. 1A and FIG. 1B. A developing roller 1A illustrated in FIG. 1A includes an electro-conductive support 2, an electro-conductive layer 3 arranged on the outer peripheral surface (outer surface) thereof, and a surface layer 4 on the outer peripheral surface of the electro-conductive layer 3.

The layer configuration of the developing roller 1A is not limited to the form illustrated in FIG. 1A. As another form of the developing roller 1A, a developing roller 1A' including an undercoat layer (resin layer) 5 between the support 2 and the electro-conductive layer 3 arranged on the outer peripheral surface thereof as illustrated in FIG. 1B is permitted. Further, a roller including an intermediate layer (not shown) between the electro-conductive layer 3 and surface layer 4 of each of the developing rollers 1A and 1A' is given as an example.

Figure 2:
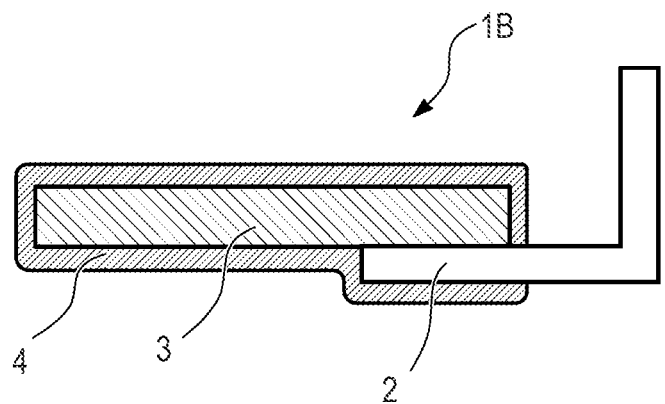
FIG. 2 is a schematic sectional view of a developing blade for electrophotography according to one embodiment of the present disclosure.

In addition, a blade-shaped member (developing blade) is given as another example of the electrophotographic electro-conductive member. FIG. 2 is a schematic sectional view of a developing blade 1B. The developing blade 1B illustrated in FIG. 2 includes: the electro-conductive support 2; the electro-conductive layer 3 arranged in a partial region including an end portion of the outer surface of the support 2; and the surface layer 4 arranged on the outer peripheral surface of the electro-conductive layer 3.

The developing blade 1B may be formed by: covering the front end portion of an electro-conductive stainless steel-made sheet serving as part of the support with the electro-conductive layer 3; and welding the rear end portion of the stainless steel-made sheet to the electro-conductive support 2.

The electrophotographic electro-conductive member according to the present disclosure may be used as each of electrophotographic members, such as a developing roller, a charging roller, a developing sleeve, a fixing roller, a developing blade, and a toner-supplying roller.

The configuration of the electrophotographic electro-conductive member according to one embodiment of the present disclosure is described in detail below.

<Conductive Support>

The electro-conductive support 2 functions as the supporting member of the electrophotographic electro-conductive member, and in some cases, as an electrode. Specific examples of the support are as follows: when the electrophotographic electro-conductive member is a roller shape, the support 2 is a solid columnar shape or a hollow cylindrical shape; and when the electrophotographic electro-conductive member is a blade shape, the support 2 is a thin plate shape.

A material appropriately selected from materials known in the field of an electrophotographic electro-conductive member for electrophotography and materials that may each be utilized as such developing member may be used as a material for forming the electro-conductive support. An example of the materials is a metal typified by aluminum or stainless steel, a carbon steel alloy, a synthetic resin having conductivity, or a metal or an alloy, such as iron or a copper alloy. Further, such material may be subjected to oxidation treatment or plating treatment with chromium, nickel, or the like. Any one of electroplating and electroless plating may be used as the kind of plating. Of those, electroless plating is preferred from the viewpoint of dimensional stability. Examples of the kind of the electroless plating to be used herein may include nickel plating, copper plating, gold plating, and plating with other various alloys. The thickness of the plating is preferably 0.05 μm or more, and in consideration of a balance between working efficiency and a rust-proofing ability, the thickness of the plating is preferably from 0.1 μm to 30 μm. When a medium resistance layer or an insulating layer is present between the support and the electro-conductive layer, the supply of charge after the consumption of charge by electrification cannot be quickly performed. Accordingly, it is preferred that the electro-conductive layer be directly arranged on the support, or the electro-conductive layer be arranged on the outer periphery of the support via only an undercoat layer formed of a thin-film and conductive resin layer such as a primer.

A known primer may be selected and used as the primer in accordance with, for example, a rubber material for forming the electro-conductive layer and a material for the support. Examples of the primer material include a thermosetting resin and a thermoplastic resin. Specifically, materials, such as a phenol-based resin, a urethane resin, an acrylic resin, a polyester resin, a polyether resin, and an epoxy resin, may each be used.

An impedance measured by arranging a platinum electrode on the outer surface of the electro-conductive resin layer as in the electro-conductive layer preferably falls within the range of $1.0 \times 10^{-5} \Omega$ to $1.0 \times 10^{1} \Omega$ in the low-frequency region.

In a support with a resin layer whose impedance in the low-frequency region falls within the range, sufficient charge can be supplied to the electro-conductive layer. In addition, such support is preferred because the suppressing function of a matrix-domain structure in the electro-conductive layer on the dropout of the charge supply by the first requirement and the second requirement is not inhibited.

The impedance on the outer surface of the resin layer may be measured by the same method as that of the measurement of the slope of the impedance described above except that the measurement is performed by peeling the electro-conductive layer and the surface layer present on its surface. In addition, the impedance of the support may be measured by the same method as that of the measurement of the impedance described above under a state before the covering of the support with the resin layer or the electro-conductive layer, or after the formation of the electrophotographic electro-conductive member, under a state in which the electro-conductive layer or a covering layer formed of, for example, the resin layer and the electro-conductive layer is peeled.

<Conductive Layer>

The electro-conductive layer of the electrophotographic electro-conductive member satisfying <First Requirement> and <Second Requirement> described above is preferably, for example, an electro-conductive layer satisfying at least one configuration out of the following configuration (i) to configuration (iii):

configuration (i): the volume resistivity of the matrix is more than $1.0 \times 10^{12}$ Ω·cm and $1.0 \times 10^{17}$ Ω·cm or less;

configuration (ii): the volume resistivity of each of the domains is $1.0 \times 10^{1}$ Ω·cm or more and $1.0 \times 10^{4}$ Ω·cm or less; and configuration (iii): a distance between the adjacent domains falls within the range of from 0.2 μm or more to 2.0 μm or less.

The term "distance between the domains" means a distance between one matrix-domain interface (also referred to as "wall surface of a domain") and the wall surface of another domain shortest therefrom.

The configurations (i) to (iii) are described below.

Figure 5:
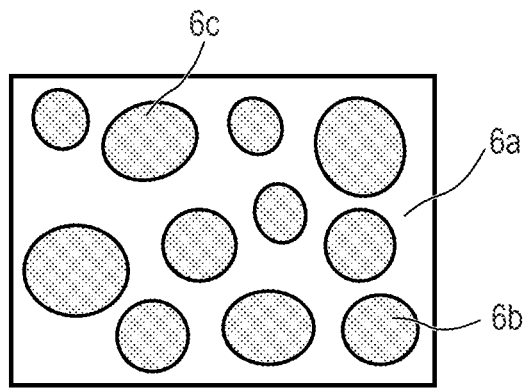
FIG. 5 is a schematic view of a matrix-domain structure.

A partial sectional view of an electro-conductive layer in a direction perpendicular to the longitudinal direction of an electro-conductive roller is illustrated in FIG. 5. The electro-conductive layer has a matrix-domain structure having a matrix 6a and domains 6b. In addition, the domains 6b each contain an electron conductive agent 6c such as carbon black.

When a bias voltage is applied between an electro-conductive support and any other member in an electrophotographic electro-conductive member including the electro-conductive layer in which the domains 6b each containing the electron conductive agent 6c are dispersed in the matrix 6a as described above, charge may move in the electro-conductive layer as described below. That is, first, the charge is accumulated near an interface in each of the domains with the matrix. Then, the charge is sequentially delivered from the domain positioned on the electro-conductive support side to the domain positioned on the side opposite to the electro-conductive support side to reach the surface of the electro-conductive layer on the side opposite to the electro-conductive support side (hereinafter also referred to as "outer surface of the electro-conductive layer"). At this time, when the charge of all the domains moves toward the outer surface of the electro-conductive layer in one charge-supplying step, a time period is required for accumulating charge in the electro-conductive layer for the next charge-supplying step. That is, it becomes difficult to adapt to a high-speed electrophotographic image forming process. Accordingly, even when the bias voltage is applied, charge exchange between the domains is preferably prevented from occurring simultaneously therewith. In addition, in order that a sufficient amount of charge may be supplied by one charge supply even in a high-frequency region in which the movement of the charge is restricted, it is effective to accumulate a sufficient amount of the charge in each of the domains.

As described above, at least one of the configuration (i) to the configuration (iii) is preferably satisfied for suppressing the simultaneous occurrence of the charge exchange between the domains at the time of the application of the bias voltage and accumulating sufficient charge in each of the domains.

<Configuration (i)>
Volume Resistivity of Matrix;

When the volume resistivity of the matrix is set to more than $1.0 \times 10^{12}$ Ω·cm and $1.0 \times 10^{17}$ Ω·cm or less, the charge can be suppressed from bypassing the domains to move in the matrix. In addition, the establishment of a state as if an electro-conductive path communicating in the electro-conductive layer was formed by the leakage of the charge accumulated in each of the domains to the matrix can be prevented.

With regard to <First Requirement> described above, it is important that the charge be moved in the electro-conductive layer through the domains even under the application of a high-frequency bias. Accordingly, the inventors have considered that a configuration in which the electro-conductive regions (domains) in each of which the charge is sufficiently accumulated are separated from each other by the electrically insulating region (matrix) is effective. In addition, when the volume resistivity of the matrix is set within a range corresponding to such a high-resistance region as described above, sufficient charge can be held at its interface with each of the domains, and the leakage of the charge from the domain can be suppressed.

In addition, the inventors have found that the limitation of a charge-moving path to a path lying between the domains is effective in providing an electro-conductive layer satisfying <Second Requirement> described above. When the leakage of the charge from each of the domains to the matrix is suppressed, and a charge-transporting path is limited to a path lying between the plurality of domains, the density of the charge present in each of the domains can be increased, and hence the loading amount of the charge in each of the domains can be made larger.

It is assumed that the total number of charges that can be involved in electrification can thus be increased on the surfaces of the domains each serving as an electro-conductive phase that is the starting point of the electrification, and as a result, the ease with which the charge is discharged from the surface of the electrophotographic electro-conductive member can be improved.

<Method of Measuring Volume Resistivity of Matrix>

The volume resistivity of the matrix may be measured by, for example, cutting out a thin piece having a predetermined thickness (e.g., 1 μm) including the matrix-domain structure from the electro-conductive layer and bringing a microprobe of a scanning probe microscope (SPM) or an atomic force microscope (AFM) into contact with the matrix in the thin piece.

Figure 7A:
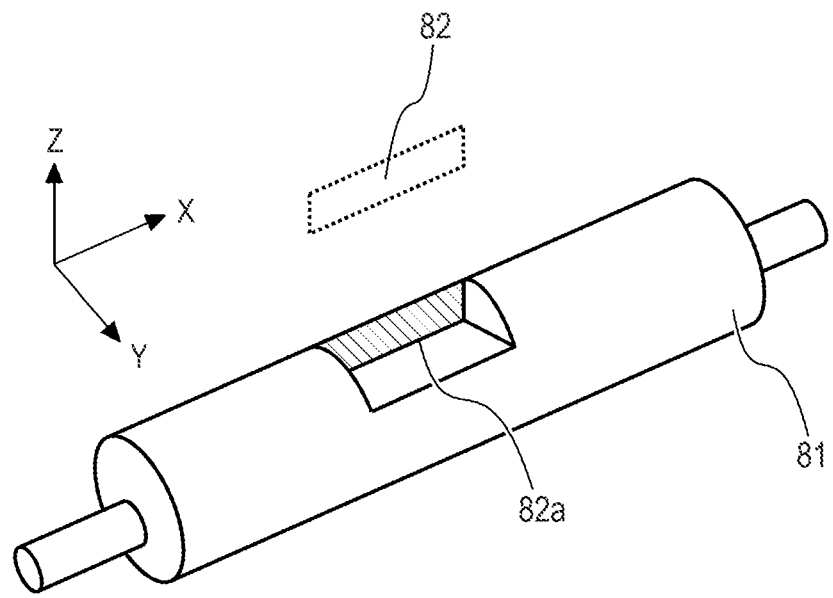
FIG. 7A is an explanatory view of a section cutout direction.
Figure 7B:
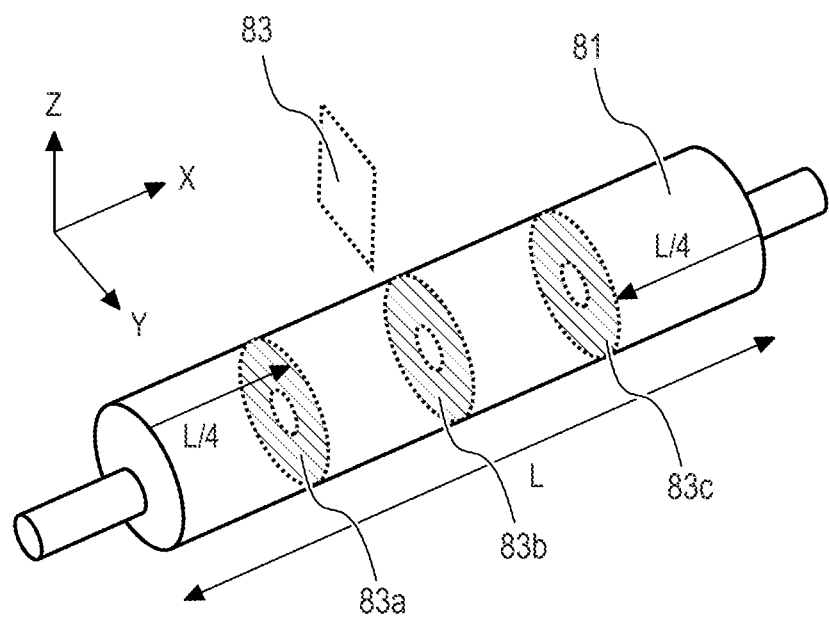
FIG. 7B is an explanatory view of a section cutout direction.

The thin piece is cut out from the elastic layer, for example, in such a manner that, when the longitudinal direction of the electrophotographic electro-conductive member is set to an X-axis, the thickness direction of the electro-conductive layer is set to a Z-axis, and the circumferential direction is set to a Y-axis, the thin piece includes at least part of a section 82a parallel to an XZ plane as illustrated in FIG. 7A. Alternatively, as illustrated in FIG. 7B, the thin piece is cut out so as to include at least part of a YZ plane (e.g., 83a, 83b, 83c) perpendicular to the axial direction of the electrophotographic electro-conductive member. There are given, for example, a sharp razor, a microtome, a focused ion beam (FIB) method, and the like.

For the measurement of the volume resistivity, one surface of the thin piece cut out from the electro-conductive layer is grounded. Then, a microprobe of a scanning probe microscope (SPM) or an atomic force microscope (AFM) is brought into contact with the matrix portion of the surface on an opposite side to the ground surface of the thin piece, and a DC voltage of 50 V is applied for 5 seconds. Then, an arithmetic average value is calculated from a value obtained by measuring a ground current value for 5 seconds, and the applied voltage is divided by the calculated value, to thereby calculate an electric resistance value. Finally, the resistance value is converted into volume resistivity through use of the thickness of the thin piece. In this case, the SPM and the AFM can also measure the thickness of the thin piece simultaneously with the resistance value.

The value of the volume resistivity of a matrix in a columnar charging member is determined by, for example, cutting out one thin piece sample from each of regions obtained by dividing the electro-conductive layer into four parts in the circumferential direction and five parts in the longitudinal direction to obtain the above-mentioned measurement value, and then calculating an arithmetic average value of volume resistivities of 20 samples in total.

<Configuration (ii)>

Volume Resistivity of Domain;

The volume resistivity of each of the domains is preferably set to $1.0 \times 10^1$ Ω·cm or more and $1.0 \times 10^4$ Ω·cm or less. When the volume resistivity of each of the domains is brought into a lower state, the charge-transporting path can be more effectively limited to a path lying between the plurality of domains while untargeted charge movement is suppressed in the matrix.

Further, the volume resistivity of each of the domains is more preferably $1.0 \times 10^2$ Ω·cm or less. When the volume resistivity of each of the domains is reduced to the range, the amount of the charge moving in the domain can be drastically increased. Thus, the impedance of the electro-conductive layer in the low-frequency region can be controlled within a lower range of $1.0 \times 10^5$ Ω or less, and hence the charge-transporting path can be more effectively limited to one passing through the domains.

The volume resistivity of each of the domains is adjusted by using the electron conductive agent for the rubber component of the domain to set the conductivity thereof to a predetermined value.

A rubber composition containing a rubber component for the matrix may be used as a rubber material for the domains. However, a difference in solubility parameter (SP value) between the rubber material for the domains and a rubber material for forming the matrix is preferably set within the following ranges for forming the matrix-domain structure. That is, the difference in SP value is preferably set to 0.4 $(J/cm^3)^{0.5}$ or more and 5.0 $(J/cm^3)^{0.5}$ or less, and in particular, the difference is more preferably set to 0.4 $(J/cm^3)^{0.5}$ or more and 2.2 $(J/cm^3)^{0.5}$ or less.

The volume resistivity of each of the domains may be adjusted by appropriately selecting the kind and addition amount of the electron conductive agent. The electron conductive agent to be used for controlling the volume resistivity of each of the domains to $1.0 \times 10^1$ Ω·cm or more and $1.0 \times 10^4$ Ω·cm or less is preferably an electron conductive agent that can largely change the volume resistivity from a high resistance to a low resistance in accordance with its dispersion amount. Examples of the electron conductive agent to be blended into each of the domains include: carbon materials, such as carbon black and graphite; conductive oxides, such as titanium oxide and tin oxide; metals, such as Cu and Ag; and particles that are made conductive through coating of their surfaces with the electro-conductive oxide or the metal. In addition, two or more kinds of those electron conductive agents may be used by being blended in appropriate amounts as required.

Of such electron conductive agents as described above, conductive carbon black is preferably used because the carbon black has a large affinity for a rubber and a distance between the molecules of the electron conductive agent is easily controlled. The kind of the carbon black to be blended into each of the domains is not particularly limited. Specific examples thereof include gas furnace black, oil furnace black, thermal black, lamp black, acetylene black, and ketjen black.

Of those, conductive carbon black having a DBP oil absorption of 40 cm$^3$/100 g or more and 170 cm$^3$/100 g or less may be suitably used because the carbon black can impart high conductivity to each of the domains.

The electron conductive agent such as conductive carbon black is preferably blended in an amount of 20 parts by mass or more and 150 parts by mass or less into each of the domains with respect to 100 parts by mass of the rubber component in the domain. A particularly preferred blending ratio is 50 parts by mass or more and 100 parts by mass or less. When the electron conductive agent is blended at such ratio, the electron conductive agent is preferably blended in a large amount as compared to a general conductive member for electrophotography. Thus, the volume resistivity of each of the domains can be easily controlled within the range of $1.0 \times 10^1$ Ω·cm or more to $1.0 \times 10^4$ Ω·cm or less. An ion conductive agent may be used as an electro-conductive agent to be used in each of the domains in combination with the electron conductive agent.

For example, a quaternary ammonium salt, an imidazolinium salt, a pyridinium salt, or the like may be used as the ion conductive agent. Examples of the anion of the ion conductive agent include a perchlorate anion, a fluoroalkylsulfonylimide anion, a fluorosulfonylimide anion, a trifluoromethanesulfonate anion, and a tetrafluoroborate anion. At least one kind thereof may be used.

In addition, an additive that has been generally used as a blending agent for a rubber may be added to a rubber composition for the domains as required to the extent that effects according to the present disclosure are not inhibited. Examples of the additive may include a filler, a processing aid, a crosslinking agent, a crosslinking aid, a crosslinking accelerator, an age resistor, a crosslinking accelerator aid, a crosslinking retarder, a softening agent, a dispersant, and a colorant.

Method of Measuring Volume Resistivity of Domain;

The volume resistivity of each of the domains may be measured by the same method as in the above-mentioned section <Method of measuring Volume Resistivity of Matrix> except that a measurement portion is changed to a position corresponding to the domain, and the applied voltage at the time of the measurement of a current value is changed to 1 V.

Herein, the volume resistivities of the domains are preferably uniform. To improve the uniformity of the volume resistivities of the domains, the amounts of the electron conductive agent in the respective domains are preferably uniformized. Thus, the supply of the charge from the outer surface of the electrophotographic electro-conductive member to the toner can be further stabilized.

<Configuration (iii)>

Distance Between Adjacent Domains (Hereinafter Also Referred to as "Interdomain Distance")

The arithmetic average Dm of interdomain distances is preferably 0.2 µm or more and 2.0 µm or less.

In order that the electro-conductive layer in which the domains each having a volume resistivity according to the configuration (ii) are dispersed in the matrix having a volume resistivity according to the configuration (i) may satisfy <Second Requirement> described above, the Dm is set to preferably 2.0 µm or less, particularly preferably 1.0 µm or less. Meanwhile, in order that sufficient charge may be accumulated in each of the domains by reliably separating the domains from each other by the insulating region, the Dm is set to preferably 0.2 μm or more, particularly preferably 0.3 μm or more.

Method of Measuring Interdomain Distance;

The interdomain distance may be measured as described below.

First, a slice is produced by the same method as the method in the measurement of the volume resistivity of the matrix described above. To suitably observe the matrix-domain structure, the resultant slice may be subjected to pretreatment, such as dyeing treatment and vapor deposition treatment, which enables the contrast between the electro-conductive phase and the insulating phase to be suitably obtained. Next, the presence of the matrix-domain structure is recognized by observing the slice with a scanning electron microscope (SEM) or a transmission electron microscope (TEM). The observation is preferably performed with a SEM out of such microscopes at a magnification of from 1,000 to 100,000 in view of the accuracy of the quantification of the areas of the domains.

The interdomain distance may be measured by quantifying a SEM image of a section of the slice in which the matrix-domain structure appears. The SEM image is subjected to 8-bit gray scaling with image processing software (e.g., "Luzex" (product name, manufactured by Nireco Corporation)) to provide a monochromatic image with 256 gray levels. Next, the white and black colors of the monochromatic image are subjected to inversion processing so that the domains in the image may whiten. Thus, a binary image is obtained. Next, a distance between the wall surfaces of a domain size group in the binary image is calculated. The distance between the wall surfaces at this time is the shortest distance between the adjacent domains.

In the case of a columnar conductive member, when the length of the electro-conductive layer of the member in its longitudinal direction is represented by L, and the thickness of the electro-conductive layer is represented by T, such sections of the electro-conductive layer in its thickness direction as illustrated in FIG. 7B are obtained at the following 3 sites: the center of the electro-conductive layer in the longitudinal direction; and sites distant from both the ends of the electro-conductive layer toward the center by L/4 each. For each of the resultant sections, 50-micrometer square observation regions are placed at 3 arbitrary sites in a thickness region corresponding to a depth of from 0.1 T to 0.9 T from the outer surface of the electro-conductive layer toward the support of the member. The respective interdomain distances observed in each of the total of 9 observation regions only need to be measured. The slice is cut out in the direction in which a section including a normal starting from the central axis of the support can be observed because a surface including a region from the support to the outer surface of the electro-conductive layer, the region corresponding to a charge-moving direction, needs to be observed.

Uniformity of Interdomain Distances;

With regard to the configuration (iii), the distribution of the interdomain distances is more preferably uniform. When the distribution of the interdomain distances is uniform, in, for example, the case where a site where charge supply stagnates as compared to the surroundings occurs owing to local formation of a site where the interdomain distances are long in part of the electro-conductive layer, a phenomenon in which the ease with which the charge is discharged is suppressed can be reduced.

In a section in which the charge is transported, that is, such a section of the electro-conductive layer in the thickness direction as illustrated in FIG. 7B, when the arithmetic average of the interdomain distances and variation in interdomain distance in observation regions are represented by Dm and σm, respectively, a ratio σm/Dm is preferably 0 or more and 0.4 or less. 50-Micrometer square observation regions at 3 arbitrary sites in the thickness region corresponding to a depth of from 0.1 T to 0.9 T from the outer surface of the electro-conductive layer toward the support are obtained as the observation regions.

<Method of Controlling Interdomain Distance>

A method of controlling the interdomain distance is described below.

Tokita's theoretical equation (7) based on Taylor's equation (formula (4)) and Wu's empirical equations (formulae (5) and (6)) has been proposed for an interdomain distance (1/τ) when two kinds of incompatible polymers are melted and kneaded.

Taylor's Equation $$D = [C \cdot \sigma / \eta m \cdot \gamma] \cdot f(\eta m / \eta d) \qquad (4)$$

Wu's Empirical Equations $$\gamma \cdot D \cdot \eta m / \sigma = 4(\eta d / \eta m)^{0.84} \cdot \eta d / \eta m > 1 \qquad (5)$$

$$\gamma \cdot D \cdot \eta m / \sigma = 4(\eta d / \eta m)^{-0.84} \cdot \eta d / \eta m > 1 \qquad (6)$$

Tokita's Equation $$D \cong \frac{12 \times P \times \sigma \times \phi}{\pi \times \eta \times \gamma}\left(1 + \frac{4 \times P \times \phi \times EDK}{\pi \times \eta \times \gamma}\right) \qquad \text{Formula (7)}$$

The respective parameters in the formulae (4) to (7) are as described below.

In the formulae (4) to (7), D represents the domain diameter (maximum Feret diameter Df) of the CMB, C represents a constant, σ represents an interfacial tension, ηm represents the viscosity of a matrix, and ηd represents the viscosity of each of domains. In addition, in the formula (7), γ represents a shear rate, η represents the viscosity of a mixed system, P represents a collision coalescence probability, φ represents a domain phase volume, and EDK represents domain phase cutting energy.

As represented by the above-mentioned formula, the interdomain distance can be controlled mainly by:
 (A) the volume ratio of the domain phase;
 (B) a viscosity ratio between the domains and the matrix;
 (C) the shear rate; and
 (D) the magnitude of the domain phase-cutting energy.

Specifically, the interdomain distance can be controlled and shortened by any one of the following approaches:
 a reduction in interfacial tension between the domains and the matrix;
 a reduction in viscosity difference between the domains and the matrix;
 an increase in shear rate at the time of the kneading or an increase in energy at the time of the shearing;
 an increase in volume ratio of the domain phase; and
 a reduction in probability of collision and coalescence.

As described above, the control of the interdomain distance advances simultaneously with the control of domain sizes, but the interdomain distance can be independently controlled by controlling the volume ratio of the domain phase, and the probability of collision and coalescence, that is, a kneading time and the shear rate.

To more efficiently perform charge movement in an electro-conductive path even under a high-speed process, conductive domains having a uniform electrical resistance value are more preferably arranged in the matrix of the electro-conductive layer in a three-dimensionally even and dense manner. Such arrangement can provide a configuration having an extremely uniform and even conductive path.

Specifically, when the average of the ratios of the sectional area of a portion formed of the particles of the electron conductive agent in each of the domains appearing in a section of the electro-conductive layer in its thickness direction to the sectional area of each of the domains is represented by $\mu$, and the standard deviation of the ratios is represented by $\sigma$, a ratio $\sigma/\mu$ is preferably 0 or more and 0.4 or less. In addition, the $\mu$ is preferably 20% or more and 40% or less. In addition to those conditions for the $\sigma$ and the $\mu$, it is particularly preferred that out of a total of 9 sample cubes each having a cubic shape 9 $\mu$m on a side, the sample cubes being sampled from 9 arbitrary sites of the electro-conductive layer, at least 8 sample cubes each satisfy the following requirement (B1).

Requirement (B1):
"When one sample cube is divided into 27 unit cubes 3 $\mu$m on a side, and the volume Vd of the domains in each of the unit cubes is determined, the number of the unit cubes each having a Vd of from 2.7 $\mu$m$^3$ to 10.8 $\mu$m$^3$ is at least 20."

The inventors have assumed the following mechanism as a factor for enabling more efficient performance of charge movement in an electro-conductive path in an electrophotographic electro-conductive member for electrophotography even under a high-speed process. The electro-conductive path is assumed to be such an extremely uniform and even conductive path that conductive domains having a uniform electrical resistance are arranged in an electro-conductive layer in a three-dimensionally even and dense manner.

In a developing member of such a system as to apply a bias, it is desired that toners having different charge densities be developed and destaticized in a blade nip to be developed at a uniform charge density. Accordingly, the surface potential of the developing blade of the developing member needs to be continuously kept uniform by a toner size. Accordingly, the electro-conductive path is preferably formed from the electro-conductive support of the developing member over the surface of the developing member uniformly and at a high density in the thickness direction and in-plane direction thereof.

When the above-mentioned relationship between the $\mu$ and the $\sigma$ is such that the ratio $\sigma/\mu$ is 0 or more and 0.4 or less, the numbers and amounts of the portions (e.g., conductive particles) formed of the electro-conductive agent in the respective domains are free of variation. As a result, domains having a uniform electrical resistance are obtained. In particular, a case in which the above-mentioned relationship between the $\mu$ and the $\sigma$ is such that "the ratio $\sigma/\mu$ is 0 or more and 0.25 or less" is particularly preferred because domains having a more uniform electrical resistance are obtained, and hence the effects according to the present disclosure tend to be further improved.

To set the ratio $\sigma/\mu$ to a low value, the number and amount of the portions formed of the electro-conductive particles in each of the domains are preferably increased, and the sizes of the domains are preferably uniformized.

Herein, the $\mu$ is preferably 20% or more and 40% or less. As described later, when the $\mu$ is less than 20%, the amount of the electro-conductive particles is necessarily small, and hence there occurs, for example, a case in which electrical connection between the electro-conductive particles in each of the domains becomes unstable in terms of percolation. Meanwhile, when the $\mu$ is more than 40%, the amount of the electro-conductive particles in each of the domains increases, and hence there occurs, for example, a case in which it becomes difficult to confine the electro-conductive particles in the domain. In addition, as described later, the inventors have found that an increase in loading amount of the electro-conductive particles in each of the domains improves the effects according to the present disclosure. The $\mu$ is more preferably 23% or more, still more preferably 28% or more.

In addition, the above-mentioned unit cubes 3 $\mu$m on a side each contain 10 vol % to 40 vol % of the domains, and the sample cubes are uniformly present in the entirety of the electro-conductive layer. Accordingly, a configuration in which the electro-conductive domains are arranged in the electro-conductive layer in a three-dimensionally even and dense manner is obtained. As described later, also when the total volume of the domains is increased, the ratio at which the domains are uniformly present in the entirety of the electro-conductive layer tends to be higher. In addition, even when the total volume of the domains is kept constant, the ratio at which the domains are uniformly present in the entirety of the electro-conductive layer tends to be drastically increased by reducing the sizes of the domains and increasing the number thereof.

In other words, as the number of the unit cubes 3 $\mu$m on a side each satisfying the above-mentioned requirement (B1) increases, the effects according to the present disclosure become higher. Accordingly, the number of the unit cubes each having a Vd of from 2.7 $\mu$m$^3$ to 10.8 $\mu$m$^3$ out of the 27 unit cubes is preferably 20 or more, more preferably 22 or more, still more preferably 25 or more.

To continuously form the electro-conductive path from the electro-conductive support to the surface of the electro-conductive layer, the domains need to be three-dimensionally arranged. In other words, the continuation of the electro-conductive path from the electro-conductive support to the surface of the electro-conductive layer cannot be accurately formed merely by controlling the arrangement of the domains in a certain two-dimensional section. The phrase "conductive path is continuous" as used herein refers to a state in which charge can efficiently move (e.g., hopping conduction, tunnel conduction, or band conductivity) between the domains for forming the electro-conductive path along with a desired applied voltage. In a three-dimensional evaluation, a distance between the adjacent wall surfaces of the domains is particularly preferably 2.0 $\mu$m or less, though the preferred value varies depending on the applied voltage to be used, the thickness of the electro-conductive layer, and the electrical resistances of the domains and the matrix.

The electrophotographic electro-conductive member according to this aspect may be formed through, for example, a method including the following steps (i) to (iv):

step (i): a step of preparing a rubber composition for forming a domain (hereinafter also referred to as "CMB") containing carbon black and the second rubber;

step (ii): a step of preparing a rubber composition for forming a matrix (hereinafter also referred to as "MRC") containing the first rubber;

step (iii): a step of kneading the CMB and the MRC to prepare a rubber composition having a matrix-domain structure; and step (iv): a step of forming a layer of the rubber composition prepared in the step (iii) on the electro-conductive support directly or through any other layer, followed by the curing (crosslinking) of the layer of the rubber composition to form the electro-conductive layer according to this aspect.

In addition, the configuration (i) to the configuration (iii) may be controlled by, for example, selecting the materials to be used in the respective steps and adjusting production conditions. Description is given below.

First, with regard to the configuration (i), the volume resistivity of the matrix is determined by the composition of the MRC. At least one kind of rubber having low conductivity, such as a natural rubber, a butadiene rubber, a butyl rubber, an acrylonitrile-butadiene rubber, a urethane rubber, a silicone rubber, a fluorine rubber, an isoprene rubber, a chloroprene rubber, a styrene-butadiene rubber, an ethylene-propylene rubber, or a polynorbornene rubber, may be used as the first rubber to be used for the MRC. In addition, on the assumption that the volume resistivity of the matrix can be set within the above-mentioned range, a filler, a processing aid, a crosslinking agent, a crosslinking aid, a crosslinking accelerator, a crosslinking accelerator aid, a crosslinking retarder, an age resistor, a softening agent, a dispersant, or a colorant may be added to the MRC as required. Meanwhile, to set the volume resistivity of the matrix within the above-mentioned range, it is preferred that an electron conductive agent such as carbon black be not incorporated into the MRC.

In addition, the configuration (ii) may be adjusted by the amount of the electron conductive agent in the CMB. A case in which conductive carbon black having a DBP oil absorption of 40 cm$^3$/100 g or more and 170 cm$^3$/100 g or less is used as the electron conductive agent is given as an example. That is, the configuration (ii) may be achieved by preparing the CMB so that the CMB may contain 40 mass % or more and 200 mass % or less of the electro-conductive carbon black with respect to the total mass of the CMB.

Further, with regard to the configuration (iii), the control of the following four items (a) to (d) is effective:

(a) a difference between interfacial tensions σ of the CMB and the MRC;

(b) a ratio ($\eta m/\eta d$) between a viscosity ($\eta d$) of the CMB and a viscosity ($\eta m$) of the MRC;

(c) a shear rate (γ) at the time of kneading of the CMB and the MRC and an energy amount (EDK) at the time of shearing in the step (iii); and (d) a volume fraction of the CMB with respect to the MRC in the step (iii).

(a) Interfacial Tension Difference Between CMB and MRC

In general, when two kinds of immiscible rubbers are mixed with each other, phase separation occurs. The reason for this is as described below. The interaction between similar polymers is stronger than that between dissimilar polymers, and hence the similar polymers are aggregated with each other to decrease free energy, thereby being stabilized. The interface of a phase separation structure is brought into contact with the dissimilar polymers, and hence the free energy thereof becomes higher than that of the inside that is stabilized due to the interaction between the similar polymers.

As a result, an interfacial tension for reducing an area that is brought into contact with the dissimilar polymers is generated in order to reduce the free energy of the interface. When the interfacial tension is small, even the dissimilar polymers attempt to be uniformly mixed with each other in order to increase entropy. A uniformly mixed state refers to dissolution, and a solubility parameter (SP) value serving as a guideline for solubility and the interfacial tension tend to correlate with each other.

Specifically, it is conceived that the interfacial tension difference between the CMB and the MRC correlates with an SP value difference between the rubbers in the CMB and the MRC. Such rubbers that the absolute value of a difference between their solubility parameters falls within the following ranges are preferably selected as the first rubber in the MRC and the second rubber in the CMB: preferably 0.4 $(J/cm^3)^{0.5}$ or more and 5.0 $(J/cm^3)^{0.5}$ or less, particularly preferably 0.4 $(J/cm^3)^{0.5}$ or more and 2.2 $(J/cm^3)^{0.5}$ or less. When the value falls within such ranges, a stable phase separation structure can be formed, and the domain diameter D of the CMB can be reduced.

Herein, specific examples of the second rubber that may be used for the CMB include the following rubber materials: a natural rubber (NR), an isoprene rubber (IR), a butadiene rubber (BR), a styrene-butadiene rubber (SBR), a butyl rubber (IIR), an ethylene-propylene rubber (EPM, EPDM), a chloroprene rubber (CR), a nitrile rubber (NBR), a hydrogenated nitrile rubber (H-NBR), a silicone rubber, and a urethane rubber (U). At least one kind thereof may be used.

The thickness of the electro-conductive layer is not particularly limited as long as the target function and effect of the electrophotographic electro-conductive member are obtained. The thickness of the electro-conductive layer is preferably set to at least 100 μm (0.1 mm) or more. In particular, the thickness is set to preferably 0.3 mm or more, more preferably 1.0 mm or more. In addition, the thickness is preferably set to 4.5 mm or less.

<Method of Measuring SP Value>

The SP value can be calculated with satisfactory accuracy by creating a calibration curve through use of a material having a known SP value. A catalog value of a material manufacturer may also be used as the known SP value. For example, the SP value of each of a NBR and a SBR is substantially determined from the content ratio of acrylonitrile or styrene independently of its molecular weight. Accordingly, the rubbers forming the matrix and the domains are each analyzed for the content ratio of acrylonitrile or styrene through use of an analysis procedure, such as pyrolysis gas chromatography (Py-GC) or solid-state NMR. Then, the SP value can be calculated based on the content ratio from a calibration curve obtained from a material having a known SP value. In addition, the SP value of an isoprene rubber is determined based on the structures of isomers, such as 1,2-polyisoprene, 1,3-polyisoprene, 3,4-polyisoprene, cis-1,4-polyisoprene, trans-1,4-polyisoprene, and the like. Accordingly, as in the SBR and the NBR, the SP value of the isoprene rubber can be calculated from the material having a known SP value by analyzing its isomer content ratio through, for example, the Py-GC and the solid-state NMR.

(b) Viscosity Ratio Between CMB and MRC

When the viscosity ratio ($\eta d/\eta m$) between the CMB and the MRC is closer to 1, the maximum Feret diameter of each of the domains can be reduced. Specifically, it is preferred that the viscosity ratio be 1.0 or more and 2.0 or less. The viscosity ratio between the CMB and the MRC may be adjusted by selecting the Mooney viscosity of a raw material rubber to be used for each of the CMB and the MRC, or selecting the kind and blending amount of a filler. In addition, the viscosity ratio may be adjusted also by adding a plasticizer such as paraffin oil to such a degree as not to hinder the formation of the phase separation structure. In addition, the viscosity ratio may be adjusted by adjusting the temperature at the time of kneading. The viscosity of each of the CMB and the MRC is obtained by measuring a Mooney viscosity ML(1+4) at a rubber temperature at the time of kneading in accordance with JIS K6300-1:2013.

(c) Shear Rate at Time of Kneading of MRC and CMB and Energy Amount at Time of Shearing When the shear rate at the time of kneading of the MRC and the CMB is higher, and when the energy amount at the time of shearing is larger, the interdomain distance can be reduced.

The shear rate may be increased by increasing the inner diameter of a stirring member, such as a blade or a screw, of a kneader to reduce a gap from the end surface of the stirring member to the inner wall of the kneader, or by increasing the rotation speed of the stirring member. In addition, the energy amount at the time of shearing may be increased by increasing the rotation speed of the stirring member, or by increasing the viscosity of each of the first rubber in the CMB and the second rubber in the MRC.

(d) Volume Fraction of CMB with Respect to MRC

The volume fraction of the CMB with respect to the MRC correlates with the collision coalescence probability of the CMB with respect to the MRC. Specifically, when the volume fraction of the CMB with respect to the MRC is reduced, the collision coalescence probability of the CMB with respect to the MRC is decreased. That is, the interdomain distance can be reduced by reducing the volume fraction of the domains in the matrix within a range in which the required conductivity is obtained. In addition, the volume fraction of the CMB with respect to the MRC is preferably set to 15% or more and 40% or less.

<Shapes of Domains>

The shapes of the domains observed in a section of the electro-conductive layer are each preferably close to a circular shape. The ratio of the area of each of the domains to the area of a circle corresponding to the maximum Feret diameter of the domain is preferably 0.6 or more and 1 or less. The maximum value of the ratio is 1, and a state in which the ratio is 1 means that the domain is a true circle. When the ratio between the areas is less than 0.6, the shape of the domain has anisotropy, that is, the anisotropy of an electric field is expressed. Thus, an electric field concentration point is formed, and hence the concentration of charge transportation occurs. Accordingly, electrification having high durability is liable to occur. As the ratio between the areas approaches 1, the electric field concentration is suppressed, and hence a fogged image hardly occurs.

The maximum Feret diameter is a value obtained as follows: the outer periphery of the observed domain is sandwiched between 2 parallel lines; the 2 parallel lines are connected to each other with a perpendicular; and when the length of the perpendicular becomes longest, the length is adopted as the diameter. In addition, the circle corresponding to the maximum Feret diameter is a circle whose diameter is the maximum Feret diameter.

<Methods of Measuring Domain Area S1 and Area S2 of Circle Corresponding to Maximum Feret Diameter>

The shapes of the domains may be quantified from an image of a section of the electro-conductive layer by the same approach as the above-mentioned approach to measuring the sizes of the domains or the interdomain distance. Specifically, the domain area and maximum Feret diameter of each of the domains in a binary image of the section of the electro-conductive layer are calculated with image processing software by the same method as the above-mentioned method of measuring the domain sizes. Next, the ratio of an actual domain area S1 to the area S2 of a circle corresponding to the maximum Feret diameter, the area being obtained from the maximum Feret diameter, only needs to be determined.

In the measurement of the S1 and the S2, one flaky sample is cut out of each of regions obtained by evenly dividing the developing member, preferably evenly dividing the member into 20 sections, and the above-mentioned measured values thereof are obtained. After that, the arithmetic average of the S1s or S2s of the total of 20 samples only needs to be adopted as the measured value of the S1 or the S2.

In the case of a columnar developing member, one flaky sample is cut out of each of regions obtained by dividing the columnar developing member into 4 sections in its circumferential direction and into 5 sections in its longitudinal direction, and the above-mentioned measured values thereof are obtained. After that, the arithmetic average of the S1s or S2s of the total of 20 samples only needs to be adopted as the measured value of the S1 or the S2.

In addition, in order that the effects according to the present disclosure may be more efficiently exhibited by suppressing a fluctuation in resistance and electric field concentration due to the aggregation of the electron conductive agent, the electro-conductive layer preferably satisfies the following requirements. In other words, when the length of the electro-conductive layer in its longitudinal direction is represented by L, attention is paid to sections of the electro-conductive layer in its thickness direction at the following 3 sites: the center of the electro-conductive layer in the longitudinal direction; and sites distant from both the ends of the electro-conductive layer toward the center by L/4 each. When the thickness of the electro-conductive layer is represented by T, 15-micrometer square observation regions are placed at 3 arbitrary sites in a thickness region corresponding to a depth of from 0.1 T to 0.9 T from the outer surface of the electro-conductive layer for each of the sections. Then, 80 number % or more of the domains observed in each of the total of 9 observation regions each preferably satisfy the following requirement (B2) and requirement (B3).

Requirement (B2)

The ratio of the sectional area of the electro-conductive particles in each of the domains to the sectional area of the domain is 20% or more.

Requirement (B3)

When the perimeter of each of the domains is represented by A, and the envelope perimeter of the domain is represented by B, a ratio AB is 1.00 or more and 1.10 or less.

It can be said that the above-mentioned requirement (B2) and requirement (B3) are specifications concerning the shapes of the domains. The "shapes of the domains" are defined as the sectional shapes of the domains appearing in a section of the electro-conductive layer in the thickness direction. In the case of a columnar conductive member, when the length of the electro-conductive layer of the member in its longitudinal direction is represented by L, and the thickness of the electro-conductive layer is represented by T, such sections of the electro-conductive layer in its thickness direction as illustrated in FIG. 7B are obtained at the following 3 sites: the center of the electro-conductive layer in the longitudinal direction; and sites distant from both the ends of the electro-conductive layer toward the center by L/4 each. For each of the resultant sections, 15-micrometer square observation regions are placed at 3 arbitrary sites in a thickness region corresponding to a depth of from 0.1 T to 0.9 T from the outer surface of the electro-conductive layer toward the support of the member. The domain shapes are defined by the shapes of the respective domains observed in each of the total of 9 observation regions.

The shapes of the domains are each preferably a shape whose peripheral surface is free of unevenness. When the number of uneven structures concerning the shape is reduced, the nonuniformity of an electric field between the domains can be reduced. In other words, the number of sites at which electric field concentration occurs is reduced, and hence a phenomenon in which more charge transportation than necessary occurs in the matrix can be reduced.

The inventors have obtained a finding that the amount of the electron conductive agent (conductive particles) in one domain affects the outer shape of the domain. That is, the inventors have obtained a finding that as the loading amount of the electro-conductive particles in one domain increases, the shape of the domain becomes closer to a sphere. As the number of the domains close to spheres increases, the number of points at which electron exchange between the domains concentrates can be reduced. In addition, according to an investigation by the inventors, such a domain as described below may have a shape closer to a sphere, though a reason therefor is unclear: the ratio of the total sum of the sectional areas of the electro-conductive particles observed in a section of the domain is 20% or more with respect to the area of the section. The foregoing is preferred because the domain may thus have an outer shape that can significantly alleviate the concentration of the electron exchange between the domains. Specifically, the ratio of the sectional area of the electro-conductive particles in each of the domains to the sectional area of the domain is preferably 20% or more.

The inventors have found that with regard to the shape of the domain whose peripheral surface is free of unevenness, the following formula (8) is preferably satisfied:

$$1.00 \leq A/B \leq 1.10 \tag{8}$$

where A represents the perimeter of the domain and B represents the envelope perimeter of the domain.

Figure 6:
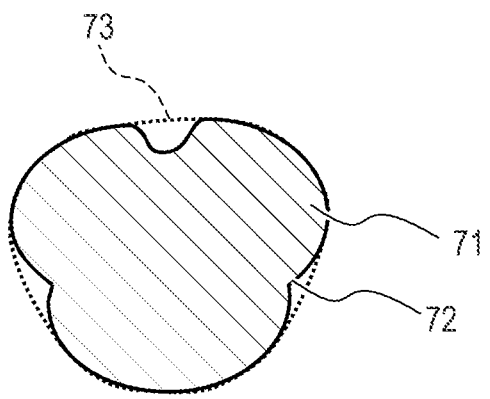
FIG. 6 is an explanatory view of an envelope perimeter.

The formula (8) represents the ratio of the perimeter A of the domain to the envelope perimeter B of the domain. The term "envelope perimeter" as used herein refers to the length of the convex envelope 73 of a domain 71 observed in an observation region as illustrated in FIG. 6. The convex envelope is the minimum convex set including all points in the domain 71.

The minimum value of the ratio of the perimeter of each of the domains to the envelope perimeter of the domain is 1, and a state in which the ratio is 1 means that the domain is a shape whose sectional shape is free of any concave shape, such as a true circle or an ellipse. When the ratio between the perimeters is more than 1.1, a large uneven shape is present on the domain, that is, the anisotropy of an electric field is expressed.

As specified in the requirement (B2), when the electro-conductive particles are loaded into each of the domains at a high density, the outer shape of the domain can be brought closer to a sphere. In addition, as specified in the requirement (B3), the domain can be reduced in unevenness.

To obtain such a domain into which the electro-conductive particles are loaded at a high density as specified in the requirement (B2), carbon black having a DBP oil absorption of 40 cm$^3$/100 g or more and 80 cm$^3$/100 g or less may be particularly suitably used as the electro-conductive particles. The DBP oil absorption (cm$^3$/100 g) is the volume of dibutyl phthalate (DBP) that can be adsorbed by 100 g of the carbon black, and the DBP oil absorption is measured in accordance with Japanese Industrial Standard (JIS) K 6217-4:2017 (Carbon black for rubber industry-Fundamental characteristics-Part 4: Determination of oil absorption number (OAN) and oil absorption number of compressed sample (COAN)). In general, carbon black has a tufted higher-order structure in which primary particles having an average particle diameter of 10 nm or more and 50 nm or less aggregate. The tufted higher-order structure is called a structure, and the degree to which the structure is of a high order is quantified in terms of DBP oil absorption (cm$^3$/100 g).

In general, carbon black having a developed structure has a high reinforcing property for a rubber, and hence the capture of the carbon black in the rubber deteriorates. In addition, shear torque at the time of the kneading of the carbon black and the rubber becomes extremely high. Accordingly, it is difficult to increase the loading amount of the carbon black in each of the domains.

Meanwhile, conductive carbon black having a DBP oil absorption within the above-mentioned range has an undeveloped structure, and hence the aggregation of the carbon black is reduced and the dispersibility thereof in a rubber is satisfactory. Accordingly, the loading amount of the carbon black in each of the domains can be increased, and as a result, the outer shape of the domain to be obtained easily becomes closer to a sphere.

Further, in the carbon black having a developed structure, the particles of the carbon black are liable to aggregate, and the aggregate is liable to be a mass having a large uneven structure. When such aggregate is incorporated into each of the domains, a domain according to the requirement (B3) is hardly obtained. The aggregate may affect even the shape of the domain to form an uneven structure. Meanwhile, the electro-conductive carbon black having a DBP oil absorption within the above-mentioned range hardly forms an aggregate, and is hence effective in producing a domain according to the requirement (B3).

<Methods of Measuring Respective Parameters Concerning Shape of Domain>

First, a slice is produced by the same method as the method in the measurement of the volume resistivity of the matrix described above. However, the slice is produced by a section perpendicular to the longitudinal direction of the electrophotographic electro-conductive member as described below, and the shapes of the domains in the surface of the slice corresponding to a section of the electro-conductive layer in its thickness direction are evaluated. The reason for the foregoing is described below.

FIG. 7A and FIG. 7B are each a view for illustrating an electrophotographic electro-conductive member 81 as a three-dimensional shape of three axes, specifically, an X-axis, a Y-axis, and a Z-axis. In FIG. 7A and FIG. 7B, the X-axis indicates the direction parallel to the longitudinal direction (axial direction) of the electrophotographic electro-conductive member, and the Y-axis and the Z-axis each indicate the direction perpendicular to the axial direction of the electrophotographic electro-conductive member.

FIG. 7A is an image view for illustrating a state in which the electrophotographic electro-conductive member is cut out in a section 82a parallel to an XZ plane 82. The XZ plane can be rotated by 360° about the axis of the electrophotographic electro-conductive member. In consideration of the fact that the electrophotographic electro-conductive member rotates under a state of being brought into contact with the toner on its surface, and hence charge is supplied to the toner, the section 82*a* parallel to the XZ plane 82 represents the surface on which the charge supply simultaneously occurs at a certain timing. When a surface corresponding to a certain amount of the section 82*a* passes through the toner, the supply of the charge to the toner is performed.

Accordingly, the evaluation of the shapes of the domains correlating with electric field concentration in the electrophotographic electro-conductive member requires not the analysis of a section in which the charge supply simultaneously occurs at a certain instant, such as the section 82*a*, but an evaluation on a section parallel to a YZ plane 83 illustrated in FIG. 7B, which is perpendicular to the axial direction of the electrophotographic electro-conductive member and on which the evaluation of the domain shapes each including a certain amount of the section 82*a* can be performed. In this evaluation, when the length of the electro-conductive layer in the longitudinal direction is represented by L, three sections in total including the section 83*b* at the center of the electro-conductive layer in the longitudinal direction and two sections (83*a* and 83*c*) of L/4 from both ends of the electro-conductive layer to the center are selected.

In addition, regarding the observation position of each of the sections 83*a* to 83*c*, when the thickness of the electro-conductive layer is represented by T, a 15-micrometer square observation region is set at each of three arbitrary points of a thickness region having a depth of 0.1 T or more and 0.9 T or less from the outer surface of each of the slices, and measurement is performed at the nine observation positions in total.

The sections may each be formed by a method, such as a freeze fracture method, a cross polisher method, or a focused ion beam (FIB) method. In consideration of the smoothness of each of the sections and pretreatment for observation, the FIB method is preferred. In addition, to suitably perform the observation of the matrix-domain structure, pretreatment by which contrast between an electro-conductive phase and an insulating phase is suitably obtained, such as dyeing treatment or deposition treatment, may be performed.

The matrix-domain structure in the electro-conductive layer may be observed by observing the resultant slice with a scanning electron microscope (SEM) or a transmission electron microscope (TEM). Specifically, in view of, for example, the accuracy of the quantification of the areas of the domains, a SEM image is preferably obtained at a magnification of from 1,000 to 100,000.

Parameters concerning the domains may be measured by quantifying the SEM image. That is, the SEM image is subjected to 8-bit gray scaling with image processing software such as "Image-Pro Plus" (product name, manufactured by Media Cybernetics, Inc.) to provide a monochromatic image with 256 gray levels. Next, the white and black colors of the monochromatic image are inverted so that the domains in the image may whiten, followed by the setting of a threshold for the binarization of the brightness distribution of the image based on the algorithm of Otsu's discriminant analysis method. Thus, a binary image is obtained. Next, when the thickness of the electro-conductive layer is represented by T, 15-micrometer square observation regions are placed at 3 arbitrary sites in a region in the binary image corresponding to a thickness region corresponding to a depth of from 0.1 T to 0.9 T from the outer surface of the electro-conductive layer. Then, the parameters concerning the domains in the respective observation regions are measured with the counting function of the image processing software.

<Method of Measuring Sectional Area Ratio $\mu$ of Electron Conductive Agent in Domains>

The sectional area ratio of the electron conductive agent in the domains is determined as follows: for each of the domains in the above-mentioned observation regions, the sectional area S of the domain and the total sum Sc of the sectional areas of the portions each formed of the electro-conductive agent in the domain are calculated with the counting function of the above-mentioned image processing software; and then, the arithmetic average $\mu$ (%) of ratios Sc/S is calculated.

<Methods of Measuring Perimeter a and Envelope Perimeter B of Domain>

With regard to the perimeters and envelope perimeters of the domains, for each of the domains in the above-mentioned observation regions, the perimeter A and envelope perimeter B of the domain are calculated with the counting function of the above-mentioned image processing software, and the arithmetic average of the perimeter ratios AB of the domains is calculated.

<Domain Sizes>

In the domains according to this aspect, the average of the maximum Feret diameters (hereinafter also simply referred to as "domain diameters") L of the domains included in each of the domains each satisfying the configuration (ii) and the configuration (iii) listed above is preferably set to 0.1 μm or more and 5.0 μm or less.

When the average of the domain diameters L is set to 0.1 μm or more, the path along which charge moves in the electro-conductive layer can be more effectively limited to the target path. In addition, when the average of the domain diameters L is set to 5.0 μm or less, the ratio of the surface area of the domains to the total volume thereof, that is, a specific surface area can be exponentially increased, and hence the efficiency with which the charge is discharged from each of the domains can be drastically improved. Because of the foregoing reasons, the average of the domain diameters L is set to preferably 2.0 μm or less, more preferably 1.0 μm or less.

To further alleviate electric field concentration between the domains, the outer shape of each of the domains is preferably brought closer to a sphere. To that end, the domain diameters are each preferably made smaller within the above-mentioned range. A method therefor is, for example, a method including performing such control that the domain diameter of the CMB is reduced in the step of kneading the MRC and the CMB, followed by the performance of phase separation between the MRC and the CMB to prepare a rubber mixture in which the domain of the CMB is formed in the matrix of the MRC. A reduction in domain diameter of the CMB increases the specific surface area of the CMB to increase the area of the interface thereof with the matrix. Accordingly, a tension attempting to reduce a tension at the interface of the domain of the CMB with the matrix acts on the interface. As a result, the outer shape of the domain of the CMB becomes closer to a sphere.

In relation to the configuration (iii), to uniformize the interdomain distances, it is effective to reduce the domain sizes in accordance with the formulae (4) to (7). Further, the uniformity is dominated by where the kneading step is stopped in the following process: in the kneading step, the raw material rubber for the domains splits to gradually reduce the particle diameter of the matrix-domain structure. Accordingly, the uniformity of the interdomain distances can be controlled by a kneading time in the kneading step and a kneading revolution number serving as an index of the strength of the kneading. As the kneading time becomes longer, and the kneading revolution number becomes larger, the uniformity of the interdomain distances can be improved.

Uniformity of Domain Sizes;

The domain sizes are preferably as uniform as possible, in other words, the particle size distribution of the domains is preferably as narrow as possible. When the distribution of the sizes of the domains through which charge passes in the electro-conductive layer is uniformized, the concentration of the charge in the matrix-domain structure is suppressed, and hence the ease with which the charge is discharged can be effectively improved over the entire surface of the electrophotographic electro-conductive member. With regard to the uniformity of the domain sizes, the ratio σd/D of the standard deviation σd of the domain sizes to the average D of the domain sizes is preferably 0 or more and 0.4 or less. The domain sizes are obtained from 50-micrometer square observation regions at 3 arbitrary sites in a thickness region corresponding to a depth of from 0.1 T to 0.9 T from the outer surface of the electro-conductive layer toward the support of the member in a section in which the charge is transported, that is, a section of the electro-conductive layer in its thickness direction.

To improve the uniformity of the domain sizes, when the domain sizes are reduced in accordance with the formulae (4) to (7) as in the above-mentioned approach to improving the uniformity of the interdomain distances, the uniformity of the domain sizes is also improved. Further, the uniformity is dominated by where the kneading step is stopped in the following process: in the kneading step, the raw material rubber for the domains splits to gradually reduce the particle diameter of the matrix-domain structure. Accordingly, the uniformity of the domain sizes can be controlled by the kneading time in the kneading step and the kneading revolution number serving as an index of the strength of the kneading. As the kneading time becomes longer, and the kneading revolution number becomes larger, the uniformity of the domain sizes can be improved.

<Method of Recognizing Matrix-Domain Structure>

The presence of the matrix-domain structure in the electro-conductive layer can be recognized by detailed observation of a section formed in a thin piece produced from the electro-conductive layer.

Examples of means for flaking include a sharp razor, a microtome, and a FIB. In addition, to perform more accurate observation of the matrix-domain structure, the thin piece for observation may be subjected to pretreatment by which contrast between the domains each serving as an electro-conductive phase and the matrix serving as an insulating phase is suitably obtained, such as dyeing treatment or deposition treatment.

The presence of the matrix-domain structure can be recognized by observing the section of the thin piece, which has formed therein the section and is subjected to the pretreatment as required, with a laser microscope, a scanning electron microscope (SEM), or a transmission electron microscope (TEM). The observation is preferably performed with a scanning electron microscope (SEM) serving as an approach by which the matrix-domain structure can be simply and accurately recognized.

The thin piece of the electro-conductive layer is obtained by the above-mentioned procedure, and an image obtained by observing the surface of the thin piece at a magnification of from 1,000 to 10,000 is acquired. After that, the image is subjected to 8-bit gray scaling through use of image processing software such as "ImageProPlus" (product name: manufactured by Media Cybernetics) to obtain a monochromatic image with 256 gray levels. Next, the black and white of the image are subjected to inversion processing so that the domain in the section becomes white and binarized. Thus, an analyzed image is acquired. The presence or absence of the matrix-domain structure can be judged from the analyzed image subjected to image processing to be brought into a state in which the domains and the matrix are distinguished from each other by the binarization.

Specifically, for example, when such a structure that the plurality of domains are present in an isolated state in the matrix as illustrated in FIG. 5 can be recognized in the analyzed image, it can be judged that the matrix-domain structure is present in the electro-conductive layer. The phrase "domains are present in an isolated state in the matrix" means, for example, a state in which the domains are each free from being connected to any other domain, the matrix communicates in the image, and the domains are separated from each other by the matrix.

Such recognition as described above only needs to be performed on the slices produced from a total of 20 points arbitrarily selected one by one from each of regions obtained by: evenly dividing the electro-conductive layer of the electrophotographic electro-conductive member into 5 equal parts in its longitudinal direction; and evenly dividing the layer into 4 equal parts in its circumferential direction.

In this aspect, when the electrophotographic electro-conductive member is used as a developing member, the surface layer is characterized by having a volume resistivity under an environment having a temperature of 23° C. and a relative humidity of 50% of from $1.0 \times 10^4$ Ω·cm to $1.0 \times 10^{15}$ Ω·cm. The surface layer has a function of applying triboelectric charging to the toner, and also has a function of protecting the surface of the developing member and suppressing wear and failure of the surface of the developing member. The volume resistivity of the surface layer may be adjusted by adding an electron conductive agent or an ion conductive agent to the resin component serving as a binder. The binder resin functions as a carrier for an electron conductive agent, an ion conductive agent, a filler, and an additive.

Known resins may be used as the binder resin component and is not particularly limited, but examples thereof include the following resins. Those resins may be used alone or in combination thereof.

Specific examples thereof include a polyurethane resin, a polyester resin, a polyether resin, an acrylic resin, an epoxy resin, an amino resin such as melamine, an amide resin, an imide resin, an amide imide resin, a phenol resin, a vinyl resin, a silicone resin, a fluorine resin, a polyalkylene imine resin, and a polycarbonate resin.

A polyurethane resin is particularly preferred from the viewpoints of film strength and toner chargeability. Of those, a thermosetting polyether polyurethane resin, a polyester polyurethane resin, and a polycarbonate resin are suitably used because the resins also have flexibility. Those thermosetting polyurethane resins are each obtained by a reaction between a known polyether polyol, polyester polyol, or polycarbonate polyol and an isocyanate compound.

Examples of the polyether polyol include polyethylene glycol, polypropylene glycol, and polytetramethylene glycol.

In addition, examples of the polyester polyol include polyester polyols each obtained by a condensation reaction between a diol component, such as ethylene glycol, 1,2-propanediol, 1,4-butanediol, 1,6-hexanediol, 3-methyl-1,4-pentanediol, or neopentyl glycol, or a triol component such as trimethylolpropane, and a dicarboxylic acid, such as succinic acid, adipic acid, phthalic anhydride, terephthalic acid, or hexahydroxyphthalic acid.

In addition, examples of the polycarbonate polyol include polycarbonate polyols each obtained by a condensation reaction between a diol component, such as 1,3-propanediol, 1,4-butanediol, 1,6-hexanediol, 1,8-octanediol, 1,9-nonanediol, 2-methyl-1,8-octanediol, 3-methyl-1,5-pentanediol, diethylene glycol, polyethylene glycol, polypropylene glycol, or polytetramethylene glycol, and phosgene, a dialkyl carbonate such as or dimethyl carbonate, or a cyclic carbonate such as ethylene carbonate.

Those polyol components may each form a prepolymer having a chain extended in advance with an isocyanate, such as 2,4-tolylene diisocyanate (TDI), 1,4diphenylmethane diisocyanate (MDI), or isophorone diisocyanate (IPDI), as required.

The isocyanate compound to be subjected to a reaction with each of those polyol components is not particularly limited, but there may be used, for example: aliphatic polyisocyanates, such as ethylene diisocyanate and 1,6-hexamethylene diisocyanate (HDI); alicyclic polyisocyanates, such as isophorone diisocyanate (IPDI), cyclohexane 1,3-diisocyanate, and cyclohexane 1,4-diisocyanate; aromatic isocyanates, such as 2,4-tolylene diisocyanate, 2,6-tolylene diisocyanate (TDI), 4,4'-diphenylmethane diisocyanate (MDI), polymeric diphenylmethane diisocyanate, xylylene diisocyanate, and naphthalene diisocyanate; and copolymers, isocyanurates, TMP adducts, biurets, and blocks thereof.

Of those, aromatic isocyanates, such as tolylene diisocyanate, diphenylmethane diisocyanate, and polymeric diphenylmethane diisocyanate, are more suitably used.

The mixing ratio of the isocyanate compound to be subjected to a reaction with the polyol component is preferably such that the ratio of the isocyanate group falls within a range of from 1.0 to 2.0 with respect to 1.0 of a hydroxy group because residual unreacted components can be suppressed.

When a urethane resin is used as the binder resin for the surface layer, the urethane group concentration is preferably 1.5% or more and 6.5% or less. A case in which the urethane group concentration is 1.5% or more is preferred from the viewpoint of durability because the film strength of the surface layer is high by virtue of the interaction between the urethane groups. In addition, when the urethane group concentration is 6.5% or less, there are few excessive urethane groups serving as affinity sites with water molecules. Accordingly, when the electrophotographic electro-conductive member is alternately used under a high-temperature and high-humidity environment, and a low-temperature and low-humidity environment, the expansion and contraction of the surface layer hardly occur. As a result, even when the electrophotographic electro-conductive member is used under a severe environment, the occurrence of a fine crack at an interface between the surface layer and conductive layer of the electrophotographic electro-conductive member can be suppressed, and hence a further improvement in durability thereof can be achieved.

In addition, a case in which the surface layer 4 contains urethane resins having structures of the structural formulae (1) to (3) is particularly preferred because the durability can be further improved even in use under a severe environment.

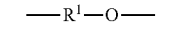
Structure formula (1)

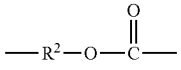
Structure formula (2)

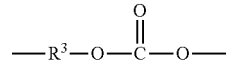
Structure formula (3)

In the structural formulae (1) to (3), $R^1$ to $R^3$ each independently represent a divalent hydrocarbon group having a straight chain or a branched chain having 4 or more and 8 or less carbon atoms.

The structures of the structural formulae (1) to (3) specifically represent an ether structure, an ester structure, and a carbonate structure having a large number of carbon atoms, respectively. The resins containing those structures have a large number of carbon atoms, and hence the amounts of ether bonds, ester bonds, and carbonate bonds contained per unit weight are small. Accordingly, the affinity with water molecules in the resin is lowered, and the water content can be kept low even under a high-temperature and high-humidity environment.

In particular, it is preferred to subject the polyols having the structures of the structural formulae (1) to (3) to a reaction with an isocyanate compound to obtain desired urethane resins. As a result, even when the electrophotographic electro-conductive member is used alternately under a high-temperature and high-humidity environment and a low-temperature and low-humidity environment, the expansion and contraction of the surface layer can be suppressed, and hence higher durability is obtained even in use under a severe environment.

Examples of the polyol having the structure of the structural formula (1) include polytetramethylene glycol, polyhexamethylene glycol, polyoctamethylene glycol, and a ring-opening copolymerized polyol of tetrahydrofuran and 3-methyltetrahydrofuran.

Examples of the polyol having the structure of the structural formula (2) include polyester polyols each obtained by a condensation reaction between a diol component, such as 1,4-butanediol, 1,6-hexanediol, 1,8-octanediol, 3-methyl-1,4-pentanediol, or neopentyl glycol, or a triol component such as trimethylolpropane, and a dicarboxylic acid, such as adipic acid, pimelic acid, suberic acid, azelaic acid, or sebacic acid.

Examples of the polyol having the structure of the structural formula (3) include polycarbonate polyols each obtained by a condensation reaction between a diol component, such as 1,4-butanediol, 1,6-hexanediol, 1,8-octanediol, 3-methyl-1,4-pentanediol, or neopentyl glycol, and phosgene or a dialkyl carbonate such as dimethyl carbonate.

In addition to the thermosetting reaction using an isocyanate compound, a compound having a vinyl group or an acryloyl group introduced to the terminal instead of the polyol may also be cured by UV light or an electron beam. In a curing system using UV light or an electron beam, a curing reaction can be performed in a shorter period of time as compared to the curing system using an isocyanate.

The electron conductive agent is appropriately blended into the surface layer for imparting conductivity thereto. Fine particles of any one of the following materials may be used as the electron conductive agent: conductive carbon black; an electro-conductive metal, such as aluminum or copper; and an electro-conductive metal oxide, such as tin oxide or titanium oxide. Of those, carbon black is preferred because carbon black is relatively easily available, and satisfactory conductivity is obtained. When carbon black is used as the electron conductive agent, it is preferred to blend carbon black in an amount of from 2 parts by mass to 50 parts by mass with respect to 100 parts by mass of the binder resin.

An ion conductive agent may be used as the electro-conductive agent, and may be used in combination with the above-mentioned electron conductive agent.

As the ion conductive agent, for example, a quaternary ammonium salt, an imidazolium salt, a pyridinium salt, a sulfonium salt, or a phosphonium salt may be used. As an anion of the ion conductive agent, there are given, for example, a perchlorate anion, a fluoroalkyl sulfonyl imide anion, a fluorosulfonyl imide anion, a trifluoromethane-sulfonate anion, a tetrafluoroborate anion, a hexafluorophosphate anion, a dicyanamide anion, a thiocyanate anion, and a dicyanosulfonyl imide anion. At least one kind thereof may be used.

The surface layer may contain a non-conductive filler, such as silica, quartz powder, titanium oxide, zinc oxide, or calcium carbonate, as required. When a method involving coating with a coating material is adopted in the formation of the surface layer, the non-conductive filler may be added to form a film forming aid. The content of the non-conductive filler is preferably 10 mass % or more and 30 mass % or less with respect to 100 parts by mass of a resin component forming the surface layer, that is, a component obtained by combining a binder resin and a resin having the structure represented by the structural formula (1).

The electrophotographic electro-conductive member may have appropriate surface roughness as required. When the electrophotographic electro-conductive member is a developing roller or a developing sleeve, the surface roughness falls preferably within a range of from 2.0 µm to 10.0 µm, particularly preferably within a range of from 2.0 µm to 4.5 µm in terms of ten-point average roughness (Rz). When the electrophotographic electro-conductive member is a developing blade, the surface roughness falls preferably within a range of from 0.0 µm to 6.0 µm, particularly preferably within a range of from 0.0 µm to 1.5 µm in terms of ten-point average roughness (Rz). When the surface roughness falls within the above-mentioned ranges, both the uniform contact with the toner and the appropriate toner conveyance amount are achieved, and charge can be easily supplied uniformly to the toner.

As a method of forming the surface roughness of the electrophotographic electro-conductive member, there are given addition of fine particles to the surface layer, polishing, mold transfer, and laser treatment. When fine particles for controlling roughness are added, the fine particles preferably have a volume average particle diameter of from 3 µm to 20 µm. In addition, the amount of particles added to the surface layer 4 is preferably from 1 part by mass to 50 parts by mass with respect to 100 parts by mass of the resin solid content of the surface layer 4. As the fine particles for controlling roughness, fine particles of a polyurethane resin, a polyester resin, a polyether resin, a polyamide resin, an acrylic resin, and a phenol resin may be used.

When the electrophotographic electro-conductive member is a roller shape, examples of a method of molding the electro-conductive layer include a method including subjecting a liquid rubber material to mold molding and a method including subjecting a kneaded rubber material to extrusion molding.

In addition, when the electrophotographic electro-conductive member has a blade shape, as a molding method therefor, there are given methods involving performing die molding, injection molding, extrusion molding, and centrifugal molding.

A method of forming the surface layer is not particularly limited, but examples thereof include spraying with a coating material, dipping, and roll coating. A dip coating method involving causing a coating material to overflow from the upper end of a dipping tank as described in Japanese Patent Application Laid-Open No. S57-5047 is simple and excellent in production stability as the method of forming the surface layer.

A case in which the electrophotographic electro-conductive member according to this aspect is used as a charging member is effective because the impartment of charge to toner or an external additive is uniformly performed.

When the toner or the external additive adheres to the charging member, in accordance with whether a voltage applied to the charging member is a negative bias or a positive bias, negative or positive charge, which is identical in sign to the applied voltage, can be gradually imparted from the outer surface of the member to the toner. The negative or positive charge is supplied from the electro-conductive support and transported to the surface of the charging member. Then, the charge reaches dirt. When the charge is sufficiently accumulated on the dirt, an electrostatic force acts in an electric field formed from the surface of the charging member toward a photosensitive drum, and exceeds an adhesive force between the surface of the member and the dirt. Thus, a "blowout" phenomenon in which the dirt peels from the surface of the member to move toward the photosensitive drum occurs. When a related-art charging member is applied to a high-speed process in a severe environment, the supply of charge to dirt cannot be sufficiently performed, and hence the blowout is suppressed. As a result, the deposition of the dirt on the charging member, and an image detrimental effect such as the occurrence of a white spot along with the deposition occur. Meanwhile, in this aspect, the transportation of the charge to the surface of the charging member is efficiently performed, and hence sufficient charge can be supplied to the dirt. Accordingly, the blowout can be sufficiently performed, and hence the deposition of the dirt on the member and the occurrence of a white spot are suppressed.

The electron conductive agent, the binder resin, the universal hardness of the surface layer, the protrusions of the surface layer derived from the electron conductive agent, roughening particles, any other additive, and the thickness of the surface layer, which are preferred when the electrophotographic electro-conductive member of this aspect is used as a charging member, are described below in the stated order.

<Electron Conductive Agent>

The surface layer preferably contains carbon black as the electron conductive agent. Quick responsiveness of the electron conductive agent enables uniform supply of charge to toner even in a high-speed process. Examples of the electron conductive agent may include the above-mentioned electron conductive agents (conductive particles). Those conductive particles may be used alone or in combination thereof. In addition, as the electro-conductive particles, composite particles in which silica particles are covered with conductive particles may also be used. As the electro-conductive particles to be used in the surface layer, carbon black is preferred. The carbon black has a low specific gravity and high conductivity, and hence conductivity to be imparted to the surface layer is easily controlled by adjusting its addition amount to the binder resin. Further, in this aspect, the carbon black is suitable because the hardness of the surface layer needs to be kept at a low value.

<Binder Resin>

As the binder resin, a known binder resin may be used. Examples thereof may include resins, and rubbers, such as natural rubbers, natural rubbers subjected to vulcanization, and synthetic rubbers. As the resin, there may be used, for example, a fluorine resin, a polyamide resin, an acrylic resin, a polyurethane resin, a silicone resin, a butyral resin, a styrene-ethylene-butylene-olefin copolymer, and an olefin-ethylene-butylene-olefin copolymer. The binder resin is preferably free of an ether bond, such as polyethylene oxide or polypropylene oxide. This is because an ether-based urethane resin can reduce the universal hardness but may not be suitable as the binder resin of this aspect because the volume resistivity of the resin is lowered. The binder resin may be used alone or in combination thereof. The binder resin is particularly preferably a resin having a carbonate structure out of those resins in order to achieve both the flexibility by reducing the universal hardness of the surface layer and an increase in resistance of the surface layer. The carbonate structure has low polarity, and hence the volume resistivity of the binder resin itself can be maintained to be high. Specifically, a polycarbonate-based polyurethane obtained by copolymerizing a polycarbonate polyol and a polyisocyanate is preferred.

Examples of the polycarbonate polyol include polynonamethylene carbonate diol, poly(2-methyl-octamethylene) carbonate diol, polyhexamethylene carbonate diol, polypentamethylene carbonate diol, poly(3-methylpentamethylene) carbonate diol, polytetramethylene carbonate diol, polytrimethylene carbonate diol, poly(1,4-cyclohexanedimethylene carbonate) diol, poly(2-ethyl-2-butyl-trimethylene) carbonate diol, and random/block copolymers thereof.

The polyisocyanate is selected from known compounds which are generally used, and examples thereof include toluene diisocyanate (TDI), diphenylmethane diisocyanate (MDI), polymeric diphenylmethane polyisocyanate, hydrogenated MDI, xylylene diisocyanate (XDI), hexamethylene diisocyanate (HDI), and isophorone diisocyanate (IPDI). Of those, aromatic isocyanates, such as toluene diisocyanate (TDI), diphenylmethane diisocyanate (MDI), and polymeric diphenylmethane polyisocyanate, are more suitably used.

<Universal Hardness of Surface Layer>

In order to suppress the generation itself of dirt substances, it is effective not to cause cracking or deformation in toner. For this purpose, it is preferred that the surface layer be flexible. As a guideline of the hardness of the electrophotographic electro-conductive member according to the present disclosure, it is preferred that the "universal hardness (t=1 μm position)" at a position of a depth of 1 μm from the surface of the surface layer be 1.0 N/mm$^2$ or more and 7.0 N/mm$^2$ or less. The size of each of the external additive and the toner is on the order of submicron to several microns, and hence it is preferred to control the hardness in the immediate vicinity of the outer surface of the surface layer, which is the contact surface with the external additive and the toner. Specifically, when the universal hardness of the surface at the time when an indenter is pushed in by 1 μm from the outer surface of the surface layer is set to 1.0 N/mm$^2$ or more, it is possible to suppress the occurrence of image density unevenness derived from the deformation of the charging roller that occurs when the charging roller and the electrophotographic photosensitive member are brought into abutment against each other in a stationary state for a long period of time. In addition, the deformation and cracking of the toner can be suppressed by setting the universal hardness to 7.0 N/mm$^2$ or less, and hence the absolute amounts of atypical toner and pulverized toner remaining on the photosensitive member can be suppressed more securely. Further, when the universal hardness is set to 5.0 N/mm$^2$ or less, the surface layer is deformed following the dirt substances. Because of this, the contact points between the protrusions caused by the electro-conductive particles exposed to the surface of the surface layer and the dirt substances are increased, and the injection efficiency of electrons from the protrusions into the dirt substances is improved.

The universal hardness of the surface of the surface layer of the charging roller is measured through use of, for example, a universal hardness meter (product name: FISCHERSCOPE HM2000XYp, manufactured by Fischer Instruments K.K.). The universal hardness is a physical property value determined by pushing an indenter into an object to be measured while applying a load, and is determined as "(test load)/(surface area of indenter under test load) (N/mm$^2$)". An indenter having a shape of, for example, a quadrangular pyramid is pushed into the object to be measured while a predetermined relatively small test load is applied, and the surface area in contact with the indenter is determined from the pushing depth at the time when the predetermined pushing depth is reached, to thereby determine the universal hardness from the above-mentioned expression.

<Protrusion on Surface Layer Derived from Electron Conductive Agent>

Figure 9:
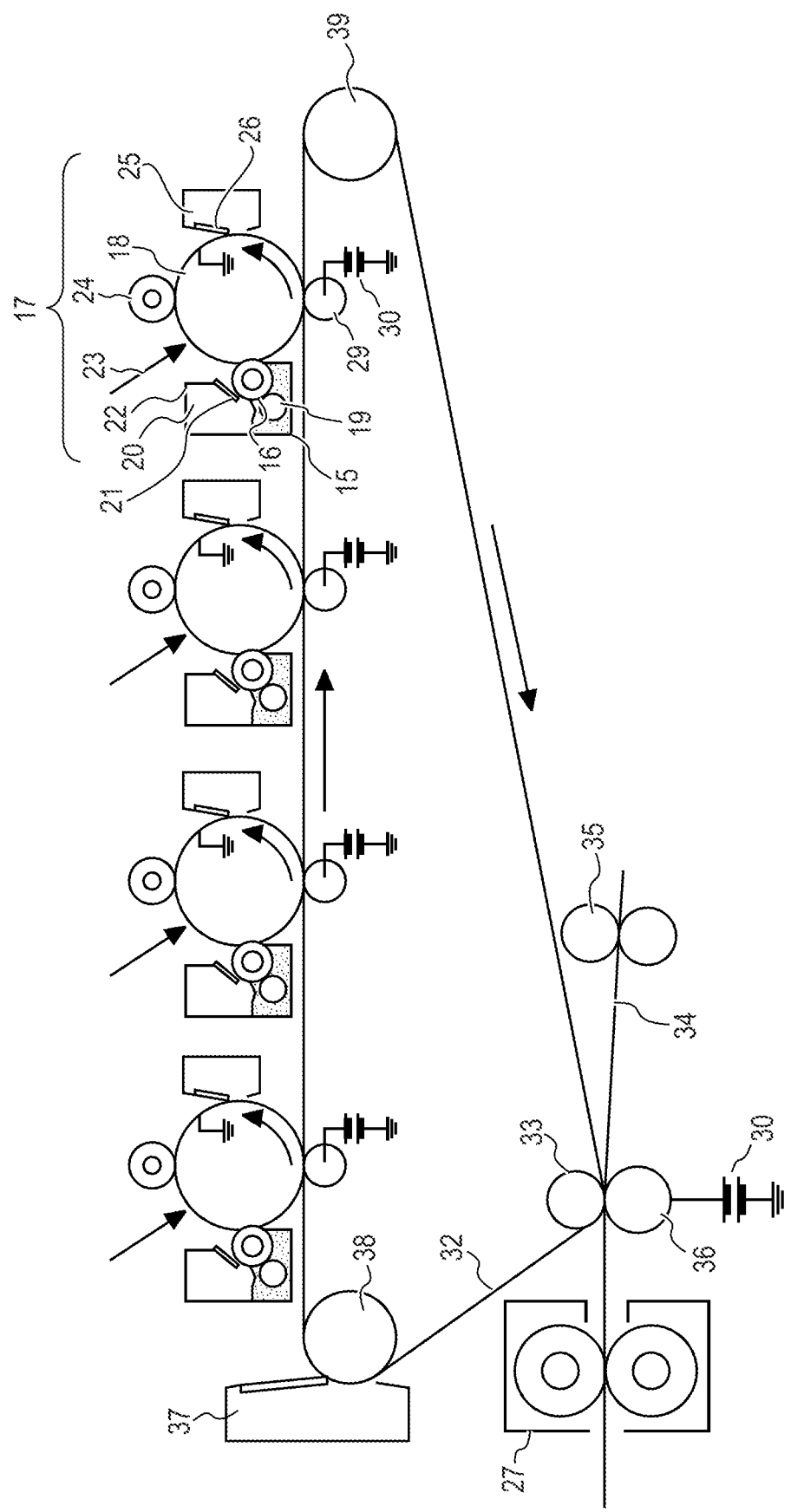
FIG. 9 is a schematic view of an electrophotographic apparatus.

In order to inject charge into dirt substances, it is preferred that a protrusion derived from an exposed part of the electron conductive agent (an electro-conductive particle) be present on the surface of the surface layer. The size of each of the protrusions derived from the exposed part of the electro-conductive particle is preferably 5.0 nm or more and 100.0 nm or less. When the size is set to 5.0 nm or more, the protrusions can function as starting points for more efficiently injecting charge into the dirt substances. In addition, when the size is set to 100.0 nm or less, the excessive injection of charge into the photosensitive member can be suppressed. As illustrated in FIG. 9, the size of each of the protrusions means an average value (number average particle diameter) of particle diameters 303 of conductive particles 301 in portions exposed from a binder resin 302. As a method of measuring the protrusion size, an image of an arbitrary 2-micrometer square region is taken through use of the SEM, and 20 particles randomly selected from the obtained image are each measured for a particle diameter, to determine an arithmetic average particle diameter.

In addition, in order to inject charge into the dirt substances through use of the protrusions derived from the electro-conductive fine particles, it is effective to control the number of the protrusions. The number of the protrusion derived from the exposed part of the electro-conductive fine particle is preferably 50 or more and 500 or less in a region of 2.0 μm in length and 2.0 μm in width (region of 4.0 μm$^2$). When the number is set to 50 or more, the number of the protrusions as the starting points for injecting charge into the dirt substances can be ensured. In addition, when the number is set to 500 or less, the injection of charge into the photosensitive member can be suppressed. The number of the protrusions may be calculated by taking an image of an arbitrary 2-micrometer square region with a scanning electron microscope (SEM) and calculating the number of conductive points from the image after binarization.

Next, a procedure for exposing the electro-conductive fine particles to the surface of the surface layer is described.

When the surface layer is formed on the electro-conductive layer of the electrophotographic electro-conductive member by a dip coating method, a skin layer is always formed on the outermost surface of the surface layer. Because of this, in order to expose the electro-conductive particles to the surface of the surface layer to cause the exposed part to generate the protrusion on the surface of the surface layer, it is effective to remove the skin layer on the outermost surface. For example, the surface skin layer formed of a binder resin is removed by performing UV treatment, a polishing method, an electrolytic polishing method, a chemical polishing method, an ion milling method, or the like. Thus, the electro-conductive particles can be exposed to the surface of the surface layer. In the present disclosure, the hardness of the surface layer is low, and hence the skin layer can be sufficiently removed to expose the electro-conductive fine particles to the surface of the surface layer even by performing the UV treatment. The UV treatment is preferred as compared to the polishing method and the like because the electro-conductive particles can be exposed to the surface of the surface layer while the damage to the surface layer is minimized.

The exposed state of the electro-conductive particles may be recognized with an atomic force microscope (AFM). A height image is acquired in a tapping mode of the AFM. In this case, the portion derived from the exposed part of the electro-conductive particle is recognized as a protrusion. When a height image is acquired under a state in which the skin layer after the dip coating is present, the protrusions are not recognized. Further, a phase image is acquired in the tapping mode of the AFM. In this case, due to the small phase shift of the electro-conductive particles and the hardness difference between the binder resin and the electro-conductive particles, an image having a significantly large density contrast difference is obtained. When a phase image is acquired under a state in which the skin layer after the dip coating is present, an image having a significantly small number of phase differences and a low contrast difference is acquired.

<Roughening Particles>

The surface layer may contain roughening particles to the extent that the effects of this aspect are not impaired. Examples of the roughening particles include: organic insulating particles, such as an acrylic resin, a polycarbonate resin, a styrene resin, a urethane resin, a fluorine resin, and a silicone resin; and inorganic insulating particles, such as titanium oxide, silica, alumina, magnesium oxide, strontium titanate, barium titanate, barium sulfate, calcium carbonate, mica, zeolite, and bentonite. The incorporation of the roughening particles into the surface layer can form protrusions derived from the roughening particles on the outer surface of the surface layer to largely deform the surface shape of the surface layer. In the present disclosure, it is preferred to use organic insulating particles having flexibility as roughening particles because the surface layer is deformed to increase contact opportunities with respect to dirt substances, such as an external additive and toner. Those particles may be used alone or in combination thereof. The number average particle diameter of the roughening particles is not particularly limited, but is about 3 μm or more and about 30 μm or less.

<Other Additive>

In this aspect, any other additive may be added to the surface layer, as required, to the extent that the effects of this aspect are not impaired. As the additive, a chain extender, a cross-linking agent, a pigment, a silicone additive, an amine and a tin complex each serving as a catalyst, and the like may be added. When the silicone additive is added to the surface layer, the resistance of the surface layer is increased and slipperiness is imparted to the surface layer to suppress the injection of charge into the photosensitive member and improve the wear resistance of the surface layer. Accordingly, it is particularly preferred that the silicone additive be added.

<Thickness of Surface Layer>

It is preferred that the surface layer have a thickness of 0.1 μm or more and 100 μm or less. The thickness is more preferably 1 μm or more and 50 μm or less. The thickness of the surface layer may be measured by cutting out an electrophotographic electro-conductive member section with a sharp blade and observing the roller section with an optical microscope or an electron microscope.

(2) Electrophotographic Apparatus

The electrophotographic electro-conductive member according to the present disclosure may be suitably used as any one of a developing roller, a charging roller, a toner-supplying roller, a developing sleeve, a transfer roller, and a developing blade in an electrophotographic apparatus serving as an electrophotographic image forming apparatus. The electrophotographic electro-conductive member may be applied to any one of a noncontact-type developing device and a contact-type developing device each using magnetic one-component toner or nonmagnetic one-component toner, and a developing device using two-component toner, and a charging device.

Figure 8:
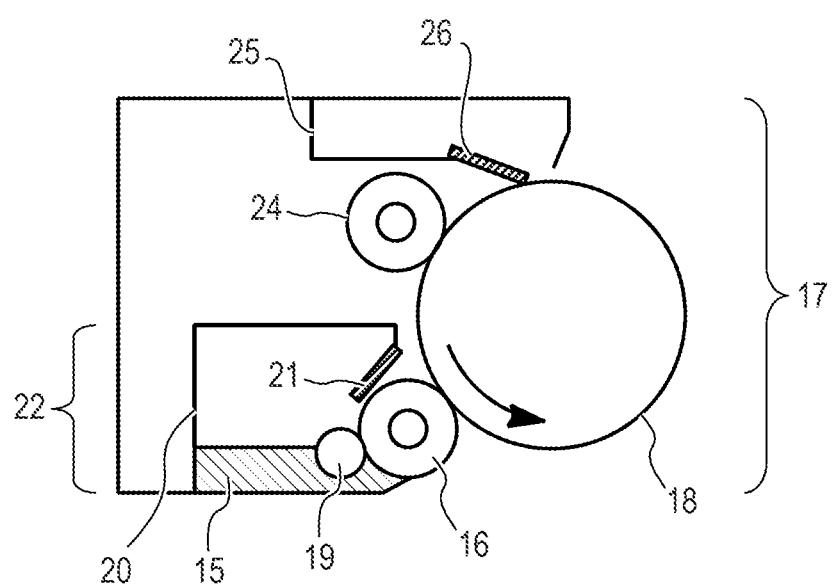
FIG. 8 is a schematic view of a process cartridge.

FIG. 8 is a schematic sectional view illustrating an example of an electrophotographic apparatus on which the electrophotographic electro-conductive member according to the present disclosure is mounted as the developing roller of a contact-type developing device using one-component toner. A developing device 22 includes: a toner container 20 storing a toner 15 as the one-component toner; a developing roller 16; a toner-supplying roller 19 for supplying the toner to the developing roller 16; and a developing blade 21 for regulating the thickness of a toner layer on the developing roller 16. The developing roller 16 is positioned in an opening portion extending in a longitudinal direction in the toner container 20, and is placed so as to be brought into contact with a photosensitive member 18. The photosensitive member 18, a cleaning blade 26, a waste toner-storing container 25, and a charging roller 24 may be arranged in the main body of the electrophotographic apparatus. The developing device 22 is prepared for the toner of each of black (Bk), cyan (C), magenta (M), and yellow (Y) colors to enable color printing.

The printing operation of the electrophotographic apparatus is described below.

The photosensitive member 18 rotates in an arrow direction, and is uniformly charged by the charging roller 24 for subjecting the photosensitive member 18 to charging treatment. Next, an electrostatic latent image is formed on the surface of the photosensitive member 18 by laser light 23 serving as exposing means. The electrostatic latent image is visualized as a toner image (development) through the application of the toner 15 from the developing roller 16 placed so as to be brought into contact with the photosensitive member 18 by the developing device 22. The development is so-called reversal development in which the toner image is formed in an exposed portion. The toner image formed on the photosensitive member 18 is transferred onto an intermediate transfer member 32 having an endless belt shape by a transfer roller 29 serving as a transferring member.

Paper 34 serving as a recording medium is fed into the apparatus by a sheet-feeding roller 35 and a secondary transfer roller 36, and is conveyed to a nip portion between the secondary transfer roller 36 and a driven roller 33 together with the intermediate transfer member 32 having the toner image. Thus, the toner image is transferred onto the paper 34. The intermediate transfer member 32 is operated by the driven roller 33, a driver roller 39, and a tension roller 38. The toner remaining on the intermediate transfer member 32 is cleaned off by a cleaning device 37.

A voltage is applied from a bias power source 30 to each of the developing roller 16, the developing blade 21, the transfer roller 29, and the secondary transfer roller 36. The paper 34 having transferred thereonto the toner image is subjected to fixation treatment by a fixing device 27, and is discharged to the outside of the apparatus. Thus, the printing operation is completed. Meanwhile, transfer residual toner remaining on the photosensitive member 18 without being transferred is scraped off by the cleaning blade 26 serving as a cleaning member for cleaning the surface of the photosensitive member, and is stored in the waste toner-storing container 25. The cleaned photosensitive member 18 repeatedly performs the foregoing printing operation.

(3) Process Cartridge

The above-mentioned conductive member according to the present disclosure may be suitably used as any one of a developing roller, a charging roller, a toner-supplying roller, a developing sleeve, a transfer roller, and a developing blade in a process cartridge. FIG. 9 is a schematic sectional view of an example of a process cartridge according to one aspect of the present disclosure. In FIG. 9, the electrophotographic electro-conductive member is mounted as the developing roller 16. A process cartridge 17 is removably mounted onto the main body of such an electrophotographic apparatus as illustrated in FIG. 8. The process cartridge 17 is a product obtained by integrating the developing device 22 including the developing roller 16 and the developing blade 21, the photosensitive member 18, the cleaning blade 26, the waste toner-storing container 25, and the charging roller 24. The developing device 22 further includes the toner container 20, and the toner 15 is loaded into the toner container 20. The toner 15 in the toner container 20 is supplied to the surface of the developing roller 16 by the toner-supplying roller 19, and the layer of the toner 15 having a predetermined thickness is formed on the surface of the developing roller 16 by the developing blade 21.

EXAMPLES

Specific Examples and Comparative Examples according to the present disclosure are described below.

The term "phr" in the tables shown below is an abbreviation of "per hundred rubber," which represents a blending amount with respect to 100 parts by weight of a rubber.

1. Preparation of Unvulcanized Rubber Compositions for Forming Conductive Layers to be Used for Forming Conductive Layers According to Examples and Comparative Examples

[1-1] Preparation of Unvulcanized Domain Rubber Composition (CMB) E-1

Respective materials in amounts shown in Table 1 were mixed with a pressure kneader to prepare an unvulcanized domain rubber composition E-1. A 6-liter pressure kneader (product name: TD6-15MDX, manufactured by Toshin Co., Ltd.) was used as a mixer. Mixing conditions were set to a loading ratio of 70 vol %, a blade rotation speed of 30 rpm, and 16 minutes.

TABLE 1

| | Raw material name | Blending amount (parts by mass) |
|---|---|---|
| Raw material rubber | Polybutadiene rubber (product name: JSR T0700, manufactured by JSR Corporation) | 100 |
| Conductive particles | Carbon black (product name: TOKABLACK #7360, manufactured by Tokai Carbon Co., Ltd.) | 75 |
| Vulcanization accelerator aid | Zinc oxide (product name: Zinc White Type 2, manufactured by Sakai Chemical Industry Co., Ltd.) | 5 |
| Processing aid | Zinc stearate (product name: SZ-2000, manufactured by Sakai Chemical Industry Co., Ltd.) | 2 |

[1-2] Preparation of Unvulcanized Matrix Rubber Composition E-1

Respective materials in amounts shown in Table 2 were mixed with a pressure kneader to prepare an unvulcanized matrix rubber composition E-1. A 6-liter pressure kneader (product name: TD6-15MDX, manufactured by Toshin Co., Ltd.) was used as a mixer. Mixing conditions were set to a loading ratio of 70 vol %, a blade rotation speed of 30 rpm, and 16 minutes.

TABLE 2

| | Raw material name | Blending amount (parts by mass) |
|---|---|---|
| Raw material rubber | EPDM (product name: Esprene 505A, manufactured by Sumitomo Chemical Company, Limited) | 100 |
| Filler | Calcium carbonate (product name: NANOX #30, manufactured by Maruo Calcium Co., Ltd.) | 70 |
| Vulcanization accelerator aid | Zinc oxide (product name: Zinc White Type 2, manufactured by Sakai Chemical Industry Co., Ltd.) | 7 |
| Processing aid | Zinc stearate (product name: SZ-2000, manufactured by Sakai Chemical Industry Co., Ltd.) | 2.8 |

[1-3] Preparation of Unvulcanized Rubber Composition E-1 for Forming Conductive Layer The unvulcanized domain rubber composition E-1 and the unvulcanized matrix rubber composition E-1 prepared in the above-mentioned sections [1-1] and [1-2] were mixed with a pressure kneader at a ratio shown in Table 3 to obtain an unvulcanized rubber mixture. A 6-liter pressure kneader (product name: TD6-15MDX, manufactured by Toshin Co., Ltd.) was used as a mixer. Mixing conditions were set to a loading ratio of 70 vol %, a blade rotation speed of 30 rpm, and 16 minutes.

TABLE 3

| Material | Blending amount (parts by mass) |
| --- | --- |
| Unvulcanized domain rubber composition E-1 | 25 |
| Unvulcanized matrix rubber composition E-1 | 75 |

The unvulcanized rubber mixture obtained in the above-mentioned section [1-3] and other materials were mixed with an open roll at a ratio shown in Table 4 to prepare an unvulcanized rubber composition E-1 for forming an electro-conductive layer. An open roll having a roll diameter of 12 inches (0.30 m) was used as a mixer. The mixing was performed under the following conditions: the mixture was bilaterally cut 20 times in total at a front roll rotation speed of 10 rpm, a back roll rotation speed of 8 rpm, and a roll gap of 2 mm, and was then subjected to tight milling 10 times at a roll gap of 0.5 mm.

TABLE 4

| Raw material name | | Blending amount (parts by mass) |
| --- | --- | --- |
| Raw material rubber | Unvulcanized rubber mixture | 100 |
| Vulcanizing agent | Sulfur (product name: Sulfax PMC, manufactured by Tsurumi Chemical Industry Co., Ltd.) | 3 |
| Vulcanization aid | Tetrabenzylthiuram disulfide (product name: TBZTD, manufactured by Sanshin Chemical Industry Co., Ltd.) | 2 |

[2-1] Preparation of Unvulcanized Rubber Compositions E-2 to E-38 for Forming Domains

[2-2] Preparation of Unvulcanized Rubber Compositions E-2 to E-38 for Forming Matrices Unvulcanized rubber compositions E-2 to E-38 for forming domains and unvulcanized rubber compositions E-2 to E-38 for forming matrices were prepared in the same manner as the unvulcanized rubber composition E-1 for forming domains and the unvulcanized rubber composition E-1 for forming a matrix except that the kinds and blending amounts of rubbers and conductive agents were set as shown in Table 5.

TABLE 5

| | Unvulcanized rubber composition for forming domains | | | | | | | | Unvulcanized rubber composition for forming matrix | | | |
| --- | --- | --- | --- | --- | --- | --- | --- | --- | --- | --- | --- | --- |
| | Rubber | | | | Conductive agent | | | | Rubber species | | | |
| | Kind | Product name | SP value | Mooney viscosity (M) | Kind | phr | DBP absorption (mL/100 g) | pH | Kind | Product name | SP value | Mooney viscosity (M) |
| E-1 | BR | JSR T0700 | 17.1 | 72 | #7360 | 75 | 87 | 7.5 | EPDM | Esprene 505A | 16 | 47 |
| E-2 | BR | JSR T0700 | 17.1 | 64 | #5500 | 55 | 155 | 6.0 | EPDM | Esprene 505A | 16 | 47 |
| E-3 | BR | JSR T0700 | 17.1 | 72 | #7360 | 75 | 87 | 7.5 | EPDM | Esprene 505A | 16 | 47 |
| E-4 | BR | JSR T0700 | 17.1 | 72 | #7360 | 75 | 87 | 7.5 | EPDM | Esprene 505A | 16 | 47 |
| E-5 | BR | JSR T0700 | 17.1 | 72 | #7360 | 75 | 87 | 7.5 | EPDM | Esprene 505A | 16 | 47 |
| E-6 | BR | JSR T0700 | 17.1 | 72 | #7360 | 75 | 87 | 7.5 | SBR | T2003 | 17 | 45 |
| E-7 | BR | JSR T0700 | 17.1 | 72 | #7360 | 75 | 87 | 7.5 | SBR | T1000 | 16.8 | 45 |
| E-8 | BR | JSR T0700 | 17.1 | 72 | #7360 | 75 | 87 | 7.5 | SBR | T2100R | 17 | 33 |
| E-9 | BR | JSR T0700 | 17.1 | 72 | #7360 | 75 | 87 | 7.5 | SBR | A303 | 17 | 46 |
| E-10 | BR | JSR T0700 | 17.1 | 58 | #7360 | 65 | 87 | 7.5 | SBR | T2003 | 17 | 45 |
| E-11 | BR | JSR T0700 | 17.1 | 55 | #7360 | 55 | 87 | 7.5 | SBR | T2003 | 17 | 45 |
| E-12 | BR | JSR T0700 | 17.1 | 72 | #7360 | 75 | 87 | 7.5 | CR | B31 | 17.4 | 40 |
| E-13 | BR | JSR T0700 | 17.1 | 72 | #7360 | 75 | 87 | 7.5 | EPDM | Esprene 301A | 17 | 44 |
| E-14 | BR | JSR T0700 | 17.1 | 55 | #7360 | 55 | 87 | 7.5 | EPDM | Esprene 301A | 17 | 44 |
| E-15 | BR | JSR T0700 | 17.1 | 88 | #7360 | 95 | 87 | 7.5 | EPDM | Esprene 505A | 16 | 47 |
| E-16 | BR | JSR T0700 | 17.1 | 37 | #7360 | 35 | 87 | 7.5 | EPDM | Esprene 505A | 16 | 47 |
| E-17 | NBR | DN401LL | 17.4 | 50 | #7360 | 55 | 87 | 7.5 | SBR | T2003 | 17 | 45 |
| E-18 | NBR | DN401LL | 17.4 | 50 | #7360 | 55 | 87 | 7.5 | SBR | T2003 | 17 | 45 |
| E-19 | NBR | DN401LL | 17.4 | 50 | #7360 | 55 | 87 | 7.5 | SBR | T2003 | 17 | 45 |
| E-20 | NBR | DN401LL | 17.4 | 50 | #7360 | 55 | 87 | 7.5 | SBR | T2003 | 17 | 45 |
| E-21 | NBR | DN401LL | 17.4 | 45 | #7360 | 35 | 87 | 7.5 | SBR | T2003 | 17 | 45 |
| E-22 | NBR | DN401LL | 17.4 | 50 | #7360 | 55 | 87 | 7.5 | CR | B31 | 17.4 | 40 |
| E-23 | NBR | N230SV | 19.2 | 52 | #7360 | 55 | 87 | 7.5 | SBR | T2003 | 17 | 45 |
| E-24 | NBR | N230SV | 19.2 | 52 | #7360 | 55 | 87 | 7.5 | SBR | T2003 | 17 | 45 |
| E-25 | NBR | N230SV | 19.2 | 52 | #7360 | 55 | 87 | 7.5 | SBR | T2003 | 17 | 45 |
| E-26 | NBR | N230SV | 19.2 | 52 | #7360 | 55 | 87 | 7.5 | SBR | T2003 | 17 | 45 |
| E-27 | NBR | N230S | 20 | 54 | #7360 | 55 | 87 | 7.5 | SBR | T2003 | 17 | 45 |
| E-28 | NBR | N230S | 20 | 49 | #7360 | 35 | 87 | 7.5 | SBR | T2003 | 17 | 45 |
| E-29 | EPDM | Esprene 301A | 16 | 52 | #7360 | 75 | 87 | 7.5 | SBR | T2003 | 17 | 45 |
| E-30 | EPDM | Esprene 301A | 16 | 52 | #7360 | 75 | 87 | 7.5 | SBR | T2003 | 17 | 45 |
| E-31 | SBR | T2000R | 17 | 55 | #7360 | 55 | 87 | 7.5 | BR | JSR T0700 | 17.1 | 43 |
| E-32 | SBR | T2000R | 17 | 50 | #7360 | 35 | 87 | 7.5 | BR | JSR T0700 | 17.1 | 43 |
| E-33 | NBR | N232SH | 20.2 | 58 | #7360 | 55 | 87 | 7.5 | SBR | T2003 | 17 | 45 |
| E-34 | NBR | N232SH | 20.2 | 53 | #7360 | 35 | 87 | 7.5 | CR | B31 | 17.4 | 40 |
| E-35 | NBR | DN401LL | 17.4 | 50 | #7360 | 55 | 87 | 7.5 | SBR | T2003 | 17 | 45 |

TABLE 5-continued

| | Unvulcanized rubber composition for forming domains | | | | | | | | Unvulcanized rubber composition for forming matrix | | | |
|---|---|---|---|---|---|---|---|---|---|---|---|---|
| | Rubber | | | | Conductive agent | | | | Rubber species | | | |
| | Kind | Product name | SP value | Mooney viscosity (M) | Kind | phr | DBP absorption (mL/100 g) | pH | Kind | Product name | SP value | Mooney viscosity (M) |
| E-36 | NBR | DN401LL | 17.4 | 50 | #7360 | 55 | 87 | 7.5 | SBR | T2003 | 17 | 45 |
| E-37 | NBR | DN401LL | 17.4 | 50 | #7360 | 55 | 87 | 7.5 | SBR | T2003 | 17 | 45 |
| E-38 | NBR | DN401LL | 17.4 | 50 | #7360 | 55 | 87 | 7.5 | SBR | T2003 | 17 | 45 |

In Table 5, the unit of the DBP absorption is ($cm^3$/100 g).

Regarding the Mooney viscosity, the value of a raw material rubber is the catalog value of each company. Each of the values of unvulcanized rubber compositions for forming domains and unvulcanized rubber compositions for forming matrices is the Mooney viscosity ML(1+4) based on Japanese Industrial Standards (JIS) K6300-1:2013, and is measured at the rubber temperature when all the materials for forming each of the rubber compositions are kneaded. The unit is a Mooney unit (M). The unit of an SP value is $(J/cm^3)^{0.5}$. The same also applies to the following tables.

[2-3] Preparation of Unvulcanized Rubber Compositions E-2 to E-38 for Forming Conductive Layers Unvulcanized rubber compositions E-2 to E-38 for forming conductive layers were prepared in the same manner as the unvulcanized rubber composition E-1 for forming an electro-conductive layer except that the unvulcanized rubber compositions for forming domains and the unvulcanized rubber compositions for forming matrices prepared in the above-mentioned sections [2-1] and [2-2], and other materials were blended at ratios shown in Table 6. The term "blade rotation speed" in Table 6 refers to a blade rotation speed when the unvulcanized rubber composition for forming domains and the unvulcanized rubber composition for forming a matrix were mixed with a pressure kneader prior to the preparation of the unvulcanized rubber composition for forming an electro-conductive layer.

TABLE 6

| No. of unvulcanized rubber composition for forming conductive layer | Blade rotation speed rpm | Unvulcanized rubber composition | | Vulcanizing agent | | Vulcanization aid | |
|---|---|---|---|---|---|---|---|
| | | For forming domains Parts by mass | For forming matrix Parts by mass | Kind | phr | Kind | phr |
| E-1 | 30 | 15 | 85 | Sulfur | 3 | MBTS | 2 |
| E-2 | 30 | 15 | 85 | Sulfur | 3 | MBTS | 2 |
| E-3 | 30 | 25 | 75 | Sulfur | 3 | MBTS | 2 |
| E-4 | 30 | 30 | 70 | Sulfur | 3 | MBTS | 2 |
| E-5 | 30 | 40 | 60 | Sulfur | 3 | MBTS | 2 |
| E-6 | 30 | 25 | 75 | Sulfur | 3 | MBTS | 2 |
| E-7 | 30 | 25 | 75 | Sulfur | 3 | MBTS | 2 |
| E-8 | 30 | 25 | 75 | Sulfur | 3 | MBTS | 2 |
| E-9 | 30 | 25 | 75 | Sulfur | 3 | MBTS | 2 |
| E-10 | 30 | 25 | 75 | Sulfur | 3 | MBTS | 2 |
| E-11 | 30 | 25 | 75 | Sulfur | 3 | MBTS | 2 |
| E-12 | 30 | 25 | 75 | Sulfur/ZnO/MgO | 1/5/4 | ETU | 1 |
| E-13 | 30 | 25 | 75 | Sulfur | 3 | MBTS | 2 |
| E-14 | 30 | 25 | 75 | Sulfur | 3 | MBTS | 2 |
| E-15 | 30 | 25 | 75 | Sulfur | 3 | MBTS | 2 |
| E-16 | 30 | 25 | 75 | Sulfur | 3 | MBTS | 2 |
| E-17 | 30 | 15 | 85 | Sulfur | 3 | TBZTD | 1 |
| E-18 | 30 | 25 | 75 | Sulfur | 3 | TBZTD | 1 |
| E-19 | 30 | 30 | 70 | Sulfur | 3 | TBZTD | 1 |
| E-20 | 30 | 40 | 60 | Sulfur | 3 | TBZTD | 1 |
| E-21 | 30 | 25 | 75 | Sulfur | 3 | TBZTD | 1 |
| E-22 | 30 | 25 | 75 | Sulfur/ZnO/MgO | 1/5/4 | ETU | 1 |
| E-23 | 30 | 15 | 85 | Sulfur | 3 | TBZTD | 1 |
| E-24 | 30 | 25 | 75 | Sulfur | 3 | TBZTD | 1 |
| E-25 | 30 | 30 | 70 | Sulfur | 3 | TBZTD | 1 |
| E-26 | 30 | 40 | 60 | Sulfur | 3 | TBZTD | 1 |
| E-27 | 30 | 25 | 75 | Sulfur | 3 | TBZTD | 1 |
| E-28 | 30 | 25 | 75 | Sulfur | 3 | TBZTD | 1 |
| E-29 | 30 | 25 | 75 | Sulfur | 3 | TET | 3 |
| E-30 | 20 | 25 | 75 | Sulfur | 3 | TET | 3 |
| E-31 | 30 | 25 | 75 | Sulfur | 3 | TBZTD | 3 |
| E-32 | 30 | 25 | 75 | Sulfur | 3 | TBZTD | 3 |

TABLE 6-continued

| No. of unvulcanized rubber composition for forming conductive layer | Blade rotation speed rpm | Unvulcanized rubber composition | | Vulcanizing agent | | Vulcanization aid | |
|---|---|---|---|---|---|---|---|
| | | For forming domains Parts by mass | For forming matrix Parts by mass | Kind | phr | Kind | phr |
| E-33 | 30 | 25 | 75 | Sulfur | 3 | TBZTD | 1 |
| E-34 | 30 | 25 | 75 | Sulfur/ZnO/MgO | 1/5/4 | ETU | 1 |
| E-35 | 30 | 25 | 75 | Sulfur | 3 | TBZTD | 1 |
| E-36 | 30 | 25 | 75 | Sulfur | 3 | TBZTD | 1 |
| E-37 | 30 | 25 | 75 | Sulfur | 3 | TBZTD | 1 |
| E-38 | 30 | 25 | 75 | Sulfur | 3 | TBZTD | 1 |

The details of the materials shown by abbreviations in Table 5 and Table 6 above are shown in Table 7.

TABLE 7

| Material abbreviation | Material name | Product name | Manufacturer name |
|---|---|---|---|
| Butyl 065 | Butyl rubber (Butyl) | JSR Butyl 065 | JSR Corporation |
| T0700 | Polybutadiene rubber (BR) | JSR T0700 | JSR Corporation |
| ON301 | Epichlorohydrin rubber (ECO) | Epion ON301 | Osaka Soda Co., Ltd. |
| Esprene 301A | Ethylene-propylene-diene rubber (EPDM) | Esprene 301A | Sumitomo Chemical Company, Limited |
| Esprene 505A | Ethylene-propylene-diene rubber (EPDM) | Esprene 505A | Sumitomo Chemical Company, Limited |
| DN401LL | Acrylonitrile-butadiene rubber (NBR) | Nipol DN401LL | Zeon Corporation |
| N230SV | Acrylonitrile-butadiene rubber (NBR) | NBR N230SV | JSR Corporation |
| N230S | Acrylonitrile-butadiene rubber (NBR) | NBR N230S | JSR Corporation |
| N232SH | Acrylonitrile-butadiene rubber (NBR) | NBR N232SH | JSR Corporation |
| T2003 | Styrene-butadiene rubber (SBR) | Tufdene 2003 | Asahi Kasei Corporation |
| T1000 | Styrene-butadiene rubber (SBR) | Tufdene 1000 | Asahi Kasei Corporation |
| T2000R | Styrene-butadiene rubber (SBR) | Tufdene 2000R | Asahi Kasei Corporation |
| T2100R | Styrene-butadiene rubber (SBR) | Tufdene 2100R | Asahi Kasei Corporation |
| B31 | Chloroprene rubber (CR) | Skyprene B31 | Tosoh Corporation |
| A303 | Styrene-butadiene rubber (SBR) | Asaprene 303 | Asahi Kasei Corporation |
| Polyvinyl butyral resin | Polyvinyl butyral resin | Mowital B30H | Kuraray Co., Ltd. |
| #7360 | Conductive carbon black | TOKABLACK #7360SB | Tokai Carbon Co., Ltd. |
| #5500 | Conductive carbon black | TOKABLACK #5500 | Tokai Carbon Co., Ltd. |
| Ketjen | Conductive carbon black | Carbon ECP | Lion Specialty Chemicals Co., Ltd. |
| MONARCH 880 | Conductive carbon black | MONARCH 880 | CABOT Corporation |
| LV | Ion conductive material | LV70 | ADEKA Corporation |
| Sulfur | Sulfur | Sulfax PMC | Tsurumi Chemical Industry Co., Ltd. |
| MBTS | Dibenzothiazyl disulfide | Sanceler DM | Sanshin Chemical Industry Co., Ltd. |
| TBZTD | Tetrabenzylthiuram disulfide | Sanceler TBZTD | Sanshin Chemical Industry Co., Ltd. |
| TET | Tetraethylthiuram disulfide | Sanceler TET-G | Sanshin Chemical Industry Co., Ltd. |
| ETU | 2-Imidazoline-2-thiol | Sanceler 22-C | Sanshin Chemical Industry Co., Ltd. |

3. Preparation of Coating Material for Forming Surface Layer

[3-1] Preparation of Coating Material S-1 for Forming Surface Layer

The following materials were mixed and stirred.

Polyether polyol (product name: PEG-1000, manufactured by Sanyo Chemical Industries, Ltd.): 52.0 parts by mass Isocyanate (product name: Millionate MR-400, manufactured by Tosoh Corporation): 48.0 parts by mass Carbon black (product name: MA-100, manufactured by Mitsubishi Chemical Corporation): 15.0 parts by mass Urethane resin fine particles (product name: Art pearl C-400 T, manufactured by Negami Chemical Industrial Co., Ltd): 20.0 parts by mass Next, methyl ethyl ketone was added to the mixture so that the total solid content ratio was 30 mass %, and then the materials were mixed with a sand mill. Then, the viscosity was further adjusted to from 10 cps to 12 cps with methyl ethyl ketone to prepare a coating material S-1 for forming a surface layer.

[3-2] Preparation of Coating Materials S-2 to S-10 and S-14 to S-16 for Forming Surface Layers Coating materials S-2 to S-16 for forming surface layers were prepared in the same manner as the coating material S-1 for forming a surface layer except that the kinds and blending ratios of binder resins and conductive agents were set as shown in Table 8.

[3-3] Preparation of Coating Material S-11 for Forming Surface Layer

The following materials were mixed and stirred.
Acrylic polyol (product name: Acrydic A817, manufactured by DIC Corporation): 75.0 parts by mass
Melamine resin (product name: U-VAN 20SB, manufactured by Mitsui Chemicals, Inc.): 25.0 parts by mass
Carbon black (product name: Printex 25, manufactured by Orion Engineered Carbons): 10.0 parts by mass
Lithium salt compound (product name: Eftop EF-N115, manufactured by Mitsubishi Materials Electronic Chemicals Co., Ltd.): 2.0 parts by mass
Urethane resin fine particles (product name: Art pearl C-400 T, manufactured by Negami Chemical Industrial Co., Ltd): 20.0 parts by mass Next, methyl ethyl ketone was added to the mixture so that the total solid content ratio was 30 mass %, and then the materials were mixed with a sand mill. Then, the viscosity was further adjusted to from 10 cps to 12 cps with methyl ethyl ketone to prepare a coating material S-11 for forming a surface layer.

[3-4] Preparation of Coating Material S-12 for Forming Surface Layer 100.0 Parts by mass of a polyamide resin (product name: Toresin EF-30 T, manufactured by Teikoku Chemical Industry Co., Ltd.) was added to 2,000 g of methanol and dissolved therein under stirring.

Next, 20.0 parts by mass of urethane resin fine particles (product name: Art Pearl C-400 T, manufactured by Negami Chemical Industrial Co., Ltd) were added, and then the materials were mixed with a sand mill. Then, the viscosity was further adjusted to from 10 cps to 12 cps with methanol to prepare a coating material S-12 for forming a surface layer.

[3-5] Preparation of Coating Material S-13 for Forming Surface Layer 100.0 Parts by mass of an acrylic resin (product name: Almatex L1060, manufactured by Mitsui Chemicals, Inc.) was added to 300 g of toluene and dissolved therein under stirring. Next, 11.0 parts by mass of urethane resin fine particles (product name: Art Pearl C-400 T, manufactured by Negami Chemical Industrial Co., Ltd) were added, and then the materials were mixed with a sand mill. Then, the viscosity was further adjusted to from 10 cps to 12 cps with toluene to prepare a coating material S-13 for forming a surface layer.

TABLE 8

| Surface layer | Binder resin Product name | Parts by mass | Product name | Parts by mass | Conductive agent Product name | Parts by mass | Product name | Parts by mass | Volume resistivity of surface layer ($\Omega \cdot$ cm) |
|---|---|---|---|---|---|---|---|---|---|
| S-1 | PEG-1000 | 52.0 | MR-400 | 48.0 | MA-100 | 20.0 | — | — | 5.50E+05 |
| S-2 | Sannix PP-1000 | 55.0 | | | | 45.0 | | | 6.80E+06 |
| S-3 | Sannix PP-4000 | 62.5 | Coronate 2233 | 37.5 | Printex 25 | 10.0 | — | — | 9.20E+06 |
| S-4 | PTMG-2000 | 65.0 | Coronate L | 35.0 | | 30.0 | | | 2.20E+04 |
| S-5 | PTG-L3500 | 73.5 | | 26.5 | | 10.0 | CIL-312 | 2.0 | 7.50E+05 |
| S-6 | Nippolan 4002 | 62.5 | Coronate 2233 | 37.5 | — | — | EF-N115 | 2.0 | 5.70E+06 |
| S-7 | Nippolan 4010 | 65.0 | | 35.0 | — | | | | 5.90E+06 |
| S-8 | P-3010 | 73.5 | | 26.5 | — | | — | | 2.60E+07 |
| S-9 | ETERNACOLL PH-300 | 73.5 | Coronate L | 26.5 | Printex 25 | 10.0 | — | — | 2.20E+08 |
| S-10 | C-3090 | 65.0 | | 35.0 | | 10.0 | | | 5.50E+05 |
| S-11 | Acrydic A817 | 75.0 | U-VAN 20SB | 25.0 | | 10.0 | EF-N115 | 2.0 | 3.70E+09 |
| S-12 | Toresin EF-30T | 100.0 | — | — | — | — | — | — | 6.60E+10 |
| S-13 | Almatex L1060 | 100.0 | — | — | — | — | — | — | 1.70E+13 |
| S-14 | Vylon 200 | 100.0 | — | — | — | — | — | — | 8.60E+14 |
| S-15 | PEG-1000 | 52.0 | MR-400 | 48.0 | #5500 | 40 | — | — | 8.26E+03 |
| S-16 | Iupizeta PCZ-500 | 100.0 | — | — | — | — | — | — | 4.70E+15 |

Material species related to the product names shown in Table 8 are shown in Table 9.

TABLE 9

| Product name | Material |
|---|---|
| PEG-1000: product name, manufactured by Sanyo Chemical Industries, Ltd. | Polyethylene glycol |
| Sannix PP-1000: product name, manufactured by Sanyo Chemical Industries, Ltd. | Polypropylene glycol |

TABLE 9-continued

| Product name | Material |
| --- | --- |
| Sannix PP-4000: product name, manufactured by Sanyo Chemical Industries, Ltd. | Polypropylene glycol |
| PTMG-2000: product name, manufactured by Hodogaya Chemical Co., Ltd. | Polytetramethylene glycol |
| PTG-L3500: product name, manufactured by Hodogaya Chemical Co., Ltd. | Polytetramethylene/2-methyltetramethylene glycol |
| Nippolan 4002: product name, manufactured by Tosoh Corporation | Ethylene adipate-based polyester polyol |
| Nippolan 4010: product name, manufactured by Tosoh Corporation | Butylene adipate-based polyester polyol |
| P-3010: product name: Kuraray Polyol P-3010, manufactured by Kuraray Co., Ltd. | MPD-based polyester polyol |
| ETERNACOLL PH-300: product name, manufactured by Ube Industries Ltd. | 1,6-HD/1,5-PD-based polycarbonate diol |
| C-3090: product name: Kuraray Polyol C-3090, manufactured by Kuraray Co., Ltd. | MPD-based polycarbonate diol |
| Acrydic A817: product name, manufactured by DIC Corporation | Acrylic polyol |
| Toresin EF-30T: product name, manufactured by Nagase ChemteX Corporation | Polyamide resin |
| Almatex L1060: product name, manufactured by Mitsui Chemicals, Inc. | Acrylic resin |
| Vylon 200: product name, manufactured by Toyobo Co., Ltd. | Polyester resin |
| Iupizeta PCZ-500: product name, manufactured by Mitsubishi Gas Chemical Company, Inc. | Polycarbonate resin |
| MR-400: product name: Millionate MR-400, manufactured by Tosoh Corporation | Polymeric MDI |
| Coronate 2233: product name, manufactured by Tosoh Corporation | TDI-based polyisocyanate |
| Coronate L: product name, manufactured by Tosoh Corporation | TDI-based polyisocyanate |
| U-VAN 20SB: product name, manufactured by Mitsui Chemicals, Inc. | Melamine resin |
| MA-100: product name, manufactured by Mitsubishi Chemical Corporation | Carbon black |
| Printex 25: product name, manufactured by Orion Engineered Carbons | Carbon black |
| #5500: product name: TOKABLACK #5500, manufactured by Tokai Carbon Co., Ltd. | Carbon black |
| CIL-312: product name, manufactured by Japan Carlit Co., Ltd. | Ionic liquid |
| EF-N115: product name, manufactured by Mitsubishi Materials Electronic Chemicals Co., Ltd. | Lithium-based ionic compound |

[Example 1] Method of Producing Rollers E-1 to E-38 for Electrophotography (1) Formation of Conductive Layer A cored bar having a total length of 252 mm and an outer diameter of 6 mm, in which the surface of free-cutting steel was subjected to electroless nickel plating, was prepared as a support. The cored bar was used as a support serving as an electro-conductive mandrel.

Next, a die having an inner diameter of 16.0 mm was mounted to the tip of a crosshead extruder including a supply mechanism for the electro-conductive support and a discharge mechanism for an unvulcanized rubber roller. The temperature of each of the extruder and the crosshead was adjusted to 80° C., and the conveyance speed of the electro-conductive support was adjusted to 60 mm/sec. Under the conditions, the unvulcanized rubber composition E-1 for forming an electro-conductive layer was supplied from the extruder, and the outer peripheral portion of the electro-conductive support was covered with the unvulcanized rubber composition in the crosshead, to thereby obtain an unvulcanized rubber roller.

Next, the unvulcanized rubber roller was put into a hot air vulcanization furnace at 170° C. and heated for 60 minutes to vulcanize the unvulcanized rubber composition, to thereby obtain a roller having an electro-conductive layer formed on the outer peripheral portion of the electro-conductive support. After that, both end portions of the electro-conductive layer were cut off, and the surface of the electro-conductive layer was polished with a rotary grinding stone. As a result, a roller having an electro-conductive layer with a crown shape, in which each diameter at positions of 90 mm from the center portion to both the end portions was 12.0 mm, and the diameter of the center portion was 12.2 mm, was obtained.

(2) Formation of Surface Layer

The roller having an electro-conductive layer obtained in the section (1) was dipped in the coating material S-1 for forming a surface layer while an upper end portion thereof was held with its longitudinal direction being set in a vertical direction, to thereby form a coating film of the coating material on the surface of the electro-conductive layer. The dipping time was set to 9 seconds. The pulling speed of the roller was adjusted so that an initial speed was 20 mm/sec and a final speed was 2 mm/sec, and the speed was linearly changed with respect to the time during a period of from 20 mm/sec to 2 mm/sec. After the coating, the roller was air-dried at 23° C. for 30 minutes.

Further, the roller was subjected to heat treatment at a temperature of 150° C. for 1 hour, to thereby produce a roller for electrophotography according to Example 1 having a surface layer with a thickness of 15 µm on the outer periphery of the electro-conductive layer.

5. Evaluation of Characteristics

[5-1] Determination of Presence or Absence of Matrix-Domain (MD) Structure

The presence or absence of the matrix-domain structure according to the present disclosure in the electro-conductive layer was determined by the following method. First, a slice was cut out with a razor so that a section perpendicular to the circumferential direction of the electro-conductive layer was able to be observed. Next, platinum was deposited from the vapor on the surface of the slice corresponding to the section of the electro-conductive layer. The platinum-deposited surface of the slice was observed with a scanning electron microscope (SEM) (product name: S-4800, manufactured by Hitachi High-Technologies Corporation) at a magnification of 1,000 to obtain a SEM image. From the obtained SEM image, the presence or absence of the matrix-domain structure was determined.

A developing roller (length in the longitudinal direction: 230 mm) was equally divided into five regions in the longitudinal direction and four regions in the circumferential direction, and the observation was made on slices collected from one arbitrary point in each of the regions, that is, 20 points in total. The results are shown in the item "MD structure" in each of Tables 11-1, 20-1, and 26-1 as follows: a case in which the matrix-domain structure was able to be identified was described as "Y", and a case in which the matrix-domain structure was not able to be identified was described as "N".

As a result of the evaluation, regarding the matrix-domain structure of the electro-conductive layer according to Example 1, in the SEM image, a plurality of domains 6b were dispersed in a matrix 6a, and an electro-conductive path was divided, as illustrated in FIG. 5. Meanwhile, the matrices communicated to each other.

[5-2] Calculation of Slope of Impedance at Frequency of from $1\times10^6$ Hz to $1\times10^7$ Hz and Impedance at Frequency of from $1\times10^{-2}$ Hz to $1\times10^1$ Hz The impedance was measured as described below.

First, as pretreatment, platinum was deposited from the vapor on the outer surface of a developing roller while the roller was rotated to produce a measuring electrode. In this case, an electrode having a width of 1.5 cm, which was uniform in a circumferential direction, was produced through use of a masking tape. Through formation of the electrode, the contribution of the contact area between the measuring electrode and the electrophotographic electro-conductive member can be reduced to the extent possible by the surface roughness of the electrophotographic electro-conductive member.

Next, an aluminum sheet was wound around the electrode without any gap, and the electrode was connected to a measuring electrode of an impedance-measuring device (product names: Solartron 1260 and Solartron 1296, manufactured by Solartron) from the aluminum sheet.

Figure 10:
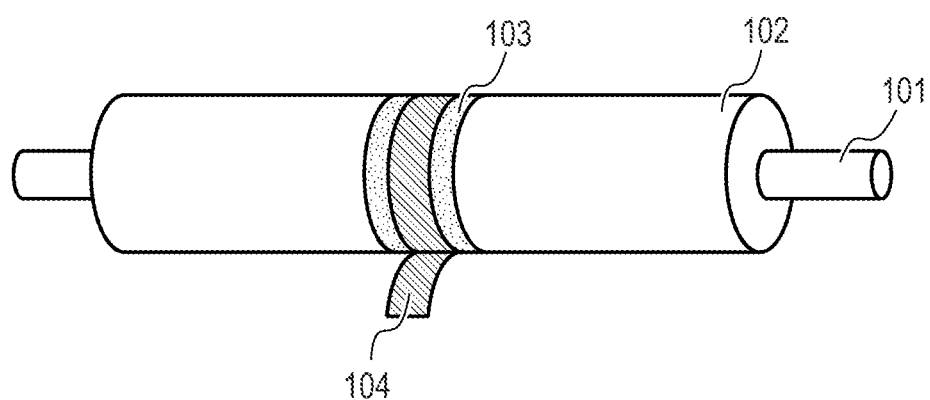
FIG. 10 is a schematic view of a state in which a measuring electrode is formed on an electro-conductive roller (the surface of an electro-conductive layer).

FIG. 10 is a schematic view of a state in which a measuring electrode is formed on a developing roller. In FIG. 10, there are illustrated an electro-conductive support 101, an electro-conductive layer 102 having a matrix-domain structure, a platinum-deposited layer 103, and an aluminum sheet 104.

Figure 11:
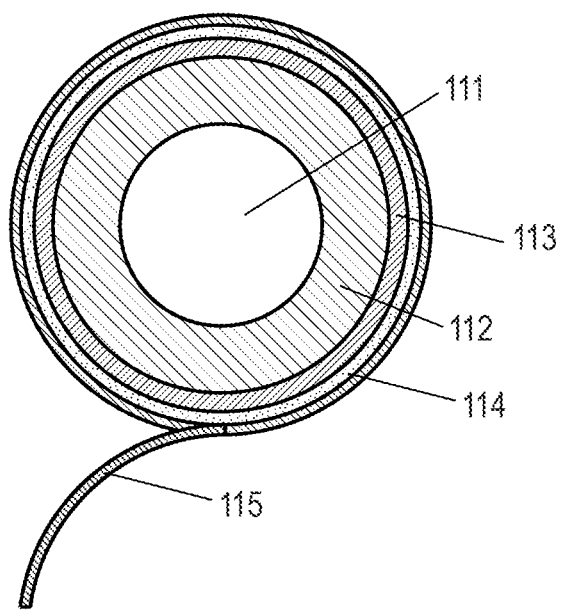
FIG. 11 is a sectional view of a state in which a measuring electrode is formed on an electro-conductive roller (the surface of a surface layer).
Figure 12:
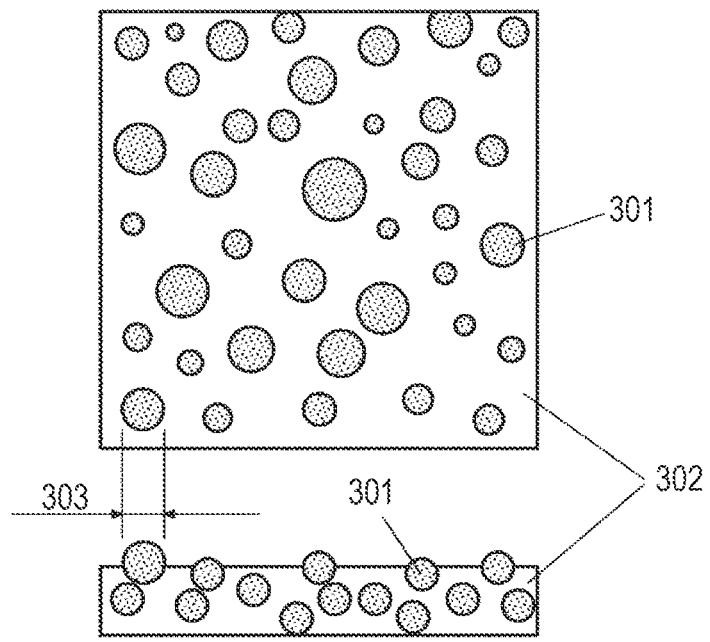
FIG. 12 is a conceptual view for illustrating the size of a protrusion of the surface layer.

FIG. 11 is a sectional view of a state in which a measuring electrode is formed on an electrophotographic electro-conductive member. There are illustrated an electro-conductive support 111, an electro-conductive layer 112 having a matrix-domain structure, a surface layer 113, a platinum-deposited layer 114, and an aluminum sheet 115. As illustrated in FIG. 11, it is important to establish such a state that the electro-conductive layer having a matrix-domain structure and the surface layer are sandwiched between the electro-conductive support and the measuring electrode.

Then, the aluminum sheet was connected to the measuring electrode on the side of the impedance-measuring device (Solartron 1260 and Solartron 1296, manufactured by Solartron). Through use of the electro-conductive support and the aluminum sheet as two electrodes for measurement, impedance measurement was performed.

The impedance measurement was performed by measuring an impedance at a vibration voltage of 1 Vpp, a DC current of 10 V, and a frequency of from $1\times10^{-2}$ Hz to $1\times10^7$ Hz (measured at 5 points when the frequency was changed by one order of magnitude) under an environment having a temperature of 23° C. and a relative humidity of 50% to obtain an absolute value of the impedance. Then, through use of the measurement results, a graph was created by the log-log plotting of the absolute value of the impedance and the frequency. From the graph, impedance at a frequency of $1.0\times10^{-2}$ Hz to $1.0\times10^1$ Hz was determined.

Next, the surface layer was peeled off from a developing roller A1, and platinum was directly deposited from the vapor on the surface of the electro-conductive layer to produce a measuring electrode. Then, in the same manner as described above, the impedance was measured, and a graph was created. From this graph, the slope at from $1\times10^6$ Hz to $1\times10^7$ Hz was calculated. In addition, the impedance at $1.0\times10^{-2}$ Hz to $1.0\times10^1$ Hz was determined.

The developing roller A1 (length in the longitudinal direction: 230 mm) was equally divided into five regions in the longitudinal direction, and measuring electrodes were formed at one arbitrary point in each of the regions, that is, five points in total, and the above-mentioned measurement was performed. The average value thereof was adopted as the slope of the impedance.

Further, the impedance of the electro-conductive support was measured in the same manner as described above except that a platinum electrode was arranged on the outer surface of the electro-conductive support.

[5-3] Measurement of Volume Resistivity of Matrix

The volume resistivity of the matrix was measured as described below with a scanning probe microscope (SPM) (product name: Q-Scope 250, manufactured by Quesant Instrument Corporation) in a contact mode. The measurement was performed under an environment having a temperature of 23° C. and a relative humidity of 50%.

First, a slice having a thickness of about 2 μm was cut out from the electro-conductive layer of the developing roller at a cutting temperature of −100° C. through use of a microtome (product name: Leica EM FCS, manufactured by Leica Microsystems). Next, the slice was set on a metal plate so that one surface of the slice corresponding to the section of the electro-conductive layer was brought into contact with the surface of the metal plate. Then, a cantilever of the SPM was brought into contact with a portion of the slice corresponding to the matrix on the surface of the slice on an opposite side to the surface in contact with the surface of the metal plate. Next, a voltage of 50 V was applied to the cantilever, and a current value was measured.

In addition, the surface shape of the slice was observed with the SPM, and the thickness of the measurement point was calculated from the obtained height profile. Further, from the observation results of the surface shape, the area of a recess in a contact portion of the cantilever was calculated. The volume resistivity was calculated from the thickness and the area of the recess and adopted as the volume resistivity of the matrix.

The developing roller (length in the longitudinal direction: 230 mm) according to Example 1 was equally divided into five regions in the longitudinal direction and four regions in the circumferential direction, and slices were collected from one arbitrary point in each of the regions, that is, 20 points in total. The above-mentioned measurement was performed on each of the slices. An average value of the measurement values at the respective measurement portions was calculated. The obtained results are shown in Tables 11-1, 20-1, and 26-1 as "volume resistivity" of "matrix".

[5-4] Measurement of Volume Resistivity of Domain

The volume resistivity of a domain was measured in the same manner as in the method of measuring the volume resistivity of a matrix except that the contact position of the cantilever was set to a portion corresponding to the domain, and the voltage applied to the cantilever was set to 1 V. An average value of values at the respective measurement portions was calculated.

The obtained results are shown in Tables 11-1, 20-1, and 26-1 as "volume resistivity" of "domain".

[5-5] Ratio Between Volume Resistivity of Matrix and Volume Resistivity of Domain The common logarithm of a volume resistivity R1 of the matrix was divided by the common logarithm of a volume resistivity R2 of the domain to calculate a ratio (log(R1/R2)) between the volume resistivities of the matrix and the domain.

The obtained results are shown in Tables 11-1, 20-1, and 26-1 as "resistivity ratio" between "matrix and domain".

[5-6] Measurement of Shape of Domain

In order to evaluate the size of the domain, the following measurement was performed.

That is, platinum was deposited from the vapor on the surface of the slice prepared in the above-mentioned measurement of the volume resistivity of the matrix corresponding to the section of the electro-conductive layer. Next, the platinum-deposited surface was photographed with a SEM (product name: S-4800, manufactured by Hitachi High-Technologies Corporation) at a magnification of 1,000 to obtain a SEM image. Next, the SEM image was subjected to 8-bit gray scaling through use of image processing software "Image-pro plus" (product name, manufactured by Media Cybernetics, Inc.) to obtain a monochrome image with 256 levels of gray. Next, the black and white of the image were subjected to inversion processing so that the domains in the monochrome image became white and a binarization threshold was set with respect to the brightness distribution of the image based on the algorithm of Otsu's discriminant analysis method, to thereby obtain a binarized image. Next, in the binarized image, when the thickness of the electro-conductive layer was represented by T, a 15-micrometer square observation region was set at nine points in total including three arbitrary points in a region corresponding to a thickness region having a depth of from 0.1 T to 0.9 T from the outer surface of each of three slices. Then, the domain in each of the observation regions was calculated for each of the following items through use of the count function of the above-mentioned image processing software.

Perimeter: A
Envelope perimeter: B
Ratio of A to B: A/B
Proportion (number %) of number of domains satisfying requirement (B3) with respect to number of all observed domains The above-mentioned measurement was performed on slices collected from 20 regions obtained by equally dividing the developing member into five parts in the longitudinal direction and four parts in the circumferential direction, and the arithmetic average value of the calculation results of each of the above-mentioned items was used for evaluating the domains.

The "A" in the requirement (B3) is a perimeter 72 of a domain 71 observed in an observation region as illustrated in FIG. 6. In addition, the "B" is a length (envelope perimeter) of a convex envelope 73 indicated by the broken line of the domain. The obtained results are shown in Tables 11-2, 20-2, and 26-2 as "perimeter A", "envelope perimeter B", "A/B (average value)", and "number % of domains satisfying requirement (B3)", respectively.

[5-7] Measurement of Interdomain Distance

The interdomain distance was calculated in the same manner as in the above-mentioned section 5-6. except that the count function for the interdomain distance of the image processing software was used. The arithmetic average of the above-mentioned measurement results on 20 regions obtained by equally dividing the developing roller into five parts in the longitudinal direction and four parts in the circumferential direction was adopted as the distance (Dm) between domains. The obtained results are shown in Tables 11-1, 20-1, and 26-1 as "distance" of "matrix" and in Tables 11-2, 20-2, and 26-2" as "distance Dm between domains".

[5-8] Measurement of Volume Fraction

The volume fraction of the domains was determined from a three-dimensional image of a sample collected from the electro-conductive layer, which is obtained by acquiring a plurality of sectional images of the sample through use of a FIB-SEM and reconstructing the sectional images. The FIB-SEM is a composite apparatus including a focused ion beam (FIB) device and a scanning electron microscope (SEM).

Specifically, samples each having a cubic shape 9 μm on a side were collected from nine points of the electro-conductive layer. Regarding collection positions, in the case of a roller shape, when the length of the electro-conductive layer in the longitudinal direction was represented by L, samples were collected one by one from positions of every 120° in the circumferential direction of the roller at three points of (¼)L, (½)L, and (¾)L from one end portion. In this case, the center of gravity of each of the samples was set to be matched with the midpoint in the thickness direction of the electro-conductive layer. Next, in each of the samples, an operation involving exposing a section using the FIB and taking a SEM image of the exposed section was repeated to acquire a slice image group. The slice interval of the sample was set to 60 nm. The obtained slice image group was reconstructed into a three-dimensional image through use of 3D visualization/analysis software Avizo (manufactured by FEI Company Japan Ltd.). From the obtained three-dimensional image, the volume of domains in 27 unit cubes 3 μm on a side included in one sample having a cubic shape 9 μm on a side was calculated. The obtained results are shown in Tables 11-1, 20-1, and 26-1 as "volume fraction of domains".

[5-9] Uniform Dispersibility of Domains

The uniform dispersibility of the domains in the electro-conductive layer was determined by three-dimensional measurement of the electro-conductive layer using the FIB-SEM in the same manner as in the measurement of the volume fraction of the domains.

The configuration that the electro-conductive domains were arranged in the electro-conductive layer in a three-dimensionally even and dense manner was verified by the above-mentioned procedure. Herein, as described above, the three-dimensional measurement using the FIB-SEM was performed to evaluate whether or not at least eight samples out of the samples each having a cubic shape (sample cubes) 9 μm on a side satisfied the following requirement (B1).

Requirement (B1):

"When one sample cube is divided into 27 unit cubes 3 μm on a side, and the volume Vd of the domains in each of the unit cubes is determined, the number of the unit cubes each having a Vd of from 2.7 μm$^3$ to 10.8 μm$^3$ is at least 20."

As described above, as the number of the unit cubes 3 μm on a side, each of which satisfies the requirement (B1), in the sample cube 9 μm on a side, increases, the effects of the present disclosure inevitably become higher.

The obtained results are shown in Tables 11-2, 20-2, and 26-2 as "number of cubes each satisfying requirement (B1)".

[5-10] Proportion of Sectional Area of Electron Conductive Agent Contained in Domain with Respect to Sectional Area of Domain First, a portion corresponding to a 15-micrometer square observation region set on the binarized image in the evaluation of the above-mentioned section "5-6. Measurement of Shape of Domain" on the platinum-deposited surface of the platinum-deposited slice produced in the above-mentioned section "5-6. Measurement of Shape of Domain" was photographed with a scanning electron microscope (SEM) (product name: S-4800, manufactured by Hitachi High-Technologies Corporation) at a magnification of 20,000 to obtain a SEM image. The obtained SEM image was subjected to 8-bit gray scaling through use of an image analysis device (product name: LUZEX-AP, manufactured by Nireco Corporation) to obtain a monochromatic image with 256 gray levels. Next, the black and white of the image were subjected to inversion processing so that the domains in the monochrome image became white, and a binarization threshold was set with respect to the brightness distribution of the image based on the algorithm of Otsu's discriminant analysis method, to thereby obtain a binarized image. Next, an observation region having a size that accommodates one domain was extracted from the obtained binarized image. Then, a sectional area Sd of one domain and a sectional area Sc of the electron conductive agent (carbon black) in the domain were calculated. μ=Sc/Sd was determined from the obtained sectional area Sc of the electron conductive agent (carbon black) and sectional area Sd of the domain, to thereby obtain the proportion of the sectional area of the electron conductive agent contained in the domain with respect to the sectional area of the domain. The foregoing was performed on the domain in each of the observation regions. From the obtained results, an average value "μ" of the proportions of the sectional areas of the electron conductive agent, a standard deviation "σ" of the proportions of the sectional areas of the electron conductive agent, a requirement (B2) sectional area proportion (average) "μ/σ", and "number % of domains each satisfying requirement (B2)" were determined. Those results are shown in Tables 11-2, 20-2, and 26-2.

[5-11] Volume Resistivity of Surface Layer

The volume resistivity of the surface layer was measured in an electro-conductive mode with an atomic force microscope (AFM) (Q-scope 250: Quesant Instrument Corporation). First, the surface layer of the developing roller was cut out into a sheet having a width of 2 mm and a length of 2 mm through use of a manipulator, and platinum was deposited from the vapor on one surface of the surface layer. Next, a DC power source (6614C: Agilent Technologies) was connected to the platinum-deposited surface, and a voltage of 10 V was applied. A free end of a cantilever was brought into contact with the other surface of the surface layer, and a current image was obtained through an AFM main body. This measurement was performed at 100 randomly selected points on the surface in the entire surface layer, and the "volume resistivity" was calculated from an average current value of the top 10 low current values and an average value of the thicknesses of the surface layer. The evaluation results are shown in Table 8.

Measurement conditions are shown below.
Measurement mode: contact
Cantilever: CSC17
Measurement range: 10 nm×10 nm
Scan rate: 4 Hz
Applied voltage: 10 V

Examples 2 to 5

Rollers for electrophotography of Examples 2 to 5 were obtained in the same manner as in Example 1 except that the unvulcanized rubber composition for forming an electro-conductive layer and the coating material for forming a surface layer were changed to those shown in Table 10.

Example 6

An electro-conductive layer was prepared in the same manner as in Example 1 except that the unvulcanized rubber composition E-6 for forming an electro-conductive layer was used. Next, the coating material S-11 for forming a surface layer was applied onto the surface of the electro-conductive layer by dip coating and was subjected to heat treatment at a temperature of 140° C. for 30 minutes, to thereby produce a roller for electrophotography of Example 6 having a surface layer with a thickness of 15 μm on the outer periphery of the electro-conductive layer.

Example 7

An electro-conductive layer was prepared in the same manner as in Example 1 except that the unvulcanized rubber composition E-7 for forming an electro-conductive layer was used. The coating material S-12 for forming a surface layer was applied onto the surface of the electro-conductive layer by dip coating and was subjected to heat treatment at a temperature of 120° C. for 30 minutes, to thereby produce a roller for electrophotography of Example 7 having a surface layer with a thickness of 15 μm on the outer periphery of the electro-conductive layer.

Example 8

An electro-conductive layer was prepared in the same manner as in Example 1 except that the unvulcanized rubber composition E-8 for forming an electro-conductive layer was used.

The coating material S-13 for forming a surface layer was applied onto the surface of the electro-conductive layer by dip coating and was subjected to heat treatment at a temperature of 140° C. for 1 hour, to thereby produce a roller for electrophotography of Example 8 having a surface layer with a thickness of 15 μm on the outer periphery of the electro-conductive layer.

Examples 9 to 34

Rollers for electrophotography according to Examples 9 to 34 were obtained in the same manner as in Example 1 except that the unvulcanized rubber compositions for forming conductive layers and the coating materials for forming surface layers were used in combinations shown in Table 10.

Example 35

A cored bar having an outer diameter of 6 mm, in which the surface of free-cutting steel was subjected to electroless nickel plating, was prepared. Next, "METALOC U-20" (product name, manufactured by Toyokagaku Kenkyusho Co., Ltd.) was applied as an adhesive onto the entire circumference of the cored bar in a range excluding both end portions of 15 mm through use of a roll coater, to thereby produce a support according to this Example.

A roller for electrophotography of Example 35 was obtained in the same manner as in Example 1 except that the above-mentioned support was used and the unvulcanized rubber composition for forming an electro-conductive layer and the coating material for forming a surface layer shown in Table 10 were used. The measurement of the impedance of the electro-conductive support in this Example was performed by providing a platinum electrode arranged on the surface of the adhesive layer (resin layer) on the cored bar.

Example 36

A round bar having an outer diameter of 8 mm was molded by injection molding through use of an electro-conductive thermoplastic resin (product name: TORAYCA TLP1060; manufactured by Toray Industries, Inc.). Next, the round bar was polished to prepare a support made of an electro-conductive resin with an outer diameter of 6 mm having the same shape as that made of free-cutting steel used in Example 1.

A roller for electrophotography of Example 36 was obtained in the same manner as in Example 1 except that the above-mentioned support was used and the unvulcanized rubber composition for forming an electro-conductive layer and the coating material for forming a surface layer shown in Table 10 were used.

Example 37

The electro-conductive resin cored bar used in Example 36 was prepared. Next, "METALOC U-20" (product name, manufactured by Toyokagaku Kenkyusho Co., Ltd.) was applied as an adhesive onto the entire circumference of the cored bar in a range excluding both end portions of 15 mm through use of a roll coater. A roller for electrophotography of Example 37 was obtained in the same manner as in Example 1 except that the resultant cored bar was used as a support and the unvulcanized rubber composition for forming an electro-conductive layer and the coating material for forming a surface layer shown in Table 10 were used. The measurement of the impedance of the electro-conductive support in this Example was performed by providing a platinum electrode arranged on the surface of the adhesive layer (resin layer) on the cored bar.

Example 38

A round bar having an outer diameter of 8 mm was molded by injection molding through use of a PPS resin (product name: TORELINA A503-X05; manufactured by Toray Industries, Inc.). Next, the round bar was polished to prepare a PPS resin cored bar (insulating resin cored bar) with an outer diameter of 6 mm having the same shape as that made of free-cutting steel used in Example 1. Platinum was deposited from the vapor on the entire outer surface of the obtained PPS resin cored bar to obtain a mandrel. Next, an adhesive was applied onto the mandrel in the same manner as in Example 37. A roller for electrophotography of Example 38 was produced in the same manner as in Example 1 except that the above-mentioned resultant mandrel was used as a support and the unvulcanized rubber composition for forming an electro-conductive layer and the coating material for forming a surface layer shown in Table 10 were used.

TABLE 10

| | Unvulcanized rubber composition for forming conductive layer | Coating material for forming surface layer |
|---|---|---|
| Example 1 | E-1 | S-1 |
| Example 2 | E-2 | S-2 |
| Example 3 | E-3 | S-3 |
| Example 4 | E-4 | S-4 |
| Example 5 | E-5 | S-5 |
| Example 6 | E-6 | S-11 |
| Example 7 | E-7 | S-12 |
| Example 8 | E-8 | S-13 |
| Example 9 | E-9 | S-14 |
| Example 10 | E-10 | S-2 |
| Example 11 | E-11 | |
| Example 12 | E-12 | |
| Example 13 | E-13 | |
| Example 14 | E-14 | |
| Example 15 | E-15 | |
| Example 16 | E-16 | |
| Example 17 | E-17 | S-4 |
| Example 18 | E-18 | S-5 |
| Example 19 | E-19 | S-6 |
| Example 20 | E-20 | S-4 |
| Example 21 | E-21 | |
| Example 22 | E-22 | |
| Example 23 | E-23 | |
| Example 24 | E-24 | |
| Example 25 | E-25 | S-7 |
| Example 26 | E-26 | S-8 |
| Example 27 | E-27 | S-9 |
| Example 28 | E-28 | S-10 |
| Example 29 | E-29 | |
| Example 30 | E-30 | |
| Example 31 | E-31 | |
| Example 32 | E-32 | |
| Example 33 | E-33 | |
| Example 34 | E-34 | |
| Example 35 | E-35 | S-7 |
| Example 36 | E-36 | |
| Example 37 | E-37 | |
| Example 38 | E-38 | |

The results of the evaluations [5-1] to [5-10] on the electro-conductive rollers according to Examples 1 to 38 are shown in Tables 11-1 and 11-2. In addition, the results of the evaluation [5-11] are shown in Table 8.

TABLE 11-1

| | | 5-2 Conductive layer Impedance | 5-2 Conductive layer Slope | 5-2 Outer surface/support Impedance | 5-2 Conductive support Impedance | 5-3 Matrix | | 5-4 Domain | 5-5 Resistivity ratio | 5-8 Volume |
|---|---|---|---|---|---|---|---|---|---|---|
| Example | 5-1 Conductive layer MD structure | at $10^{-2}$ Hz to $10^1$ Hz $\Omega$ | at $10^6$ Hz to $10^7$ Hz — | at $10^{-2}$ Hz to $10^1$ Hz $\Omega$ | at $10^{-2}$ Hz to $10^1$ Hz $\Omega$ | Distance $\mu m$ | Volume resistivity $\Omega \cdot cm$ | Volume resistivity $\Omega \cdot cm$ | between matrix and domain | fraction of domain % |
| 1 | Y | 6.95E+08 | −0.34 | 3.82E+08 | 9.08E−03 | 0.22 | 7.13E+16 | 2.33E+01 | 15.5 | 15.3 |
| 2 | Y | 2.64E+06 | −0.33 | 1.80E+07 | 5.95E−03 | 0.25 | 5.22E+16 | 1.01E+01 | 15.7 | 15.2 |
| 3 | Y | 9.66E+08 | −0.35 | 8.89E+09 | 3.32E−03 | 0.44 | 3.04E+16 | 2.51E+01 | 15.1 | 25.5 |
| 4 | Y | 1.15E+09 | −0.37 | 4.01E+07 | 8.27E−03 | 0.89 | 8.16E+16 | 7.91E+01 | 15.0 | 29.5 |
| 5 | Y | 2.38E+08 | −0.43 | 1.78E+08 | 6.80E−03 | 1.18 | 6.62E+16 | 6.63E+00 | 16.0 | 41.4 |
| 6 | Y | 3.77E+08 | −0.38 | 3.02E+10 | 7.98E−03 | 0.23 | 9.58E+15 | 3.94E+01 | 14.4 | 25.0 |
| 7 | Y | 1.44E+08 | −0.32 | 4.44E+10 | 7.99E−03 | 0.24 | 1.47E+14 | 2.31E+01 | 12.8 | 26.5 |
| 8 | Y | 5.45E+07 | −0.31 | 7.40E+10 | 3.88E−03 | 0.22 | 4.69E+13 | 6.92E+01 | 11.8 | 26.7 |
| 9 | Y | 1.77E+07 | −0.30 | 9.60E+10 | 4.24E−03 | 0.22 | 9.02E+12 | 6.15E+01 | 11.2 | 24.9 |
| 10 | Y | 6.34E+08 | −0.38 | 4.31E+09 | 3.66E−03 | 0.25 | 7.97E+15 | 8.45E+02 | 13.0 | 24.6 |
| 11 | Y | 6.92E+08 | −0.45 | 4.71E+09 | 6.52E−03 | 0.23 | 2.21E+15 | 7.06E+03 | 11.5 | 25.8 |
| 12 | Y | 3.21E+06 | −0.38 | 2.19E+07 | 8.69E−03 | 0.24 | 3.00E+10 | 7.88E+01 | 8.6 | 26.7 |
| 13 | Y | 3.90E+08 | −0.79 | 2.65E+09 | 3.05E−03 | 0.24 | 7.79E+16 | 7.06E+03 | 13.0 | 26.6 |
| 14 | Y | 2.03E+04 | −0.78 | 1.38E+05 | 1.86E−03 | 0.26 | 2.76E+07 | 8.83E+03 | 3.5 | 25.7 |
| 15 | Y | 6.51E+08 | −0.79 | 4.42E+09 | 4.06E−03 | 0.23 | 6.53E+15 | 1.98E+01 | 14.5 | 27.0 |
| 16 | Y | 3.60E+08 | −0.80 | 2.45E+09 | 7.01E−03 | 0.21 | 8.45E+15 | 7.91E+03 | 12.0 | 26.1 |
| 17 | Y | 3.38E+08 | −0.37 | 1.18E+07 | 9.23E−03 | 0.23 | 8.39E+14 | 1.12E+01 | 13.9 | 15.0 |
| 18 | Y | 6.42E+08 | −0.37 | 4.82E+08 | 3.57E−03 | 0.55 | 1.64E+14 | 5.41E+01 | 12.5 | 27.0 |
| 19 | Y | 2.14E+08 | −0.41 | 1.22E+09 | 5.48E−03 | 0.91 | 8.21E+15 | 1.21E+01 | 14.8 | 31.1 |
| 20 | Y | 2.74E+08 | −0.52 | 9.59E+06 | 1.42E−04 | 1.1 | 6.42E+15 | 4.57E+00 | 15.1 | 42.5 |
| 21 | Y | 4.98E+08 | −0.50 | 1.74E+07 | 1.97E−03 | 0.21 | 6.40E+15 | 3.73E+03 | 12.2 | 26.0 |
| 22 | Y | 3.54E+05 | −0.53 | 1.08E+05 | 9.33E−03 | 0.22 | 1.69E+08 | 1.05E+01 | 7.2 | 26.8 |
| 23 | Y | 6.18E+08 | −0.41 | 2.16E+07 | 9.94E−03 | 0.26 | 7.41E+15 | 3.06E+01 | 14.4 | 15.3 |
| 24 | Y | 2.42E+08 | −0.46 | 8.46E+06 | 4.88E−03 | 0.23 | 1.37E+15 | 1.55E+01 | 13.9 | 26.7 |
| 25 | Y | 5.28E+08 | −0.54 | 3.11E+09 | 7.22E−03 | 0.24 | 8.07E+15 | 8.63E+01 | 14.0 | 31.5 |
| 26 | Y | 3.04E+08 | −0.65 | 7.89E+09 | 4.24E−04 | 0.22 | 1.55E+14 | 4.29E+01 | 12.6 | 42.6 |
| 27 | Y | 5.62E+08 | −0.56 | 1.24E+10 | 6.37E−03 | 0.23 | 9.86E+15 | 5.23E+01 | 14.3 | 24.9 |
| 28 | Y | 6.66E+08 | −0.70 | 3.66E+08 | 9.96E−03 | 0.24 | 5.00E+15 | 8.38E+03 | 11.8 | 26.0 |
| 29 | Y | 1.27E+09 | −0.41 | 6.99E+08 | 4.50E−03 | 1.9 | 2.95E+15 | 9.18E+00 | 14.5 | 26.8 |
| 30 | Y | 9.17E+10 | −0.46 | 9.04E+09 | 5.05E−03 | 3.04 | 9.77E+15 | 7.22E+01 | 14.1 | 25.8 |
| 31 | Y | 1.41E+08 | −0.60 | 7.73E+07 | 6.32E−03 | 5.7 | 3.72E+15 | 5.23E+00 | 14.9 | 26.5 |
| 32 | Y | 3.12E+08 | −0.62 | 1.72E+08 | 1.18E−03 | 6.09 | 3.72E+15 | 7.25E+01 | 11.7 | 24.8 |
| 33 | Y | 3.53E+08 | −0.75 | 1.94E+08 | 6.96E−03 | 5.6 | 6.27E+15 | 5.12E+01 | 14.1 | 24.6 |
| 34 | Y | 1.42E+06 | −0.80 | 7.79E+05 | 6.86E−03 | 5.67 | 5.64E+08 | 8.28E+03 | 4.8 | 25.9 |
| 35 | Y | 7.93E+06 | −0.37 | 4.68E+07 | 2.50E−02 | 0.22 | 4.27E+15 | 1.94E+01 | 14.3 | 26.7 |
| 36 | Y | 3.98E+08 | −0.37 | 2.35E+09 | 1.50E+00 | 0.22 | 2.46E+15 | 2.50E+01 | 14.0 | 25.4 |
| 37 | Y | 5.80E+08 | −0.40 | 3.42E+09 | 9.80E+00 | 0.21 | 1.62E+15 | 5.89E+01 | 13.4 | 26.8 |
| 38 | Y | 5.21E+08 | −0.38 | 3.08E+09 | 2.30E+00 | 0.22 | 3.12E+15 | 7.56E+01 | 13.6 | 26.9 |

TABLE 11-2

| | | 5-10 | 5-10 | 5-6 Domain | 5-6 | 5-6 | 5-6 | 5-9 | | | |
|---|---|---|---|---|---|---|---|---|---|---|---|
| | 5-7 | Requirement (B2) sectional area | Number % of domains each | | | | Number % of domains each | Number of cubes each | 5-10 | 5-10 | 5-10 |
| | | | | | | | | | | Conductive particles | |
| Example | Interdomain distance Dm $\mu m$ | proportion (average value) % | satisfying requirement (B2) % | Perimeter A $\mu m$ | Envelope perimeter B $\mu m$ | A/B (average value) — | satisfying requirement (B3) % | satisfying requirement (B1) Pieces | Area proportion $\mu$ % | $\sigma$ — | $\mu/\sigma$ — |
| 1 | 0.22 | 31 | 90 | 0.85 | 0.84 | 1.01 | 85 | 9 | 31 | 137 | 0.23 |
| 2 | 0.25 | 26 | 84 | 0.91 | 0.90 | 1.01 | 87 | 9 | 26 | 183 | 0.14 |
| 3 | 0.44 | 38 | 97 | 1.61 | 1.59 | 1.01 | 88 | 9 | 38 | 343 | 0.11 |
| 4 | 0.89 | 30 | 94 | 1.80 | 1.78 | 1.01 | 85 | 9 | 30 | 173 | 0.17 |
| 5 | 1.18 | 37 | 97 | 3.37 | 3.24 | 1.04 | 92 | 9 | 37 | 371 | 0.10 |
| 6 | 0.23 | 32 | 95 | 0.83 | 0.83 | 1.01 | 90 | 9 | 32 | 158 | 0.20 |
| 7 | 0.24 | 40 | 94 | 0.74 | 0.73 | 1.01 | 90 | 9 | 40 | 366 | 0.11 |
| 8 | 0.22 | 36 | 97 | 0.81 | 0.79 | 1.02 | 89 | 9 | 36 | 360 | 0.10 |
| 9 | 0.22 | 36 | 96 | 0.84 | 0.81 | 1.04 | 98 | 9 | 36 | 198 | 0.18 |
| 10 | 0.25 | 36 | 91 | 0.91 | 0.88 | 1.04 | 96 | 9 | 36 | 324 | 0.11 |
| 11 | 0.23 | 28 | 83 | 0.92 | 0.90 | 1.02 | 84 | 9 | 28 | 201 | 0.14 |

TABLE 11-2-continued

| | | | | | | | | | | | |
|---|---|---|---|---|---|---|---|---|---|---|---|
| | | Evaluation item No. | | | | | | | | | |
| | 5-7 | 5-10 | 5-10 | 5-6 | 5-6 Domain | 5-6 | 5-6 | 5-9 | 5-10 | 5-10 5-10 Conductive particles | |
| Example | Interdomain distance Dm μm | Requirement (B2) sectional area proportion (average value) % | Number % of domains each satisfying requirement (B2) % | Perimeter A μm | Envelope perimeter B μm | A/B (average value) — | Number % of domains each satisfying requirement (B3) % | Number of cubes each satisfying requirement (B1) Pieces | Area proportion μ % | σ — | μ/σ — |
| 12 | 0.24 | 35 | 92 | 0.96 | 0.94 | 1.02 | 85 | 9 | 35 | 182 | 0.19 |
| 13 | 0.24 | 30 | 89 | 0.74 | 0.71 | 1.04 | 85 | 9 | 30 | 156 | 0.19 |
| 14 | 0.26 | 31 | 85 | 0.92 | 0.89 | 1.03 | 91 | 9 | 31 | 307 | 0.10 |
| 15 | 0.23 | 47 | 87 | 0.99 | 0.98 | 1.01 | 85 | 7 | 47 | 239 | 0.20 |
| 16 | 0.21 | 22 | 81 | 0.81 | 0.79 | 1.02 | 91 | 7 | 22 | 358 | 0.06 |
| 17 | 0.23 | 32 | 85 | 3.91 | 3.83 | 1.02 | 88 | 9 | 32 | 161 | 0.20 |
| 18 | 0.55 | 31 | 84 | 5.54 | 5.32 | 1.04 | 95 | 9 | 31 | 175 | 0.18 |
| 19 | 0.91 | 30 | 80 | 6.33 | 6.27 | 1.01 | 89 | 9 | 30 | 156 | 0.19 |
| 20 | 1.1 | 29 | 82 | 6.07 | 5.83 | 1.04 | 96 | 8 | 29 | 179 | 0.16 |
| 21 | 0.21 | 21 | 82 | 4.87 | 4.73 | 1.03 | 92 | 9 | 21 | 151 | 0.14 |
| 22 | 0.22 | 30 | 82 | 4.39 | 4.35 | 1.01 | 83 | 9 | 30 | 218 | 0.14 |
| 23 | 0.26 | 29 | 86 | 8.35 | 8.27 | 1.01 | 88 | 9 | 29 | 222 | 0.13 |
| 24 | 0.23 | 30 | 85 | 8.79 | 8.45 | 1.04 | 94 | 9 | 30 | 136 | 0.22 |
| 25 | 0.24 | 30 | 87 | 8.74 | 8.57 | 1.02 | 90 | 9 | 30 | 186 | 0.16 |
| 26 | 0.22 | 31 | 85 | 8.33 | 8.16 | 1.02 | 89 | 9 | 31 | 279 | 0.11 |
| 27 | 0.23 | 31 | 87 | 18.45 | 17.91 | 1.03 | 92 | 8 | 31 | 164 | 0.19 |
| 28 | 0.24 | 24 | 83 | 17.77 | 17.42 | 1.02 | 91 | 8 | 24 | 182 | 0.13 |
| 29 | 1.90 | 42 | 97 | 0.81 | 0.79 | 1.02 | 90 | 9 | 42 | 337 | 0.12 |
| 30 | 3.04 | 45 | 96 | 0.96 | 0.93 | 1.03 | 86 | 9 | 45 | 338 | 0.13 |
| 31 | 5.70 | 24 | 87 | 0.76 | 0.75 | 1.01 | 82 | 9 | 24 | 173 | 0.14 |
| 32 | 6.09 | 33 | 82 | 1.00 | 0.99 | 1.01 | 81 | 9 | 33 | 141 | 0.23 |
| 33 | 5.60 | 35 | 89 | 17.26 | 16.76 | 1.03 | 87 | 8 | 35 | 267 | 0.13 |
| 34 | 5.67 | 19 | 76 | 15.50 | 15.05 | 1.03 | 91 | 7 | 19 | 281 | 0.07 |
| 35 | 0.22 | 31 | 90 | 4.50 | 4.32 | 1.04 | 93 | 9 | 31 | 205 | 0.15 |
| 36 | 0.22 | 34 | 91 | 4.42 | 4.29 | 1.03 | 87 | 9 | 34 | 306 | 0.11 |
| 37 | 0.21 | 34 | 88 | 4.44 | 4.27 | 1.04 | 87 | 9 | 34 | 137 | 0.25 |
| 38 | 0.22 | 32 | 89 | 4.82 | 4.73 | 1.02 | 94 | 9 | 32 | 265 | 0.12 |

6. Evaluation as Developing Roller

The evaluation of each of the obtained rollers for electrophotography according to Examples 1 to 38 as a developing roller was performed as described below.

[6-1] Evaluation of Image (Fogging)

The roller for electrophotography according to each of Examples and Comparative Examples was mounted as a developing roller to a magenta toner cartridge for a laser printer (product name: HP Color Laserjet Enterprise CP4515dn, manufactured by Hewlett-Packard Company) having the configuration illustrated in FIG. 9, and a fogged image was evaluated. In order to perform the evaluation in a high-speed process, the laser printer was reconstructed so that the number of output sheets per unit time was 50 sheets/min for A4-size paper, which was larger than the original number of output sheets.

The magenta toner cartridge having each of the developing rollers mounted thereto was loaded into the above-mentioned laser printer. The resultant was set under a high-temperature and high-humidity environment having a temperature of 32° C. and a relative humidity of 85% RH and then left to stand for 6 hours. Next, an image in which the alphabet letter "E" with a size of 4 points was printed so that the coverage was 1% with respect to the area of A4-size paper (hereinafter sometimes referred to as "E letter image") was continuously output on a predetermined number of copy sheets. After that, a solid white image was output on a new copy sheet, and the printer was stopped while the solid white image was being output. In this case, the toner adhering to the photosensitive member was peeled off with a tape (product name: CT18, manufactured by Nichiban Co., Ltd.), and the reflectance was measured with a reflection densitometer (product name: TC-6DS/A, manufactured by Tokyo Denshoku Co., Ltd.). The decrease amount (%) of the reflectance when the reflectance of the tape was used as a reference was measured, and the measured value was adopted as a fogging value. Based on the fogging value, evaluation was performed based on the following criteria.

Rank A: The fogging value is less than 1.5%.
Rank B: The fogging value is 1.5% or more and less than 3.0%.
Rank C: The fogging value is 3.0% or more and less than 5.0%.
Rank D: The fogging value is 5.0% or more.

[6-2] Toner Charge Amount

The charge amount was measured in order to evaluate the charge-imparting property of the roller for electrophotography with respect to the toner.

At the time of the above-mentioned fogged image evaluation, the toner carried in a narrow portion of a part of the roller for electrophotography sandwiched between a toner-regulating blade and a photosensitive member abutment position was sucked and collected by a metal cylindrical tube and a cylindrical filter. In this case, the charge amount stored in a capacitor through the metal cylindrical tube and the mass of the sucked toner were measured. The charge amount was measured through use of a measuring machine (product name: 8252) manufactured by ADC Corporation. Then, from those values, the charge amount (μC/g) per unit mass was calculated. When negatively chargeable toner is used, the sign of the charge amount per unit mass is negative, and it can be said that, when the absolute value is larger, the charge-imparting property of the developing roller is higher. The value obtained by the measurement was adopted as a toner charge amount.

[6-3] Toner Charge Amount Distribution

In order to evaluate the spread of a toner charge amount, a charge amount distribution was measured.

The charge amount distribution was measured with a powder measurement charging amount/particle diameter distribution estimation device (product name: E-spart Analyzer Model EST-III, manufactured by Hosokawa Micron Corporation). The charging amount distribution was measured in the same manner as in the toner charging amount measurement except for the foregoing. The number of measurement particles was set to about 3,000. A standard deviation was calculated from the obtained charging amount distribution, and the obtained value was adopted as an initial toner charge amount distribution.

[6-4] High-Temperature and High-Humidity/Low-Temperature and Low-Humidity Cycle Test A test for performing evaluation alternately under a high-temperature and high-humidity environment and a low-temperature and low-humidity environment (hereinafter referred to as "environmental cycle test") was performed as described below. First, a magenta toner cartridge having mounted thereto each roller for electrophotography was loaded into the above-mentioned laser printer in the same manner as in that used in the evaluation of image (fogging), and the resultant was set under a high-temperature and high-humidity environment (hereinafter referred to as "H/H") having a temperature of 32° C. and a relative humidity of 85% and then left to stand for 30 minutes.

Next, under this environment, an image in which the alphabet letter "E" with a size of 4 points was printed so that the coverage was 1% with respect to the area of A4-size paper (hereinafter sometimes referred to as "E letter image") was continuously output on 500 copy sheets. Then, the toner cartridge and the laser printer were set under a low-temperature and low-humidity environment (hereinafter referred to as "L/L") having a temperature of 15° C. and a relative humidity of 10% and then left to stand for 30 minutes. Next, under this environment, an image in which the alphabet letter "E" with a size of 4 points was printed so that the coverage was 1% with respect to the area of A4-size paper (hereinafter sometimes referred to as "E letter image") was continuously output on 500 copy sheets.

The image output under H/H and L/L was set as one cycle, and five cycles in total were repeated.

Next, the toner charging amount and the toner charging amount distribution were measured in the same manner as in the measurement before the environmental cycle test. Further, the roller for electrophotography was removed from the toner cartridge, and the failure state in the vicinity of the surface layer of the roller for electrophotography was evaluated based on the following criteria.

Rank A: No failure is recognized over the entire roller for electrophotography.
Rank B: Minor failure is recognized only in an end portion of the roller for electrophotography (range of 1.5 cm from the farthest end portion of the elastic layer in a longitudinal direction).
Rank C: Minor failure is recognized in a region except the end portion of the roller for electrophotography.
Rank D: Failure is recognized in any part of the entire roller for electrophotography, and a problem occurs on an image.

The results of the evaluations [6-1] to [6-4] are shown in Table 11-3.

TABLE 11-3

| | | | | | | Evaluation item No. | | | |
| | | | | | | 6-4 | 6-4 | 6-4 | 6-4 |
| | | Partial structure | 6-2 | 6-3 | 6-1 | Evaluation results after high-temperature and high-humidity/low-temperature and low-humidity cycle | | | |
| | Urethane group concentration | of urethane resin in surface | Initial evaluation results | | | | | | |
| | | | Toner charge amount | Toner charge amount | Fogged image evaluation | Failure in vicinity of surface | Toner charge amount | Toner charge amount | Fogged image evaluation |
| Example | (%) | layer | (μC/g) | distribution | rank | layer | (μC/g) | distribution | rank |
| 1 | 6.8 | — | −42 | 2.9 | A | A | −39 | 3.2 | A |
| 2 | 6.6 | — | −46 | 2.2 | A | A | −43 | 2.5 | A |
| 3 | 1.3 | — | −47 | 2.5 | A | A | −44 | 2.8 | A |
| 4 | 4.8 | (1) | −45 | 2.6 | A | A | −42 | 2.8 | A |
| 5 | 1.5 | (1) | −40 | 2.4 | A | A | −37 | 2.6 | A |
| 6 | — | — | −42 | 2.6 | A | B | −39 | 3.1 | B |
| 7 | — | — | −44 | 2.7 | A | B | −41 | 3.2 | B |
| 8 | — | — | −46 | 2.5 | A | B | −43 | 3.0 | B |
| 9 | — | — | −44 | 2.5 | A | B | −41 | 3.0 | B |
| 10 | 6.6 | — | −43 | 2.6 | A | A | −40 | 2.9 | A |
| 11 | | | −42 | 2.7 | A | A | −39 | 3.0 | A |
| 12 | | | −36 | 3.8 | B | A | −33 | 4.1 | B |
| 13 | | | −40 | 2.4 | A | A | −37 | 2.7 | A |
| 14 | | | −38 | 3.6 | B | A | −35 | 3.9 | B |
| 15 | | | −38 | 3.4 | B | A | −35 | 3.7 | B |
| 16 | | | −40 | 3.7 | B | A | −37 | 4.0 | B |
| 17 | 4.8 | (1) | −40 | 2.9 | A | A | −37 | 3.1 | A |

TABLE 11-3-continued

| Example | Urethane group concentration (%) | Partial structure of urethane resin in surface layer | 6-2 Toner charge amount (μC/g) | 6-3 Toner charge amount distribution | 6-1 Fogged image evaluation rank | 6-4 Failure in vicinity of surface layer | 6-4 Toner charge amount (μC/g) | 6-4 Toner charge amount distribution | 6-4 Fogged image evaluation rank |
|---|---|---|---|---|---|---|---|---|---|
| 18 | 1.5 | (1) | −39 | 2.4 | A | A | −36 | 2.6 | A |
| 19 | 6.5 | — | −38 | 2.9 | A | A | −35 | 3.15 | A |
| 20 | 4.8 | (1) | −38 | 2.3 | A | A | −35 | 2.5 | A |
| 21 |  |  | −42 | 2.3 | A | A | −39 | 2.5 | A |
| 22 |  |  | −32 | 3.6 | B | A | −29 | 3.8 | B |
| 23 |  |  | −39 | 2.7 | A | A | −36 | 2.9 | A |
| 24 |  |  | −40 | 2.7 | A | A | −37 | 2.9 | A |
| 25 | 6.2 | (2) | −42 | 2.5 | A | A | −39 | 2.7 | A |
| 26 | 2.8 | (2) | −38 | 2.4 | A | A | −35 | 2.6 | A |
| 27 | 3.4 | (3) | −42 | 2.3 | A | A | −39 | 2.5 | A |
| 28 | 2.5 | (3) | −42 | 2.2 | A | A | −39 | 2.4 | A |
| 29 |  |  | −41 | 3.6 | B | A | −38 | 3.8 | B |
| 30 |  |  | −28 | 4.2 | C | A | −25 | 4.4 | C |
| 31 |  |  | −38 | 3.4 | B | A | −35 | 3.6 | B |
| 32 |  |  | −39 | 3.9 | B | A | −36 | 4.1 | B |
| 33 |  |  | −36 | 3.8 | B | A | −33 | 4 | B |
| 34 |  |  | −37 | 4.1 | C | A | −34 | 4.3 | C |
| 35 | 6.2 | (2) | −40 | 2.7 | A | A | −37 | 2.9 | A |
| 36 |  |  | −39 | 2.4 | A | A | −36 | 2.6 | A |
| 37 |  |  | −39 | 2.6 | A | A | −36 | 2.8 | A |
| 38 |  |  | −41 | 2.6 | A | A | −38 | 2.8 | A |

Comparative Example 1

Respective materials in amounts shown in Table 12 were mixed with a pressure kneader. A 6-liter pressure kneader (product name: TD6-15MDX, manufactured by Toshin Co., Ltd.) was used as a mixer. Mixing conditions were set to a loading ratio of 70 vol %, a blade rotation speed of 30 rpm, and 16 minutes. An electro-conductive layer was formed on a support in the same manner as in Example 1 except that the obtained unvulcanized rubber composition was used as it was as an unvulcanized rubber composition for forming an electro-conductive layer. Next, the coating material S-1 for a surface layer was applied onto the electro-conductive layer by dip coating and was subjected to heat treatment at a temperature of 150° C. for 1 hour, to thereby produce a roller for electrophotography of Comparative Example 1 having a surface layer with a thickness of 15 μm formed on the outer periphery of the electro-conductive layer.

TABLE 12

|  | Raw material name | Blending amount (part(s) by mass) |
|---|---|---|
| Raw material rubber | NBR (product name: N230SV; manufactured by JSR Corporation) | 100 (solid content) |
| Vulcanizing agent | Sulfur | 3 |
| Conductive agent | Ion conductive agent (product name: ADK CIZER LV70, manufactured by ADEKA Corporation) | 3 |
| Vulcanization aid | Tetrabenzylthiuram disulfide (product name: TBZTD, manufactured by Sanshin Chemical Industry Co., Ltd.) | 1 |

Comparative Example 2

A roller for electrophotography of Comparative Example 2 was produced in the same manner as in Comparative Example 1 except that respective materials in amounts shown in Table 13 were used.

TABLE 13

|  | Raw material name | Blending amount (part(s) by mass) |
|---|---|---|
| Raw material rubber | NBR (product name: N230SV; manufactured by JSR Corporation) | 100 |
| Conductive particles | Carbon black (product name: TOKABLACK #7360 manufactured by Tokai Carbon Co., Ltd.) | 50 |
| Vulcanizing agent | Sulfur | 3 |
| Vulcanization aid | Tetrabenzylthiuram disulfide (product name: TBZTD, manufactured by Sanshin Chemical Industry Co., Ltd.) | 1 |

Comparative Example 3

Respective materials in amounts shown in Table 14 were mixed with a pressure kneader to obtain an unvulcanized rubber composition for forming domains. A 6-liter pressure kneader (product name: TD6-15MDX, manufactured by Toshin Co., Ltd.) was used as a mixer. Mixing conditions were set to a loading ratio of 70 vol %, a blade rotation speed of 30 rpm, and 16 minutes.

TABLE 14

| Raw material name | | Blending amount (parts by mass) |
|---|---|---|
| Raw material rubber | NBR (product name: N230SV; manufactured by JSR Corporation) | 100 |
| Conductive particles | Carbon black (product name: Ketjen black EC300J, manufactured by Lion Specialty Chemicals Co., Ltd.) | 10 |
| Vulcanization accelerator aid | Zinc oxide (product name: Zinc white, manufactured by Sakai Chemical Industry Co., Ltd.) | 5 |
| Processing aid | Zinc stearate (product name: SZ-2000, manufactured by Sakai Chemical Industry Co., Ltd.) | 2 |

Next, respective materials in amounts shown in Table 15 were mixed with a pressure kneader to obtain an unvulcanized rubber composition for forming a matrix. A 6-liter pressure kneader (product name: TD6-15MDX, manufactured by Toshin Co., Ltd.) was used as a mixer. Mixing conditions were set to a loading ratio of 70 vol %, a blade rotation speed of 30 rpm, and 16 minutes.

TABLE 15

| Raw material name | | Blending amount (parts by mass) |
|---|---|---|
| Raw material rubber | Epichlorohydrin rubber (product name: Epion ON301, manufactured by Daiso Co., Ltd.) | 100 |
| Conductive agent | Ion conductive agent (product name: ADK CIZER LV70, manufactured by ADEKA Corporation) | 3 |
| Filler | Calcium carbonate (product name: Nanox #30, manufactured by Maruo Calcium Co., Ltd.) | 70 |
| Vulcanization accelerator aid | Zinc oxide (product name: Zinc white, manufactured by Sakai Chemical Industry Co., Ltd.) | 7 |
| Processing aid | Zinc stearate (product name: SZ-2000, manufactured by Sakai Chemical Industry Co., Ltd.) | 2.8 |

Next, the unvulcanized rubber composition for forming domains and the unvulcanized rubber composition for forming a matrix prepared above were mixed in blending amounts shown in Table 16 to obtain an unvulcanized rubber mixture. A 6-liter pressure kneader (product name: TD6-15MDX, manufactured by Toshin Co., Ltd.) was used as a mixer. Mixing conditions were set to a loading ratio of 70 vol %, a blade rotation speed of 30 rpm, and 16 minutes.

TABLE 16

| Raw material name | Blending amount (parts by mass) |
|---|---|
| Unvulcanized rubber composition for forming domains | 20 |
| Unvulcanized rubber composition for forming matrix | 80 |

100 Parts by mass of the unvulcanized rubber mixture obtained above, 3 parts by mass of sulfur (product name: Sulfax PMC, manufactured by Tsurumi Chemical Industry Co., Ltd.), and 2 parts by mass of tetrabenzylthiuram disulfide (product name: TBZTD, manufactured by Sanshin Chemical Industry Co., Ltd.) were mixed to prepare an unvulcanized rubber composition EC-3 for molding an electrophotographic electro-conductive member. An open roll having a roll diameter of 12 inches (0.30 m) was used as a mixer. The mixing was performed under the following conditions: the mixture was bilaterally cut 20 times in total at a front roll rotation speed of 10 rpm, a back roll rotation speed of 8 rpm, and a roll gap of 2 mm, and was then subjected to tight milling 10 times at a roll gap of 0.5 mm. A roller for electrophotography of Comparative Example 3 was obtained in the same manner as in Example 1 except that the unvulcanized rubber composition EC-3 for forming an electro-conductive layer thus obtained was used.

Comparative Examples 4 to 14

Preparation of Unvulcanized Rubber Compositions EC-4 to EC-8, EC-11, and EC-12 for Forming Domains Unvulcanized rubber compositions EC-4 to EC-8, EC-11, and EC-12 for forming domains were prepared in the same manner as in Comparative Example 3 except that materials shown in Table 17-1 were used as rubbers and conductive agents at blending ratios shown in Table 17-1.

TABLE 17-1

| Unvulcanized rubber composition for forming domains | Rubber | | | | Conductive agent | | | |
|---|---|---|---|---|---|---|---|---|
| | Kind | Product name | SP value | Mooney viscosity (M) | Kind | phr | DBP absorption | pH |
| EC-1 | — | — | — | — | — | — | — | — |
| EC-2 | — | — | — | — | — | — | — | — |
| EC-3 | NBR | N230SV | 19.2 | 122 | Ketjen | 10 | 360 | 9.0 |
| EC-4 | NBR | N230SV | 19.2 | 122 | #7360 | 60 | 87 | 7.5 |
| EC-5 | SBR | T2003 | 17 | 135 | — | — | — | — |
| EC-6 | BR | JSR T0700 | 17.1 | 132 | #7360 | 80 | 87 | 7.5 |
| EC-7 | BR | JSR T0700 | 17.1 | 132 | #7360 | 50 | 87 | 7.5 |
| EC-8 | NBR | N230SV | 19.2 | 122 | Ketjen | 20 | 360 | 9.0 |
| EC-9 | — | — | — | — | — | — | — | — |
| EC-10 | — | — | — | — | — | — | — | — |

TABLE 17-1-continued

| Unvulcanized rubber composition for forming domains | Rubber | | | | Conductive agent | | | |
|---|---|---|---|---|---|---|---|---|
| | Kind | Product name | SP value | Mooney viscosity (M) | Kind | phr | DBP absorption | pH |
| EC-11 | BR | JSR T0700 | 17.1 | 133 | #7360 | 80 | 87 | 7.5 |
| EC-12 | SBR | T2003 | 17 | 135 | #7360 | 60 | 87 | 7.5 |

Preparation of Unvulcanized Rubber Compositions EC-4 to EC-12 for Forming Matrices Unvulcanized rubber compositions EC-4 to EC-12 for forming matrices were prepared in the same manner as in Comparative Example 3 except that materials shown in Table 17-2 were used as rubber species and additives at blending ratios shown in Table 17-2. In Table 17-2, the composition of the rubber mixture for forming a matrix prepared in each of Comparative Examples 1 to 3 above is also shown.

TABLE 17-2

| Unvulcanized rubber composition for forming matrix | Rubber species | | | | Additive | |
|---|---|---|---|---|---|---|
| | Kind | Product name | SP value | Mooney viscosity (M) | Kind | phr |
| EC-1 | NBR | N230SV | 19.2 | 120 | LV | 3 |
| EC-2 | NBR | N230SV | 19.2 | 120 | #7360 | 50 |
| EC-3 | ECO | ON301 | 19.2 | 32 | LV | 3 |
| EC-4 | SBR | T2003 | 17 | 45 | #7360 | 20 |
| EC-5 | NBR | N230SV | 19.2 | 32 | #7360 | 60 |
| EC-6 | EPDM | Esprene 505A | 16 | 47 | — | — |
| EC-7 | EPDM | Esprene 505A | 16 | 47 | — | — |
| EC-8 | SBR | T2003 | 17 | 45 | — | — |
| EC-9 | ECO | ON301 | 19.2 | 32 | LV | 3 |
| EC-10 | NBR | N230SV | 19.2 | 120 | #7360 | 50 |
| EC-11 | EPDM | Esprene 505A | 16 | 47 | — | — |
| EC-12 | NBR | N230SV | 19.2 | 32 | — | — |

Preparation of Unvulcanized Rubber Compositions EC-4 to EC-12 for Forming Conductive Layers Unvulcanized rubber compositions EC-4 to EC-12 for forming conductive layers were prepared in the same manner as in Comparative Example 3 except that the unvulcanized rubber compositions for forming domains, the unvulcanized rubber compositions for forming matrices, and other materials were used at blending ratios shown in Table 18.

TABLE 18

| | Unvulcanized rubber composition | | Vulcanizing agent | | Vulcanization aid | |
|---|---|---|---|---|---|---|
| | Blade rotation speed | For forming domains | For forming matrix | | | |
| | rpm | phr | phr | Kind | phr | Kind | phr |
| EC-1 | — | 0 | 100 | Sulfur | 3 | TBZTD | 1 |
| EC-2 | — | 0 | 100 | Sulfur | 3 | | 1 |
| EC-3 | 30 | 20 | 80 | Sulfur | 3 | | 1 |
| EC-4 | 30 | 25 | 75 | Sulfur | 3 | | 1 |
| EC-5 | 30 | 75 | 25 | Sulfur | 3 | | 1 |
| EC-6 | 30 | 60 | 40 | Sulfur | 3 | MBTS | 2 |
| EC-7 | 30 | 10 | 90 | Sulfur | 3 | (Sanceler DM) | 2 |
| EC-8 | 30 | 45 | 55 | Sulfur | 3 | TBZTD | 1 |
| EC-9 | — | 0 | 100 | Sulfur | 3 | | 1 |
| EC-10 | — | 0 | 100 | Sulfur | 3 | | 1 |
| EC-11 | 30 | 25 | 75 | Sulfur | 3 | MBTS (Sanceler DM) | 2 |
| EC-12 | 30 | 75 | 25 | Sulfur | 3 | TBZTD | 1 |

Production of Rollers for Electrophotography According to Comparative Examples 4 to 10 and 12 to 14

An electro-conductive layer was formed on a support in the same manner as in Comparative Example 3 except that the unvulcanized rubber compositions EC-4 to EC-10 and EC-12 for forming conductive layers were used. Next, rollers for electrophotography according to Comparative Examples 4 to 10 and 12 to 14 were produced in the same manner as in Comparative Example 3 except that, as the coating materials for forming surface layers, materials shown in Table 19 were used.

Production of Roller for Electrophotography According to Comparative Example 11

The unvulcanized rubber composition EC-11 for forming domains was independently heated and vulcanized, and then subjected to frozen pulverization to produce rubber particles. An unvulcanized rubber composition EC-11 for forming an electro-conductive layer was prepared by mixing various materials at blending ratios shown in Table 18 except that the above-mentioned rubber particles were used as a material for forming domains. An electro-conductive layer was formed on a support in the same manner as in Comparative Example 3 except that the unvulcanized rubber composition EC-11 for forming an electro-conductive layer was used. Then, a roller for electrophotography of Comparative Example 11 was produced in the same manner as in Comparative Example 3 except that, as the coating material for forming a surface layer, a material shown in Table 19 was used.

In the roller for electrophotography of Comparative Example 11, the electro-conductive layer contains large-sized and anisotropic conductive rubber particles formed by subjecting a crosslinked rubber to frozen pulverization, and hence conductive paths are non-uniformly formed in the electro-conductive layer, which is the same state as in the case in which the thickness of each domain is large. As a result, the slope of the impedance at high frequencies was −1.

Production of Rollers for Electrophotography According to Comparative Examples 13 and 14

Rollers for electrophotography according to Comparative Examples 13 and 14 were each produced in the same manner as in Comparative Example 5 except that the coating material S-15 or S-16 for forming a surface layer was used.

The obtained conductive rollers according to Comparative Examples 1 to 14 were subjected to the evaluations [5-1] to [5-10] and the evaluations [6-1] to [6-4].

The results of the evaluations [5-1] to [5-10] are shown in Tables 20-1 and 20-2, and the results of the evaluations [6-1] to [6-4] are shown in Table 21.

TABLE 19

| | Unvulcanized rubber composition for forming conductive layer | Coating material for forming surface layer |
|---|---|---|
| Comparative Example 1 | EC-1 | S-1 |
| Comparative Example 2 | EC-2 | |
| Comparative Example 3 | EC-3 | |
| Comparative Example 4 | EC-4 | |
| Comparative Example 5 | EC-5 | |
| Comparative Example 6 | EC-6 | |
| Comparative Example 7 | EC-7 | |
| Comparative Example 8 | EC-8 | S-4 |
| Comparative Example 9 | EC-9 | |
| Comparative Example 10 | EC-10 | |
| Comparative Example 11 | EC-11 | |
| Comparative Example 12 | EC-12 | |
| Comparative Example 13 | E-5 | S-15 |
| Comparative Example 14 | | S-16 |

TABLE 20-1

| | | | | Evaluation item No. | | | |
|---|---|---|---|---|---|---|---|
| | | | | 5-1 | 5-2 Conductive layer | 5-2 | 5-2 Outer surface/support |
| Comparative Example | Conductive layer | Surface layer | MD structure | | Impedance at $10^{-2}$ Hz to $10^1$ Hz Ω | Slope at $10^6$ Hz to $10^7$ Hz — | Impedance at $10^{-2}$ Hz to $10^1$ Hz Ω |
| 1 | EC-1 | S-1 | N | | 2.10E+06 | −1 | 1.16E+06 |
| 2 | EC-2 | | N | | 3.10E+04 | −1 | 1.71E+04 |
| 3 | EC-3 | | Y | | 5.12E+06 | −1 | 2.82E+06 |
| 4 | EC-4 | | Y | | 6.15E+06 | −1 | 3.38E+06 |
| 5 | EC-5 | | Y | | 2.21E+04 | −1 | 1.22E+04 |
| 6 | EC-6 | | N | | 1.60E+05 | −1 | 8.79E+04 |
| 7 | EC-7 | | Y | | 2.16.E+11 | −1 | 1.19E+11 |
| 8 | EC-8 | S-4 | Y | | 1.50E+02 | −0.7 | 2.50E+04 |
| 9 | EC-9 | | Y | | 1.50.E+06 | −1 | 5.25E+05 |
| 10 | EC-10 | | Y | | 2.40.E+06 | −1 | 8.40E+05 |
| 11 | EC-11 | | Y | | 6.97.E+04 | −0.9 | 8.44E+04 |
| 12 | EC-12 | | Y | | 1.80E+03 | −1 | 7.10E+04 |
| 13 | E-5 | S-15 | Y | | 2.38E+08 | −0.43 | 6.80E+04 |
| 14 | | S-16 | Y | | 2.38E+08 | −0.43 | 1.60E+12 |

| | Evaluation item No. | | | | |
|---|---|---|---|---|---|
| | 5-2 Conductive support Impedance | 5-3 Matrix | 5-4 Domain | 5-5 Resistivity ratio | 5-8 Volume |
| Comparative Example | at $10^{-2}$ Hz to $10^1$ Hz Ω | Distance μm | Volume resistivity Ω·cm | Volume resistivity Ω·cm | between matrix and domain | fraction of domain % |
| 1 | 8.79E−03 | — | — | — | — | — |
| 2 | 9.51E−03 | — | — | — | — | — |
| 3 | 5.60E−03 | 0.21 | 1.44E+07 | 9.80E+02 | 3.9 | 19.7 |

TABLE 20-1-continued

| | | | | | | |
|---|---|---|---|---|---|---|
| 4 | 5.20E−03 | 0.21 | 1.87E+07 | 9.56E+06 | −0.3 | 24.6 |
| 5 | 9.23E−03 | 0.21 | 9.18E+04 | 3.14E+14 | — | 24.9 |
| 6 | 5.50E−03 | — | — | — | 13.8 | 59.9 |
| 7 | 1.56E−03 | 0.21 | 6.56E+15 | 7.51E+03 | 14.6 | 10.5 |
| 8 | 9.30E−03 | 0.21 | 7.61E+15 | 3.61E+01 | 14.0 | 48.2 |
| 9 | 2.50E+06 | 0.21 | 8.70E+15 | 4.99E+01 | 14.4 | 41.9 |
| 10 | 2.10E+04 | 0.21 | 3.45E+14 | 8.20E−01 | 13.4 | 39.4 |
| 11 | 4.20E−03 | 11.2 | 9.27E+15 | 8.65E+01 | 15.6 | 25.0 |
| 12 | 8.66E−03 | 0.26 | 7.66E+08 | 7.79E+01 | 7.0 | 24.9 |
| 13 | 6.80E−03 | 1.18 | 6.62E+16 | 6.63E+00 | 16.0 | 41.4 |
| 14 | 6.80E−03 | 1.18 | 6.62E+16 | 6.63E+00 | 16.0 | 41.4 |

TABLE 20-2

| | | | Evaluation item No. | | | |
|---|---|---|---|---|---|---|
| | | | 5-7 | 5-10 | 5-10 Domain | 5-6 |
| Comparative Example | Conductive layer | Surface layer | Interdomain distance Dm μm | Requirement (B2) sectional area proportion (average value) % | Number % of domains each satisfying requirement (B2) % | Perimeter A μm |
| 1 | EC-1 | S-1 | — | — | — | — |
| 2 | EC-2 | | — | — | — | — |
| 3 | EC-3 | | 0.21 | 12 | 66 | 4.66 |
| 4 | EC-4 | | 0.21 | 25 | 82 | 4.90 |
| 5 | EC-5 | | 0.21 | — | — | 5.59 |
| 6 | EC-6 | | — | — | — | — |
| 7 | EC-7 | | 0.21 | 35 | 86 | 4.76 |
| 8 | EC-8 | S-4 | 0.21 | 15 | 67 | 4.98 |
| 9 | EC-9 | | 0.21 | 22 | 75 | 5.18 |
| 10 | EC-10 | | 0.21 | 23 | 78 | 5.02 |
| 11 | EC-11 | | 11.2 | 33 | 83 | 34.86 |
| 12 | EC-12 | | 0.24 | 30 | 89 | 0.74 |
| 13 | E-5 | S-15 | 1.18 | 37 | 97 | 3.37 |
| 14 | | S-16 | 1.18 | 37 | 97 | 3.37 |

| | Evaluation item No. | | | | | | |
|---|---|---|---|---|---|---|---|
| | 5-6 | 5-6 | 5-6 Domain | 5-9 | | | |
| Comparative Example | Envelope perimeter B μm | A/B | Number % of domains each satisfying requirement (B3) % | Number of cubes each satisfying requirement (B1) Pieces | 5-10 Area proportion μ % | 5-10 Conductive particles σ | 5-10 μ/σ |
| 1 | — | — | — | — | — | — | — |
| 2 | — | — | — | — | — | — | — |
| 3 | 4.44 | 1.05 | 76 | 4 | 12 | 80 | 0.15 |
| 4 | 4.80 | 1.02 | 71 | 6 | 25 | 208 | 0.12 |
| 5 | 5.43 | 1.03 | 53 | 4 | — | — | — |
| 6 | — | — | — | — | — | — | — |
| 7 | 4.74 | 1.00 | 65 | 5 | 35 | 233 | 0.15 |
| 8 | 4.88 | 1.02 | 52 | 6 | 15 | 115 | 0.13 |
| 9 | 5.03 | 1.03 | 74 | 7 | 22 | 100 | 0.22 |
| 10 | 4.78 | 1.05 | 76 | 4 | 23 | 115 | 0.20 |
| 11 | 23.24 | 1.50 | 22 | 3 | 33 | 51 | 0.65 |
| 12 | 0.71 | 1.04 | 85 | 9 | 30 | 156 | 0.19 |
| 13 | 3.24 | 1.04 | 92 | 9 | 37 | 371 | 0.10 |
| 14 | 3.24 | 1.04 | 92 | 9 | 37 | 371 | 0.10 |

TABLE 21

| | | | | | 6-2 | 6-3 | 6-1 | 6-4 | 6-4 | 6-4 | 6-4 |
|---|---|---|---|---|---|---|---|---|---|---|---|
| | | | | Partial | Initial evaluation results | | | Evaluation results after high-temperature and high-humidity/low-temperature and low-humidity cycle | | | |
| Comparative Example | Conductive layer | Surface layer | Urethane group concentration (%) | structure of urethane resin in surface layer | Toner charge amount ($\mu$C/g) | Toner charge amount distribution | Fogged image | Failure in vicinity of surface layer | Toner charge amount ($\mu$C/g) | Toner charge amount distribution | Fogged image |
| 1 | EC-1 | S-1 | 6.8 | — | −36 | 4.8 | D | C | −33 | 5 | D |
| 2 | EC-2 | | | | −38 | 5.1 | D | C | −35 | 5.3 | D |
| 3 | EC-3 | | | | −35 | 4.7 | D | B | −32 | 4.9 | D |
| 4 | EC-4 | | | | −35 | 4.9 | D | B | −32 | 5.1 | D |
| 5 | EC-5 | | | | −31 | 5.3 | D | C | −28 | 5.5 | D |
| 6 | EC-6 | | | | −38 | 4.8 | D | C | −35 | 5 | D |
| 7 | EC-7 | | | | −20 | 6.6 | D | C | −17 | 6.8 | D |
| 8 | EC-8 | S-4 | 4.8 | (1) | −22 | 5.2 | D | A | −19 | 5.4 | D |
| 9 | EC-9 | | | | −28 | 5.6 | D | A | −25 | 5.8 | D |
| 10 | EC-10 | | | | −30 | 5.0 | D | C | −27 | 5.2 | D |
| 11 | EC-11 | | | | −32 | 5.7 | D | C | −29 | 5.9 | D |
| 12 | EC-12 | | | | −36 | 4.8 | D | C | −33 | 5 | D |
| 13 | E-5 | S-15 | 6.8 | — | −38 | 4.7 | D | C | −35 | 4.9 | D |
| 14 | | S-16 | 0 | — | −38 | 4.9 | D | C | −35 | 5.1 | D |

Each of the developing rollers according to Examples 1 to 38 has the configuration of the present disclosure in the electro-conductive layer. In addition, the impedance in a low frequency range measured between the outer surface of the developing roller and the outer surface of the support is $1.0 \times 10^4 \Omega$ to $1.0 \times 10^{11} \Omega$. Accordingly, a high-quality image having a sharp charge amount distribution and a significantly small numerical value of fogging was obtained.

Further, in each of Examples 1 to 5 and Examples 10 to 38 in which the surface layer is a urethane resin, a sharp charge amount distribution and satisfactory image characteristics are maintained without occurrence of failure in the vicinity of the surface even after the environmental cycle test.

Meanwhile, in each of the developing rollers of Comparative Examples 1 to 12 having no conductive layer according to the present disclosure and Comparative Examples 13 and 14 in which the impedance in a low frequency range measured between the outer surface of the developing roller and the outer surface of the support was outside of the scope of the present disclosure, a charge amount distribution was large, and image quality was not satisfactory.

Example 39

[Production of Developing Blade]

The unvulcanized rubber composition E-2 for forming an electro-conductive layer was treated at a temperature of 160° C. for 10 minutes while being pressurized to a die having a width of 250 mm, a length of 150 mm, and a thickness of 0.7 mm with a pressure pressing machine, to thereby obtain a rubber sheet 1 having a thickness of 0.7 mm. The obtained rubber sheet 1 was cut into a width of 215 mm and a length of 12 mm. In addition, a sheet metal having the same shape as that of a sheet metal used for a developing blade of a process cartridge for electrophotography to be described later was prepared. The above-mentioned rubber sheet was bonded to the sheet metal via an adhesive. In this case, the rubber sheet was bonded to the sheet metal so that the length of a portion overlapping the sheet metal in the length of 12 mm of the rubber sheet was set to 4.5 mm, and the remaining portion of 7.5 mm protruded from the sheet metal. In addition, an electro-conductive hot-melt type adhesive was used as the adhesive. Next, the coating material S-1 for forming a surface layer was applied onto the surface of the rubber sheet by dip coating and air-dried, and was then subjected to heat treatment at a temperature of 150° C. for 1 hour, to thereby obtain a developing blade according to Example 39 having a resin layer with a thickness of 15 µm on the outer periphery of the electro-conductive layer.

7. Evaluation of Characteristics

[7-1] The Obtained Developing Blade was Subjected to the Evaluations 5-1 and 5-3 to 5-10

[7-2] Measurement of Slope at $1 \times 10^6$ Hz to $1 \times 10^7$ Hz and Impedance at $1 \times 10^{-2}$ Hz to $1 \times 10^1$ Hz The impedance measurement according to the present disclosure was performed as described below.

First, as pretreatment, platinum was deposited from the vapor on the outer surface of the developing blade to produce a measuring electrode. In this case, a rectangular electrode having a length of 213 mm was produced in a part of from 1 mm to 6 mm from the tip of a surface of the developing blade to which the sheet metal was not bonded, through use of a masking tape. Next, a conducting wire was bonded to the electrode via a silver paste, and the electrode was connected to a measuring electrode of an impedance-measuring device (Solartron 1260 and 1296 manufactured by Toyo Corporation).

The impedance measurement was performed by measuring an impedance at a vibration voltage of 1 Vpp, a DC current of 10 V, and a frequency of $10^{-2}$ Hz to $10^7$ Hz (measured at 5 points when the frequency was changed by one order of magnitude) under an environment having a temperature of 23° C. and a relative humidity of 50% to obtain an absolute value of the impedance. Then, through use of the measurement results, a graph was created by the log-log plotting of the absolute value of the impedance and the frequency. From the graph, an impedance at $1.0 \times 10^{-2}$ Hz to $1.0 \times 10^1$ Hz was calculated.

Next, the surface layer was peeled off from the developing blade, and platinum was deposited from the vapor on the surface of the electro-conductive layer to produce a measuring electrode in the same manner as described above. Then, the impedance was measured in the same manner as described above, and a graph was created. From this graph, the slope at a frequency of $1.0 \times 10^6$ Hz to $1.0 \times 10^7$ Hz was calculated. In addition, the impedance at $1.0 \times 10^{-2}$ Hz to $1.0 \times 10^1$ Hz was calculated.

[7-3] Evaluation of Image (Fogging)

In order to recognize the sustainable charge-imparting property of the developing blade in a high-speed process, the following evaluation was performed.

First, the developing blade according to Example 39 was left to stand under an environment having a temperature of 23° C. and a relative humidity of 50% for 48 hours. Next, the developing blade according to Example 39 was mounted as a developing blade of a process cartridge for a laser printer (product name: Laserjet M608dn, manufactured by Hewlett-Packard Company).

Meanwhile, in order to perform the evaluation in a high-speed process, the above-mentioned laser printer was reconstructed so that the number of output sheets per unit time was 75 sheets/min for A4-size paper, which was larger than the original number of output sheets. In this case, the output speed of a recording medium was set to 380 mm/sec, and the image resolution was set to 1,200 dpi. In addition, an electrode for applying a voltage to the developing blade was reconstructed so that a voltage was able to be applied to the developing blade by an external power source, and a metal portion of a developing sleeve and the sheet metal of the developing blade were electrically connected to each other. This laser printer was also left to stand under an environment having a temperature of 23° C. and a relative humidity of 50% for 48 hours.

Next, the process cartridge was loaded into the laser printer and left to stand under an environment having a temperature of 32° C. and a relative humidity of 85% for 4 hours. After that, a process of outputting a solid white image having a printing rate of 0% on recording paper under the same environment was performed, and a power source of the color laser printer was turned off in the middle of the process. The charge amount Q/M (µC/g) of the toner on the developing sleeve before passage through the nip between the photosensitive member and the developing sleeve at this time was measured.

Specifically, the measurement of the charge amount of the toner is the same as that in the evaluation of the developing roller. The above-mentioned operation was repeated three times on one developing sleeve, and the charge amount of the toner was measured three times. The arithmetic average value of the measured charging quantities was determined and adopted as the charge amount of the toner by the developing blade to be evaluated.

Further, when the printer was stopped while the solid white image was being output, a developer adhering to the photosensitive member before being transferred was scraped off with a tape, and the reflectance $R_1$ of the tape was measured with a reflection densitometer (product name: TC-6DS/A, manufactured by Tokyo Denshoku Co., Ltd.). The decrease amount "$R_0$-$R_1$" (%) of reflectance with respect to the reflectance $R_0$ reference of an unused tape was calculated and adopted as a fogging value. The fogging values were ranked based on the following criteria.

Rank A: The fogging value is less than 1.5%.

Rank B: The fogging value is 1.5% or more and less than 3.0%.

Rank C: The fogging value is 3.0% or more and less than 5.0%.

Rank D: The fogging value is 5.0% or more.

[7-4] Toner Charge Amount

The charge amount was measured in order to evaluate the charge-imparting property of the developing blade with respect to the toner.

At the time of the above-mentioned fogged image evaluation, the toner carried in a narrow portion of a part of the developing sleeve sandwiched between the developing blade and a photosensitive member abutment position was sucked and collected by a metal cylindrical tube and a cylindrical filter. In this case, the charge quantity stored in a capacitor through the metal cylindrical tube and the mass of the sucked toner were measured. The charge quantity was measured through use of a measuring machine (product name: 8252) manufactured by ADC Corporation. Then, from those values, the charge quantity (µC/g) per unit mass was calculated. When negatively chargeable toner is used, the sign of the charge quantity per unit mass is negative, and it can be said that, when the absolute value is larger, the charge-imparting property of the developing blade is higher. The value obtained by the measurement was adopted as a charge amount.

[7-5] Toner Charge Amount Distribution

In order to evaluate the spread of a toner charge amount, a charge amount distribution was measured.

The charge amount distribution was measured through use of E-spart Analyzer Model EST-III (manufactured by Hosokawa Micron Corporation). The charge amount distribution was measured in the same manner as in the toner charge amount measurement except for the foregoing. The number of measurement particles was set to about 3,000. A standard deviation was calculated from the obtained charge amount distribution, and the obtained value was adopted as an initial toner charge amount distribution.

The evaluation results are shown in Tables 24 to 27.

[7-6] High-Temperature and High-Humidity/Low-Temperature and Low-Humidity Cycle Test A test for performing evaluation alternately under a high-temperature and high-humidity environment and a low-temperature and low-humidity environment (hereinafter referred to as "environmental cycle test") was performed as described below. First, a magenta toner cartridge having mounted thereto each developing blade was loaded into the above-mentioned laser printer in the same manner as in that used in the evaluation of an image (fogging), and the resultant was set under a high-temperature and high-humidity environment (hereinafter referred to as "H/H") having a temperature of 32° C. and a relative humidity of 85% RH and then left to stand for 30 minutes.

Next, under this environment, an image in which the alphabet letter "E" with a size of 4 points was printed so that the coverage was 1% with respect to the area of A4-size paper (hereinafter sometimes referred to as "E letter image") was continuously output on 500 copy sheets. Then, the toner cartridge and the laser printer were set under a low-temperature and low-humidity environment (hereinafter referred to as "L/L") having a temperature of 15° and a relative humidity of 10% RH and then left to stand for 30 minutes. Next, under this environment, an image in which the alphabet letter "E" with a size of 4 points was printed so that the coverage was 1% with respect to the area of A4-size paper (hereinafter sometimes referred to as "E letter image") was continuously output on 500 copy sheets.

The image output under H/H and L/L was set as one cycle, and five cycles in total were repeated.

Next, the toner charging quantity and the toner charging quantity distribution were measured in the same manner as in the measurement before the environmental cycle test. Further, the developing blade was removed from the toner cartridge, and the failure state in the vicinity of the surface layer of the developing blade was evaluated based on the following criteria.

Rank A: No failure is recognized over the entire developing blade.
Rank B: Minor failure is recognized only in an end portion of the developing blade (range of 1.5 cm from the farthest end portion of the elastic layer in a longitudinal direction).
Rank C: Minor failure is recognized in a region except the end portion of the developing blade.
Rank D: Failure is recognized in any part of the entire developing blade, and a problem occurs on an image.

Examples 40 to 45

Preparation of Unvulcanized Rubber Compositions E-39 to E-44 for Forming Domains Unvulcanized rubber compositions for forming domains were prepared in the same manner as the unvulcanized rubber composition E-1 for forming domains except that rubbers and conductive agents shown in Table 22-1 were used.

TABLE 22-1

| Unvulcanized domain rubber composition | Rubber | | | | Conductive agent | | | |
|---|---|---|---|---|---|---|---|---|
| | Kind | Product name | SP value | Mooney viscosity (M) | Kind | phr | DBP absorption | pH |
| E-39 | BR | JSR T0700 | 17.1 | 132 | #5500 | 55 | 155 | 6.0 |
| E-40 | BR | JSR T0700 | 17.1 | 135 | #7360 | 75 | 87 | 7.5 |
| E-41 | BR | JSR T0700 | 17.1 | 130 | #7360 | 85 | 87 | 7.5 |
| E-42 | NBR | DN401LL | 17.4 | 125 | #7360 | 55 | 87 | 7.5 |
| E-43 | NBR | N230S | 20 | 135 | #7360 | 35 | 87 | 7.5 |
| E-44 | SBR | T2000R | 17 | 152 | #7360 | 55 | 87 | 7.5 |

Preparation of Unvulcanized Rubber Compositions E-39 to E-44 for Forming Matrices Unvulcanized rubber compositions for forming matrices were prepared in the same manner as in the unvulcanized rubber composition E-1 for forming a matrix except that rubbers shown in Table 22-2 were used.

TABLE 22-2

| Unvulcanized matrix rubber composition | Rubber species | | | | Additive | |
|---|---|---|---|---|---|---|
| | Kind | Product name | SP value | Mooney viscosity (M) | Kind | phr |
| E-39 | EPDM | Esprene 505A | 16 | 47 | — | — |
| E-40 | SBR | T1000 | 16.8 | 45 | — | — |
| E-41 | | Zeospan | 17.8 | 65 | — | — |
| E-42 | SBR | T2003 | 17 | 45 | — | — |
| E-43 | SBR | T2003 | 17 | 45 | — | — |
| E-44 | BR | JSR T0700 | 17.1 | 43 | — | — |

"Zeospan" shown in the table is the product name of a polyether-based synthetic rubber manufactured by Zeon Corporation.

Preparation of Unvulcanized Rubber Compositions E-39 to E-44 for Forming Conductive Layers Unvulcanized rubber compositions E-39 to E-44 for forming conductive layers were prepared in the same manner as the unvulcanized rubber composition E-1 for forming an electro-conductive layer except that the unvulcanized rubber compositions E-39 to E-44 for forming domains, the unvulcanized rubber compositions E-39 to E-44 for forming matrices, and other materials were mixed at blending ratios shown in Table 22-3.

TABLE 22-3

| | Blade rotation speed | Unvulcanized rubber composition | | Vulcanizing agent | | Vulcanization aid | |
|---|---|---|---|---|---|---|---|
| | | For forming domains Parts | For forming matrix Parts | | | | |
| | rpm | by mass | by mass | Kind | phr | Kind | phr |
| E-39 | 30 | 15 | 85 | Sulfur | 3 | MBTS | 2 |
| E-40 | 30 | 25 | 75 | Sulfur | 3 | MBTS | 2 |
| E-41 | 30 | 25 | 75 | Sulfur | 3 | MBTS | 2 |
| E-42 | 30 | 25 | 75 | Sulfur | 3 | TBZTD | 1 |
| E-43 | 30 | 25 | 75 | Sulfur | 3 | TBZTD | 1 |
| E-44 | 30 | 25 | 75 | Sulfur | 3 | TBZTD | 1 |

[Production of Developing Blade]

Rubber sheets were produced in the same manner as in Example 39 except that the unvulcanized rubber compositions E-39 to E-44 for forming conductive layers were used, and each of the produced rubber sheets was bonded to a sheet metal. Next, developing blades according to Examples 40 to 45 were each obtained by forming a surface layer on the surface of each of the rubber sheets in the same manner as in Example 39 except that a coating material for forming a surface layer shown in Table 23 was used.

Examples 46 to 50

Developing blades according to Examples 46 to 50 were obtained in the same manner as in Example 45 except that the coating material for forming a surface layer was changed to materials shown in Table 23.

TABLE 23

| Example | Unvulcanized rubber composition for forming conductive layer | Coating liquid for forming surface layer |
|---|---|---|
| 39 | E-2 | S-1 |
| 40 | E-39 | S-1 |
| 41 | E-40 | S-2 |
| 42 | E-41 | S-3 |
| 43 | E-42 | |
| 44 | E-43 | |
| 45 | E-44 | |
| 46 | | S-4 |
| 47 | | S-5 |
| 48 | | S-8 |
| 49 | | S-9 |
| 50 | | S-12 |

Comparative Examples 15 to 19

Preparation of Unvulcanized Rubber Compositions EC-13 to EC-17 for Forming Domains Unvulcanized rubber compositions for forming domains were prepared in the same manner as the unvulcanized rubber composition E-1 for forming domains except that rubbers and conductive agents shown in Table 24-1 were used.

TABLE 24-1

| | Unvulcanized domain rubber composition | | | | | | | |
|---|---|---|---|---|---|---|---|---|
| | Rubber | | | | Conductive agent | | | |
| | Kind | Product name | SP value | Mooney viscosity (M) | Kind | phr | DBP absorption | pH |
| EC-13 | NBR | N230SV | 19.2 | 120 | LV | 3 | — | — |
| EC-14 | NBR | N230SV | 19.2 | 120 | #7360 | 50 | 87 | 7.5 |
| EC-15 | NBR | N230SV | 19.2 | 122 | #7360 | 60 | 87 | 7.5 |
| EC-16 | BR | JSR T0700 | 17.1 | 132 | #7360 | 50 | 87 | 7.5 |
| EC-17 | NBR | N230SV | 19.2 | 122 | Ketjen | 20 | 360 | 9.0 |

Preparation of Unvulcanized Rubber Compositions EC-15 to EC-17 for Forming Matrices Unvulcanized rubber compositions for forming matrices were prepared in the same manner as the unvulcanized rubber composition E-1 for forming a matrix except that rubbers shown in Table 24-2 were used.

TABLE 24-2

| | Unvulcanized matrix rubber composition | | | | | |
|---|---|---|---|---|---|---|
| | Rubber species | | | | Additive | |
| | Kind | Product name | SP value | Mooney viscosity (M) | Kind | phr |
| EC-15 | SBR | T2003 | 17 | 45 | #7360 | 20 |
| EC-16 | EPDM | Esprene 505A | 16 | 47 | — | — |
| EC-17 | SBR | T2003 | 17 | 45 | — | — |

Preparation of Unvulcanized Rubber Compositions
EC-13 to E-17 for Forming Conductive Layers Unvulcanized rubber compositions EC-13 to EC-17 for forming conductive layers were prepared in the same manner as the unvulcanized rubber composition E-1 for forming an electro-conductive layer except that the unvulcanized rubber compositions for forming domains, the unvulcanized rubber compositions for forming matrices, and other materials were mixed at blending ratios shown in Table 24-3.

TABLE 24-3

| | | Unvulcanized rubber composition | | | | |
|---|---|---|---|---|---|---|
| | Blade rotation speed | For forming domains | For forming matrix | Vulcanizing agent | | Vulcanization aid | |
| | rpm | phr | phr | Kind | phr | Kind | phr |
| EC-13 | — | 100 | 0 | Sulfur | 3 | TBZTD | 1 |
| EC-14 | — | 100 | 0 | Sulfur | 3 | TBZTD | 1 |
| EC-15 | 30 | 25 | 75 | Sulfur | 3 | TBZTD | 1 |
| EC-16 | 30 | 10 | 90 | Sulfur | 3 | MBTS | 2 |
| EC-17 | 30 | 45 | 55 | Sulfur | 3 | TBZTD | 1 |

[Production of Developing Blade]

Rubber sheets were produced in the same manner as in Example 39 except that the unvulcanized rubber compositions EC-13 to EC-17 for forming conductive layers were used, and each of the produced rubber sheets was bonded to a sheet metal. Next, developing blades according to Comparative Examples 15 to 19 were each obtained by forming a surface layer on the surface of each of the rubber sheets in the same manner as in Example 39 except that a coating material for forming a surface layer shown in Table 25 was used.

Comparative Examples 20 and 21

Developing blades according to Comparative Examples 20 and 21 were obtained in the same manner as in Example 39 except that the coating material for forming a surface layer was changed to materials shown in Table 25.

TABLE 25

| | Unvulcanized rubber composition for forming conductive layer | Coating liquid for forming surface layer |
|---|---|---|
| Comparative Example 15 | EC-13 | S-1 |
| Comparative Example 16 | EC-14 | |
| Comparative Example 17 | EC-15 | |
| Comparative Example 18 | EC-16 | |
| Comparative Example 19 | EC-17 | |
| Comparative Example 20 | E-39 | S-15 |
| Comparative Example 21 | | S-16 |

The evaluation results of the developing blades according to Examples 39 to 49 and Comparative Examples 15 to 22 are shown in Tables 26-1 to 26-3 and Tables 27-1 to 27-3.

TABLE 26-1

| | | | | Evaluation item No. | | |
|---|---|---|---|---|---|---|
| | | | | | 7-2 | |
| Example | Unvulcanized rubber composition for forming conductive layer | Coating liquid for forming surface layer | 5-1 MD structure | Impedance at $10^{-2}$ Hz to $10^1$ Hz Ω | Slope at $10^6$ Hz to $10^7$ Hz — | Outer surface/support Impedance at $10^{-2}$ Hz to $10^1$ Hz Ω |
| 39 | E-2 | S-1 | Y | 2.86E+08 | −0.35 | 7.41E+06 |
| 40 | E-39 | S-1 | Y | 2.66E+06 | −0.33 | 8.45E+06 |
| 41 | E-40 | S-2 | Y | 1.44E+08 | −0.32 | 9.78E+08 |
| 42 | E-41 | S-3 | Y | 2.03E+04 | −0.78 | 1.87E+06 |
| 43 | E-42 | | Y | 6.42E+08 | −0.37 | 5.91E+09 |
| 44 | E-43 | | Y | 6.66E+08 | −0.70 | 6.13E+09 |
| 45 | E-44 | | Y | 6.92E+05 | −0.67 | 6.37E+06 |
| 46 | | S-4 | Y | 6.92E+05 | −0.67 | 1.52E+05 |
| 47 | | S-5 | Y | 6.92E+05 | −0.67 | 5.19E+05 |
| 48 | | S-8 | Y | 6.92E+05 | −0.67 | 1.80E+07 |
| 49 | | S-9 | Y | 6.92E+05 | −0.67 | 1.52E+08 |
| 50 | | S-12 | Y | 6.92E+05 | −0.67 | 9.30E+10 |

| | Evaluation item No. | | | | |
|---|---|---|---|---|---|
| | 7-2 Conductive support Impedance at $10^{-2}$ Hz to $10^1$ Hz Ω | 5-3 Matrix Distance μm | Matrix Volume resistivity Ω·cm | 5-4 Domain Volume resistivity Ω·cm | 5-5 Resistivity ratio between matrix and domain | 5-8 Volume fraction of domain % |
| Example | | | | | | |
| 39 | 6.05E−03 | 0.25 | 5.34E+16 | 1.28E+01 | 15.6 | 15.2 |
| 40 | 5.95E−03 | 0.25 | 5.22E+16 | 1.01E+01 | 15.7 | 15.2 |
| 41 | 7.99E−03 | 0.24 | 1.47E+14 | 2.31E+01 | 12.8 | 26.5 |

TABLE 26-1-continued

| | | | | | | |
|---|---|---|---|---|---|---|
| 42 | 1.86E−03 | 0.26 | 2.76E+07 | 8.83E+03 | 3.5 | 25.7 |
| 43 | 3.57E−03 | 0.55 | 1.64E+14 | 5.41E+01 | 12.5 | 27.0 |
| 44 | 9.96E−03 | 0.24 | 5.00E+15 | 8.38E+03 | 11.8 | 26.0 |
| 45 | 9.17E−03 | 5.9 | 7.38E+08 | 4.23E+01 | 7.2 | 25.1 |
| 46 | 9.17E−03 | 5.9 | 7.38E+08 | 4.23E+01 | 7.2 | 25.1 |
| 47 | 9.17E−03 | 5.9 | 7.38E+08 | 4.23E+01 | 7.2 | 25.1 |
| 48 | 9.17E−03 | 5.9 | 7.38E+08 | 4.23E+01 | 7.2 | 25.1 |
| 49 | 9.17E−03 | 5.9 | 7.38E+08 | 4.23E+01 | 7.2 | 25.1 |
| 50 | 9.17E−03 | 5.9 | 7.38E+08 | 4.23E+01 | 7.2 | 25.1 |

TABLE 26-2

| Example | Unvulcanized rubber composition for forming conductive layer | Coating liquid for forming surface layer | 5-7 Interdomain distance Dm μm | 5-10 Domain Requirement (B2) sectional area proportion (average value) % | 5-10 Domain Number % of domains each satisfying requirement (B2) % | 5-6 Perimeter A μm |
|---|---|---|---|---|---|---|
| 39 | E-2 | S-1 | 0.25 | 26 | 84 | 0.92 |
| 40 | E-39 | S-1 | 0.25 | 22 | 81 | 0.91 |
| 41 | E-40 | S-2 | 0.24 | 40 | 85 | 0.74 |
| 42 | E-41 | S-3 | 0.26 | 31 | 78 | 0.92 |
| 43 | E-42 | | 0.55 | 35 | 86 | 5.54 |
| 44 | E-43 | | 0.24 | 35 | 87 | 17.77 |
| 45 | E-44 | | 5.9 | 33 | 91 | 0.88 |
| 46 | | S-4 | 5.9 | 33 | 91 | 0.88 |
| 47 | | S-5 | 5.9 | 33 | 91 | 0.88 |
| 48 | | S-8 | 5.9 | 33 | 91 | 0.88 |
| 49 | | S-9 | 5.9 | 33 | 91 | 0.88 |
| 50 | | S-12 | 5.9 | 33 | 91 | 0.88 |

| Example | 5-6 Envelope perimeter B μm | 5-6 A/B — | 5-6 Domain Number % of domains each satisfying requirement (B3) % | 5-9 Number of cubes each satisfying requirement (B1) Pieces | 5-10 Conductive particles Area proportion μ % | 5-10 σ — | 5-10 μ/σ — |
|---|---|---|---|---|---|---|---|
| 39 | 0.89 | 1.03 | 87 | 9 | 26 | 185 | 0.14 |
| 40 | 0.90 | 1.01 | 88 | 8 | 22 | 183 | 0.12 |
| 41 | 0.73 | 1.01 | 84 | 9 | 40 | 366 | 0.11 |
| 42 | 0.89 | 1.03 | 81 | 7 | 31 | 307 | 0.10 |
| 43 | 5.32 | 1.04 | 92 | 9 | 35 | 175 | 0.20 |
| 44 | 17.42 | 1.02 | 84 | 7 | 35 | 182 | 0.19 |
| 45 | 0.87 | 1.02 | 83 | 7 | 33 | 297 | 0.11 |
| 46 | 0.87 | 1.02 | 83 | 7 | 33 | 297 | 0.11 |
| 47 | 0.87 | 1.02 | 83 | 7 | 33 | 297 | 0.11 |
| 48 | 0.87 | 1.02 | 83 | 7 | 33 | 297 | 0.11 |
| 49 | 0.87 | 1.02 | 83 | 7 | 33 | 297 | 0.11 |
| 50 | 0.87 | 1.02 | 83 | 7 | 33 | 297 | 0.11 |

TABLE 26-3

| | Unvulcanized | | | | 7-4 7-5 7-3 Initial evaluation results | | | 7-6 Evaluation results after high-temperature and high-humidity/low-temperature and low-humidity cycle | | | |
|---|---|---|---|---|---|---|---|---|---|---|---|
| Example | rubber composition for forming conductive layer | Coating liquid for forming surface layer | Urethane group concen- tration (%) | Structure in surface layer | Toner charge amount (μC/g) | Toner charge amount distri- bution | Fogged image evaluation rank | Failure in vicinity of surface layer | Toner charge amount (μC/g) | Toner charge amount distri- bution | Fogged image evaluation rank |
| 39 | E-2 | S-1 | 6.8 | — | −41 | 2.7 | A | A | −35 | 3.1 | A |
| 40 | E-39 | S-1 | 6.8 | — | −42 | 2.9 | A | A | −39 | 3.2 | A |
| 41 | E-40 | S-2 | 6.6 | — | −46 | 2.2 | A | A | −43 | 2.5 | A |
| 42 | E-41 | S-3 | 1.3 | — | −47 | 2.5 | A | A | −44 | 2.8 | A |
| 43 | E-42 | | | | −45 | 2.6 | A | A | −42 | 2.8 | A |
| 44 | E-43 | | | | −40 | 2.4 | A | A | −37 | 2.6 | A |
| 45 | E-44 | | | | −40 | 2.4 | A | A | −37 | 2.6 | A |
| 46 | | S-4 | 4.8 | (1) | −40 | 2.4 | A | A | −37 | 2.6 | A |
| 47 | | S-5 | 1.5 | (1) | −40 | 2.4 | A | A | −37 | 2.6 | A |
| 48 | | S-8 | 2.8 | (2) | −40 | 2.4 | A | A | −37 | 2.6 | A |
| 49 | | S-9 | 3.4 | (3) | −40 | 2.4 | A | A | −37 | 2.6 | A |
| 50 | | S-12 | — | — | −42 | 2.6 | A | B | −39 | 3.1 | B |

TABLE 27-1

| | | | | 7-2 | | | |
|---|---|---|---|---|---|---|---|
| | | | | 5-1 Conductive layer | | | Outer surface/support |
| Comparative Example | Conductive layer | Surface layer | MD structure | Impedance at $10^{-2}$ Hz to $10^1$ Hz Ω | Slope at $10^6$ Hz to $10^7$ Hz — | | Impedance at $10^{-2}$ Hz to $10^1$ Hz Ω |
| 15 | EC-13 | S-1 | Absent | 2.10E+06 | −1 | | 1.16E+06 |
| 16 | EC-14 | | Absent | 3.10E+04 | −1 | | 1.71E+04 |
| 17 | EC-15 | | Present | 6.15E+06 | −1 | | 3.38E+06 |
| 18 | EC-16 | | Present | 2.16.E+11 | −1 | | 1.19E+11 |
| 19 | EC-17 | | Present | 1.50E+02 | −0.7 | | 8.25E+04 |
| 20 | E-39 | S-15 | Present | 2.56E+06 | −0.33 | | 8.46E+06 |
| 21 | | S-16 | Present | 2.72E+06 | −0.32 | | 8.39E+06 |

| | 7-2 Conductive support Impedance | 5-3 Matrix | 5-4 Domain | 5-5 Resistivity ratio | 5-8 Volume |
|---|---|---|---|---|---|
| Comparative Example | at $10^{-2}$ Hz to $10^1$ Hz Ω | Distance μm | Volume resistivity Ω·cm | Volume resistivity Ω·cm | between matrix and domain | fraction of domain % |
| 15 | 8.79E−03 | — | — | — | — | — |
| 16 | 9.51E−03 | — | — | — | — | — |
| 17 | 5.20E−03 | 0.21 | 1.87E+07 | 9.56E+06 | −0.3 | 24.6 |
| 18 | 1.56E−03 | 0.21 | 6.56E+15 | 7.51E+03 | 14.6 | 10.5 |
| 19 | 9.30E−03 | 0.21 | 7.61E+15 | 3.61E+01 | 14.0 | 48.2 |
| 20 | 5.95E−03 | 0.25 | 5.22E+16 | 1.21E+01 | 15.6 | 15.2 |
| 21 | 5.94E−03 | 0.25 | 5.29E+16 | 1.01E+01 | 15.7 | 15.2 |

TABLE 27-2

| | | | | Evaluation item No. | | |
|---|---|---|---|---|---|---|
| | | | | 5-10 | 5-10 Domain | 5-6 |
| Comparative Example | Conductive layer | Surface layer | 5-7 Interdomain distance Dm μm | Requirement (B2) sectional area proportion (average value) % | Number % of domains each satisfying requirement (B2) % | Perimeter A μm |
| 15 | EC-13 | S-1 | — | — | — | — |
| 16 | EC-14 | | — | — | — | — |
| 17 | EC-15 | | 0.21 | 25 | 76 | 4.90 |
| 18 | EC-16 | | 0.21 | 16 | 44 | 4.76 |
| 19 | EC-17 | | 0.21 | 15 | 38 | 4.98 |
| 20 | E-39 | S-15 | 0.25 | 22 | 80 | 0.93 |
| 21 | | S-16 | 0.25 | 22 | 81 | 0.91 |

| | 5-6 | 5-6 | 5-6 Domain | 5-9 | Evaluation item No. | | |
|---|---|---|---|---|---|---|---|
| | | | | | 5-10 | 5-10 | 5-10 |
| | | | | | | | Conductive particles |
| Comparative Example | Envelope perimeter B μm | A/B — | Number % of domains each satisfying requirement (B3) % | Number of cubes each satisfying requirement (B1) Pieces | Area proportion μ % | σ — | μ/σ — |
| 15 | — | — | — | — | — | — | — |
| 16 | — | — | — | — | — | — | — |
| 17 | 4.80 | 1.02 | 70 | 4 | 25 | 208 | 0.12 |
| 18 | 4.74 | 1.00 | 56 | 3 | 16 | 391 | 0.04 |
| 19 | 4.88 | 1.02 | 51 | 3 | 15 | 115 | 0.13 |
| 20 | 0.93 | 1.00 | 88 | 8 | 22 | 183 | 0.12 |
| 21 | 0.90 | 1.01 | 88 | 8 | 22 | 184 | 0.12 |

TABLE 27-3

| | | | | | Evaluation item | | | | | |
|---|---|---|---|---|---|---|---|---|---|---|
| | | | | | 7-4 | 7-5 | 7-3 | 7-6 | | |
| | | | | | Initial evaluation results | | | Evaluation results after high-temperature and high-humidity/low-temperature and low-humidity cycle | | |
| Comparative Example | Conductive layer | Surface layer | Urethane group concentration (%) | Structure in surface layer | Toner charge amount (μC/g) | Toner charge amount distribution | Fogged image | Failure in vicinity of surface layer | Toner charge amount (μC/g) | Toner charge amount distribution | Fogged image |
| 15 | EC-13 | S-1 | 6.8 | — | −34 | 4.6 | D | B | −30 | 4.8 | D |
| 16 | EC-14 | | | | −37 | 5.3 | D | B | −35 | 5.1 | D |
| 17 | EC-15 | | | | −35 | 4.9 | D | B | −32 | 4.9 | D |
| 18 | EC-16 | | | | −36 | 5.1 | D | B | −33 | 6.6 | D |
| 19 | EC-17 | | | | −31 | 5.0 | D | B | −27 | 5.2 | D |
| 20 | E-39 | S-15 | 6.8 | — | −24 | 4.6 | D | B | −21 | 4.8 | D |
| 21 | | S-16 | 0 | — | −30 | 5.6 | D | D | −27 | 5.8 | D |

Each of the developing blades according to Examples 39 to 50 had a matrix-domain structure according to the present disclosure in the electro-conductive layer. In addition, the impedance in a low frequency range measured between the outer surface of the developing blade and the outer surface of the support was $1.0 \times 10^4 \Omega$ to $1.0 \times 10^{11} \Omega$. Accordingly, the charge amount distribution was sharp, and a high-quality image having a significantly small numerical value of fogging was obtained. Further, in each of Examples 39 to 49 in which the surface layer is a urethane resin, a sharp charge amount distribution and satisfactory image characteristics are maintained without occurrence of failure in the vicinity of the surface even after the environmental cycle test.

Meanwhile, in each of the developing blades of Comparative Examples 15 to 19 having no conductive layer according to the present disclosure and Comparative Examples 20 and 21 in which the impedance in a low frequency range measured between the outer surface of the developing blade and the outer surface of the support was outside of the scope of the present disclosure, the charge amount distribution was large, and the image quality was not satisfactory.

Example 51

Preparation of Coating Material 17 for Forming Surface Layer

Under a nitrogen atmosphere, 100 parts by mass of a polyester polyol (product name: P3010, manufactured by Kuraray Co., Ltd.) was gradually added dropwise to 27 parts by mass of polymeric MDI (product name: Millionate MR-200, manufactured by Nippon Polyurethane Industry Co., Ltd.) in a reaction vessel while the temperature in the reaction vessel was kept at 65° C. After the completion of the dropping, the resultant was subjected to a reaction at a temperature of 65° C. for 2 hours. The obtained reaction mixture was cooled to room temperature to obtain an isocyanate group-terminated prepolymer having an isocyanate group content of 4.3%.

41.52 Parts by mass of a polyester polyol (product name: P2010, manufactured by Kuraray Co., Ltd.) and 23 parts by mass of carbon black (MA230: manufactured by Mitsubishi Chemical Corporation, number average particle diameter: 30 nm) with respect to 54.9 parts by mass of the obtained isocyanate group-terminated prepolymer were dissolved in methyl ethyl ketone (MEK), and the mixture was adjusted so that a solid content was 27 mass %. Thus, a mixed liquid 1 was prepared.

270 g of the mixed liquid 1 and 200 g of glass beads having an average particle diameter of 0.8 mm were placed in a glass bottle having an internal volume of 450 mL and dispersed for 12 hours through use of a paint shaker disperser. Then, 15 parts by mass of urethane particles having an average particle diameter of 7.0 μm (Daimicbeaz UCN-5070D: manufactured by Dainichiseika Color & Chemicals Mfg. Co., Ltd.) were added, and the resultant was further dispersed for 15 minutes. After that, the glass beads were removed to obtain a coating material 17 for forming a surface layer.

[Production of Charging Roller]

An electro-conductive layer was formed on a peripheral surface of a cored bar in the same manner as in Example 2 except that the shape of the electro-conductive layer was formed into a crown shape in which each diameter at positions of 90 mm from the center portion to both end portions was 9.65 mm, and the diameter of the center portion was 9.70 mm. Then, the coating material 17 for forming a surface layer was applied onto the electro-conductive layer in the same manner as in Example 1. After the application, the coating material was air-dried at a temperature of 23° C. for 30 minutes. Next, the resultant was dried in a hot air circulation dryer at a temperature of 80° C. for 1 hour and further dried at a temperature of 160° C. for 1 hour to form a dry film of a coating film of the coating material 17 for forming a surface layer on an elastic layer.

Further, the outer surface of the dry film was irradiated with UV light having a wavelength of 254 nm so that the integrated light quantity was 9,000 mJ/cm$^2$ to remove a skin layer on the outermost surface of the dry film, to thereby form a surface layer in which conductive particles (carbon black) in the dry film were exposed to the outer surface. A low-pressure mercury lamp (manufactured by Toshiba Lighting & Technology Corporation) was used as a light source for UV light. In this manner, a roller 51 for electrophotography according to Example 51 was produced.

8. Evaluation as Charging Roller

The obtained roller 51 for electrophotography was subjected to the following evaluations.

[8-1] Measurement of Volume Resistivity of Surface Layer

The volume resistivity of the surface layer was measured in an electro-conductive mode with an atomic force microscope (AFM) (product name: Q-scope 250, manufactured by Quesant Instrument Corporation). First, the surface layer of the roller 51 for electrophotography was cut out into a sheet having a width of 2 mm and a length of 2 mm through use of a manipulator, and platinum was deposited from the vapor on one surface of the surface layer. Next, a DC power source (product name: 6614C, manufactured by Agilent Technologies) was connected to the platinum-deposited surface, and a voltage of 10 V was applied. A free end of a cantilever was brought into contact with the other surface of the surface layer, and a current image was obtained through an AFM main body. This measurement was performed at 100 randomly selected points on the surface in the entire surface layer, and the "volume resistivity" was calculated from an average current value of the top 10 low current values and an average value of the thicknesses of the surface layer.

Measurement conditions are described below.
Measurement mode: contact
Cantilever: CSC17
Measurement range: 10 nm×10 nm
Scan rate: 4 Hz
Applied voltage: 10 V

[8-2] Calculation of Slope of Impedance at Frequency of $1 \times 10^6$ Hz to $1 \times 10^7$ Hz and Value of Impedance at Frequency of $1 \times 10^{-2}$ Hz to $1 \times 10^1$ Hz A slope of an impedance at frequencies of $1 \times 10^6$ Hz to $1 \times 10^7$ Hz of the electro-conductive layer, a value of an impedance at $1 \times 10^{-2}$ Hz to $1 \times 10^1$ Hz, and an impedance at a frequency of $1 \times 10^{-2}$ Hz to $1 \times 10^1$ Hz measured by applying a predetermined AC voltage between the outer surface of the roller for electrophotography and the electro-conductive outer surface of the support were determined in the same manner as in the evaluation [5-2].

[8-3] Measurement of Thickness of Surface Layer

The thickness of the surface layer was measured by observing sections of the surface layer at nine points in total including three points in an axial direction and three points in a circumferential direction with an optical microscope or an electron microscope, and the average value was adopted as the "thickness" of the surface layer. The evaluation results are shown in Table 36.

[8-4] Measurement of Universal Hardness of Surface Layer

The universal hardness at a position of a depth of 1 μm from the surface of the surface layer was measured with a universal hardness meter. An ultrafine hardness meter (product name: FISCHERSCOPE HM-2000, manufactured by Helmut Fischer GmbH) was used for the measurement. Specific measurement conditions are described below.

Measurement indenter: Vickers indenter (face angle: 136, Young's modulus: 1,140, Poisson's ratio: 0.07, indenter material: diamond)

Measurement environment: temperature: 23° C., relative humidity: 50%

Maximum test load: 1.0 mN

Load condition: A load was applied in proportion to the time at a speed at which the maximum test load was reached in 30 seconds.

In this evaluation, the universal hardness was calculated by the following calculation equation (1) through use of a load F at the time when the indenter was pushed into a depth of 1 μm from the surface of the surface layer and a contact area A between the indenter and the surface layer at that time.

$$\text{Universal hardness } (N/mm^2) = F/A \quad \text{Calculation equation (1)}$$

The evaluation results are shown in Table 36.

[8-5] Measurement of Protrusion Derived from Exposed Portion of Electron Conductive Agent on Surface of Surface Layer A method of measuring the number of the protrusion derived from the exposed part of the electron conductive agent particles on the surface of the surface layer is as described below. First, an elastic layer including the surface layer was cut out from the roller 51 for electrophotography. Platinum was deposited from the vapor on the outermost surface of the surface layer. A region of 2.0 μm in length and 2.0 μm in width was observed and photographed with a scanning electron microscope (product name: 5-4800, manufactured by Hitachi High-Technologies Corporation) at a magnification of 40,000. The obtained image was analyzed with image processing software (product name: Image-Pro Plus, manufactured by Planetron, Inc.). The taken SEM image was subjected to binarization, and the number of protrusions was calculated. Five SEM images were taken, and an average value of calculated numbers of particles was adopted as the number of fine protrusions.

[8-6] Evaluation of Toner Charge Amount

The ability to supply negative charge to dirt components (dirt components, such as transfer residual toner and an external additive) when the roller 1 for electrophotography was used as a charging roller was evaluated as described below.

A laser printer (product name: HP LaserJet P1505 Printer, manufactured by Hewlett-Packard Company) was prepared as an electrophotographic image forming apparatus. The printing speed of the laser printer was 23 sheets/min, and the image resolution thereof was 600 dpi. However, when this evaluation was performed, in the laser printer, a motor was reconstructed so that the process speed was 1.2 times as high as the normal speed. Further, the reconstruction was performed so that an external power source was connected in order to apply a voltage to the charging roller, to thereby prevent the voltage from being directly applied to the charging roller from a main body.

Further, a process cartridge (product name: "HP 36A (CB436A)", manufactured by Hewlett-Packard Company) for the laser printer was reconstructed so that a cleaning blade for the charging roller, a developing container that is brought into abutment against a photosensitive drum, and a transfer roller were removed.

The laser printer and the process cartridge were left to stand under a low-temperature and low-humidity (temperature: 15° C., relative humidity: 10%) environment for 48 hours. Then, the process cartridge was loaded into the laser printer. Then, the following evaluation was performed under a low-temperature and low-humidity environment. Under a low-temperature and low-humidity environment, the charge injection from the member for electrophotography to the toner does not easily occur. Through the following evaluation under such environment, the charge injection ability of the member for electrophotography into the toner can be further accurately evaluated.

First, the main body was stopped in the middle of an image forming step of outputting a solid black image onto one sheet under normal image output conditions, and a state in which the entire circumference of the photosensitive drum was covered with the toner layer was formed.

Then, the process cartridge in a state in which the entire circumference of the photosensitive drum was covered with the toner layer was removed from the main body. The charging roller of the process cartridge was removed, and the roller 1 for electrophotography was mounted as a charging roller. The process cartridge was mounted on the main body.

Then, an image forming step of applying a voltage at which the roller 1 for electrophotography was not discharged, specifically −500 V, to the roller 1 for electrophotography from an external power source, to thereby output a solid white image onto one sheet was performed, and in this process, the toner potential on the surface of the toner layer on the photosensitive drum was measured before and after passage through a nip portion between the roller 1 for electrophotography and the photosensitive drum. For the potential measurement, a surface potential probe (product name: MODEL 555P-1, manufactured by Trek Japan KK) arranged at a position of 2 mm away from the surface of the photosensitive drum was used.

Then, the difference between the potential on the surface of the toner layer before passage through the nip portion and the potential on the surface of the toner layer after passage through the nip portion was measured as an injection charge amount (V) by the electrophotographic electro-conductive member.

This evaluation was performed at a low temperature and a low humidity (temperature: 15° C., relative humidity: 10%)

A laser beam printer (product name: HP LaserJet P1505 Printer, manufactured by Hewlett-Packard Company) was prepared as an electrophotographic apparatus. This laser beam printer can output A4-size paper in a longitudinal direction. In addition, the printing speed of the laser beam printer was 23 sheets/min, and the image resolution thereof was 600 dpi. In this evaluation, the laser beam printer was reconstructed so that the process speed was 1.2 times as high as the normal speed. In addition, an external power source for applying a voltage to the charging roller was connected so that a voltage was not directly applied to the charging roller from the main body. Further, a transfer roller was also removed.

A cleaning blade was removed from the process cartridge (product name: "HP 36A (CB436A)", manufactured by Hewlett-Packard Company) for a laser printer. The process cartridge was loaded into the main body of the laser printer. A cover of the main body was opened to stop the laser printer immediately before the occurrence of development and transfer while a solid black image was being output, and thus a certain amount of toner was laid on a photosensitive drum. Next, the process cartridge was removed from the main body of the laser printer. A charging roller attached to the process cartridge was removed, and the roller 51 for electrophotography was mounted so that the portion of the photosensitive drum having the toner laid thereon was brought into abutment against the roller in an adjacent portion. With this mounting, the charging roller was brought into contact with the toner on the drum immediately after image output was started. The process cartridge was loaded again into the main body of the laser printer. Then, a surface potential gauge probe (product name: MODEL 555P-1, manufactured by Trek Japan KK) was arranged at a position which was turned by 90° in the circumferential direction of the photosensitive drum from the position of the roller 51 for electrophotography and which was 2 mm away from the photosensitive drum. In this state, a solid white image was output. In this case, the solid white image was output under the condition that a voltage of −500 V was applied so that discharge did not occur from the roller for electrophotography, and charge was injected when the roller 51 for electrophotography was brought into contact with the toner. The potential of the portion of the photosensitive drum having the toner laid thereon, which was brought into contact with the roller 51 for electrophotography, was measured and adopted as a charge amount. When the absolute value of a potential is larger, the quantity of charge injected into the toner is increased.

[8-7] Dirt Evaluation Test

A gear that rotates with a peripheral speed difference of 110% in a forward direction with respect to the rotation of the photosensitive drum was mounted to the roller 51 for electrophotography serving as a charging roller. The roller 51 for electrophotography was mounted as a charging roller to a process cartridge (product name: "HP 36A (CB436A)", manufactured by Hewlett-Packard Company) from which a charging roller and a cleaning blade have been removed.

The process cartridge was loaded into the main body of the above-mentioned laser beam printer, and an image in which horizontal lines having a width of 2 dots and an interval of 100 dots were drawn in a direction perpendicular to the rotation direction of the photosensitive drum was output on 500 sheets at a process speed that was 1.2 times as high as the normal speed. Then, the roller 51 for electrophotography was removed from the process cartridge and subjected to the following evaluations.

A polyester pressure-sensitive adhesive tape (product name: No. 31B, manufactured by Nitto Denko Corporation) was bonded to the outer surface of the roller 51 for electrophotography thus removed, and then the pressure-sensitive adhesive tape was peeled off together with the toner adhering to the surface of the charging roller and bonded to a blank sheet. The foregoing was performed in an entire image printing region on the surface of the charging roller, and then the reflection density of the pressure-sensitive adhesive tape was measured in the entire image printing region with a photovolt reflection densitometer (product name: TC-6DS/A, manufactured by Tokyo Denshoku Co., Ltd.) to determine a maximum value.

Next, the reflection density of a new polyester pressure-sensitive adhesive tape similarly bonded to a blank sheet was measured to determine a minimum value, and an increase in reflection density was adopted as the value of coloring density. It is preferred that the value of the coloring density be smaller because the amount of dirt on the charging roller is small and satisfactory. Accordingly, the value of the coloring density was adopted as an indicator of the degree of dirt on the charging roller.

[8-8] Stable Chargeability Evaluation Test

In the same main body and cartridge configurations as those in the above-mentioned section 8-5, an image in which the alphabet letter "E" with a size of 4 points was printed so that the printing rate was 1% was output on 20,000 sheets of A4-size paper under a low-temperature and low-humidity (temperature: 15° C., relative humidity: 10%) environment. The output of the electrophotographic image was performed in a so-called intermittent mode in which the rotation of the electrophotographic photosensitive member was stopped over 7 seconds every time the image was output on one sheet. The image output in the intermittent mode can be said to be a more severe evaluation condition for the charging roller because the number of times of rubbing between the charging roller and the electrophotographic photosensitive member is larger than that in the case of continuously outputting the electrophotographic image.

Next, a halftone image was output, and the obtained image was evaluated based on the following criteria.
A: There are no white spots on the output image even by checking with a loupe.
B: No white spots are visually recognized on the output image.
C: White spots are slightly recognized on the output image.
D: White spots are recognized over an entire region on the output image.

Examples 52 to 56

Preparation of Coating Materials 18 to 22 for Forming Surface Layers

Coating materials 18 to 22 for forming surface layers were prepared in the same manner as the coating material 17 for forming a surface layer except that materials shown in Table 28 were used in blending amounts shown in Table 28.

TABLE 28

| Coating material for forming surface layer | Polyol | Isocyanate | Mixing ratio (mass ratio) (polyol/polyisocyanate) | Roughening particles Kind | Addition amount (phr) | Addition amount of carbon black (phr) | Silicone additive Kind | Addition amount (phr) |
|---|---|---|---|---|---|---|---|---|
| 17 | A-1 | B-1 | 43/57 | C-1 | 15 | 23 | — | — |
| 18 | A-2 | B-2 | 46/54 | — | 0 | 23 | — | — |
| 19 | A-2 | B-2 | 46/54 | C-1 | 15 | 23 | — | — |
| 20 | A-2 | B-2 | 46/54 | — | 0 | 45 | — | — |
| 21 | A-2 | B-2 | 46/54 | C-1 | 15 | 23 | D-1 | 0.1 |
| 22 | A-3 | B-3 | 41/59 | C-1 | 30 | 23 | — | — |

The symbols in Table 28 represent the following materials.
A-1: polyester polyol (product name: P2010, manufactured by Kuraray Co., Ltd.)
A-2: polycarbonate-based (product name: T5652, manufactured by Asahi Kasei Chemicals Corporation)
A-3: acrylic polyol (product name: DC2016, manufactured by Daicel Chemical Industries, Ltd.)
B-1: polyester polyol/polymeric MDI (product name: P3010, manufactured by Kuraray Co., Ltd./product name: Millionate MR200, manufactured by Nippon Polyurethane Industry Co., Ltd.)
B-2: polycarbonate-based polyol/polymeric MDI (product name: T5652, manufactured by Asahi Kasei Chemicals Corporation/product name: Millionate MR200, manufactured by Nippon Polyurethane Industry Co., Ltd.)
B-3: isocyanate A/isocyanate B=4:3 (product name: Vestanat B1370, manufactured by Degussa/product name: Duranate TPA-880E, manufactured by Asahi Kasei Chemicals Corporation)
C-1: urethane beads (product name: Daimicbeaz UCN-5070D, manufactured by Dainichiseika Color & Chemicals Mfg. Co., Ltd., average particle diameter: 7.0 μm)
D-1: modified dimethylsilicone oil (product name: SH-28PA, manufactured by Dow Corning Toray Silicone Co., Ltd.)

[Rollers 52 to 56 for Electrophotography]

Rollers 52 to 56 for electrophotography were produced and evaluated in the same manner as in Example 51 except that the coating materials 18 to 22 for forming surface layers were used.

Example 57

A roller 57 for electrophotography according to Example 57 was produced and evaluated in the same manner as in Example 51 except that the integrated light quantity of UV light was set to 450 mJ/cm².

Example 58

A roller 58 for electrophotography according to Example 57 was produced and evaluated in the same manner as in Example 51 except that the application of UV light was not performed.

Comparative Example 22

The outer shape of the electro-conductive layer EC-1 according to Comparative Example 1 was formed into a crown shape in which each diameter at positions of 90 mm from the center portion to both end portions in the longitudinal direction was 9.65 mm, and the diameter of the center portion was 9.70 mm. In addition, the coating material 17 for forming a surface layer was used. A roller for electrophotography according to Comparative Example 22 was produced and evaluated in the same manner as in Comparative Example 1 except for the foregoing. In the roller for electrophotography, the electro-conductive layer does not have a matrix-domain structure. Then, as a result of the evaluation as a charging roller, the charge amount was low, the amount of dirt was large, and the generation of white spots was also observed.

Comparative Example 23

The outer shape of the electro-conductive layer EC-4 according to Comparative Example 4 was formed into a crown shape in which each diameter at positions of 90 mm from the center portion to both end portions in the longitudinal direction was 9.65 mm, and the diameter of the center portion was 9.70 mm. In addition, the coating material 17 for forming a surface layer was used. A roller for electrophotography according to Comparative Example 23 was produced and evaluated in the same manner as in Comparative Example 4 except for the foregoing. In the roller for electrophotography, the electro-conductive layer had a matrix-domain structure, but the impedance in a high frequency range of the electro-conductive layer was outside of the scope of the present disclosure. In addition, as a result of the evaluation as a charging roller, the charge amount was low, the amount of dirt was large, and the generation of white spots was also observed.

The results of the evaluation 8 are shown in Table 29.

TABLE 29

| | 8-1 Volume resistivity of surface layer Ω·cm | 8-2 Conductive layer Impedance at $10^{-2}$ Hz to $10^1$ Hz Ω | 8-2 Conductive layer Slope at $10^6$ Hz to $10^7$ Hz | 8-2 Outer surface/support Impedance at $10^{-2}$ Hz to $10^1$ Hz Ω | 8-3 Thickness μm | 8-4 Universal hardness N/mm² | 8-5 Fine protrusions Pieces | 8-6 Toner charge amount V | 8-7 Dirt evaluation | 8-8 Stable chargeability evaluation rank |
|---|---|---|---|---|---|---|---|---|---|---|
| Example 51 | 6.80E+10 | 2.64E+06 | −0.33 | 8.89E+06 | 20 | 3.2 | 210 | −21 | 35 | B |
| Example 52 | 4.90E+10 | " | " | 3.38E+08 | 20 | 3.2 | 195 | −20 | 38 | B |
| Example 53 | 6.50E+10 | " | " | 8.20E+06 | 20 | 3.2 | 230 | −28 | 25 | A |
| Example 54 | 8.90E+09 | " | " | 6.10E+06 | 20 | 3.2 | 310 | −18 | 40 | B |
| Example 55 | 6.60E+10 | " | " | 8.50E+06 | 20 | 3.0 | 155 | −30 | 22 | A |
| Example 56 | 1.50E+12 | " | " | 9.70E+06 | 20 | 18.1 | 215 | −10 | 50 | C |
| Example 57 | 5.20E+10 | " | " | 7.20E+06 | 20 | 3.3 | 48 | −14 | 45 | C |
| Example 58 | 2.40E+10 | " | " | 6.60E+06 | 20 | 3.2 | 0 | −11 | 50 | C |
| Comparative Example 22 | 6.80E+10 | 2.10E+06 | −1 | 8.50E+06 | 20 | 3.2 | 210 | 0 | 98 | D |
| Comparative Example 23 | 6.80E+10 | 6.15E+06 | −1 | 9.80E+06 | 20 | 3.2 | 210 | −1 | 85 | D |

According to one aspect of the present disclosure, the electrophotographic electro-conductive member that can maintain high image quality and high durability even in a high-speed process is obtained. In addition, according to other aspects of the present disclosure, the electrophotographic image forming apparatus that can stably output a high-quality electrophotographic image, and the process cartridge to be used in the apparatus are obtained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An electrophotographic electro-conductive member comprising:
a support having an electro-conductive outer surface;
an electro-conductive layer on the outer surface of the support; and
a surface layer on an outer surface of the electro-conductive layer,
the electro-conductive layer having a matrix containing a crosslinked product of a first rubber and a plurality of domains dispersed in the matrix,
the domains each comprising a crosslinked product of a second rubber and an electron conductive agent, wherein
when a platinum electrode is directly provided on an outer surface of the electro-conductive layer, and impedance is measured under an environment of a temperature of 23° C. and a relative humidity of 50% by applying an alternating voltage having an amplitude of 1 V between the electro-conductive outer surface of the support and the platinum electrode while changing a frequency thereof between $1.0 \times 10^{-2}$ Hz and $1.0 \times 10^7$ Hz, in a double logarithmic plot with a frequency on an abscissa and an impedance on an ordinate, a slope at frequencies of $1.0 \times 10^6$ Hz to $1.0 \times 10^7$ Hz is −0.8 or more and −0.3 or less, and an impedance at a frequency of $1.0 \times 10^{-2}$ Hz to $1.0 \times 10^1$ Hz is $1.0 \times 10^4 \Omega$ to $1.0 \times 10^{11} \Omega$, and when a platinum electrode is directly provided on an outer surface of the electrophotographic electro-conductive member, and impedance is measured under the environment having a temperature of 23° C. and a relative humidity of 50% by applying an alternating voltage having an amplitude of 1 V between the electro-conductive outer surface of the support and the platinum electrode while changing a frequency thereof between $1.0 \times 10^{-2}$ Hz and $1.0 \times 10^7$ Hz, an impedance at a frequency of $1.0 \times 10^{-2}$ Hz to $1.0 \times 10^1$ Hz is $1.0 \times 10^5 \Omega$ to $1.0 \times 10^{11} \Omega$.

2. The electrophotographic electro-conductive member according to claim 1, wherein the electro-conductive layer is directly provided on the outer surface of the support.

3. The electrophotographic electro-conductive member according to claim 1, further comprising an electro-conductive resin layer between the electro-conductive layer and the electro-conductive outer surface of the support, wherein when a platinum electrode is directly provided on an outer surface of the resin layer, and an impedance is measured under the environment having a temperature of 23° C. and a relative humidity of 50% by applying an alternating voltage having an amplitude of 1 V between the electro-conductive outer surface of the support and the platinum electrode while changing a frequency thereof between $1.0 \times 10^{-2}$ Hz and $1.0 \times 10^7$ Hz, an impedance at a frequency of $1.0 \times 10^{-2}$ Hz to $1.0 \times 10^1$ Hz is $1.0 \times 10^{-5} \Omega$ to $1.0 \times 10^1 \Omega$.

4. The electrophotographic electro-conductive member according to claim 1, wherein the matrix has a volume resistivity of more than $1.0 \times 10^{12}$ Ω·cm and $1.0 \times 10^{17}$ Ω·cm or less.

5. The electrophotographic electro-conductive member according to claim 1, wherein an arithmetic average Dm of distances between the domains adjacent to each other is 0.2 μm or more and 2.0 μm or less.

6. The electrophotographic electro-conductive member according to claim 1, wherein
when defining a length of the electro-conductive layer in a longitudinal direction as L and defining a thickness of the electro-conductive layer as T, and
when a 15-micrometer square observation region is put at each of arbitrary three positions in a thickness region from the outer surface of the electro-conductive layer to a depth of from 0.1 T to 0.9 T on each of cross sections in a thickness direction of the electro-conductive layer at three positions including a center of the electro-conductive layer in the longitudinal direction and points from both edges of the electro-conductive layer towards the center by L/4, among the domains observed in each of the observation regions whose total number of nine, 80% by number or more of the domains satisfy (1) and (2):

(1) a ratio of a cross sectional area of the electron conductive agent in a domain with respect to a cross sectional area of the domain is 20% or more; and (2) A/B is 1.00 or more and 1.10 or less when A is a perimeter of a domain, and B is an envelope perimeter of the domain.

7. The electrophotographic electro-conductive member according to claim 1, wherein when an average of ratios of a cross sectional area of the electron conductive agent contained in each of the domains appearing on a cross section of the electro-conductive layer in a thickness direction thereof to a cross sectional area of each of the domains is defined as $\mu$, and a standard deviation of the ratios is defined as $\sigma$, $\sigma/\mu$ is 0 or more and 0.4 or less, $\mu$ is 20% or more and 40% or less, and wherein among cubic shaped sample cubes each having 9 μm on a side sampled at arbitrary nine portions from the electro conductive layer, at least eight of the sample cubes each satisfy the following requirement (3):

(3) when one sample cube is divided into 27 unit cubes having 3 μm on a side, and a volume Vd of the domains in each of the unit cubes is calculated, the number of the unit cubes each having a Vd of from 2.7 μm³ to 10.8 μm³ is at least 20.

8. The electrophotographic electro-conductive member according to claim 1, wherein the surface layer contains at least one kind of binder resin, and at least one kind of electron conductive agent or ion conductive agent.

9. The electrophotographic electro-conductive member according to claim 8, wherein the binder resin is a urethane resin.

10. The electrophotographic electro-conductive member according to claim 9, wherein the urethane resin has a urethane group concentration of 1.5% or more and 6.5% or less.

11. The electrophotographic electro-conductive member according to claim 9, wherein the urethane resin has at least one structure selected from the group consisting of structures represented by the structural formulae (1) to (3):

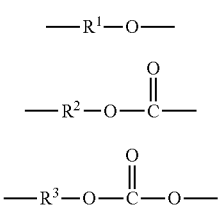

in the structural formulae (1) to (3), $R^1$ to $R^3$ each independently represent a linear or branched divalent hydrocarbon group having 4 or more and 8 or less carbon atoms.

12. The electrophotographic electro-conductive member according to claim 1, wherein the surface layer contains a binder resin and an electron conductive agent, and the surface layer has protrusions derived from an exposed part of the electron conductive agent on a surface thereof, and has a universal hardness of 1.0 N/mm² or more and 7.0 N/mm² or less at a position of a depth of 1 μm from the surface.

13. The electrophotographic electro-conductive member according to claim 1, wherein the surface layer has a volume resistivity of $1.0 \times 10^4$ Ω·cm or more and $1.0 \times 10^{15}$ Ω·cm or less.

14. The electrophotographic electro-conductive member according to claim 1, wherein the surface layer contains a roughening particle having a number-average particle diameter of 3 μm or more and 30 μm or less, and has a protrusion derived from the roughening particle on a surface thereof.

15. A process cartridge, which is removably mounted to a main body of an electrophotographic image forming apparatus, the process cartridge comprising an electrophotographic electro-conductive member the electrophotographic electro-conductive member comprising:

a support having an electro-conductive outer surface;

an electro-conductive layer on the outer surface of the support; and a surface layer on an outer surface of the electro-conductive layer, the electro-conductive layer having a matrix containing a crosslinked product of a first rubber and a plurality of domains dispersed in the matrix, the domains each comprising a crosslinked product of a second rubber and an electron conductive agent, wherein when a platinum electrode is directly provided on an outer surface of the electro-conductive layer, and impedance is measured under an environment of a temperature of 23° C. and a relative humidity of 50% by applying an alternating voltage having an amplitude of 1 V between the electro-conductive outer surface of the support and the platinum electrode while changing a frequency thereof between $1.0 \times 10^{-2}$ Hz and $1.0 \times 10^7$ Hz, in a double logarithmic plot with a frequency on an abscissa and an impedance on an ordinate, a slope at frequencies of $1.0 \times 10^6$ Hz to $1.0 \times 10^7$ Hz is –0.8 or more and –0.3 or less, and an impedance at a frequency of $1.0 \times 10^{-2}$ Hz to $1.0 \times 10^1$ Hz is $1.0 \times 10^4 \Omega$ to $1.0 \times 10^{11} \Omega$, and when a platinum electrode is directly provided on an outer surface of the electrophotographic electro-conductive member, and impedance is measured under the environment having a temperature of 23° C. and a relative humidity of 50% by applying an alternating voltage having an amplitude of 1 V between the electro-conductive outer surface of the support and the platinum electrode while changing a frequency thereof between $1.0 \times 10^{-2}$ Hz and $1.0 \times 10^7$ Hz, an impedance at a frequency of $1.0 \times 10^{-2}$ Hz to $1.0 \times 10^1$ Hz is $1.0 \times 10^5 \Omega$ to $1.0 \times 10^{11} \Omega$.

16. An electrophotographic image forming apparatus comprising an electrophotographic electro-conductive member, the electrophotographic electro-conductive member comprising:

a support having an electro-conductive outer surface;

an electro-conductive layer on the outer surface of the support; and a surface layer on an outer surface of the electro-conductive layer, the electro-conductive layer having a matrix containing a crosslinked product of a first rubber and a plurality of domains dispersed in the matrix, the domains each comprising a crosslinked product of a second rubber and an electron conductive agent, wherein when a platinum electrode is directly provided on an outer surface of the electro-conductive layer, and impedance is measured under an environment of a temperature of 23° C. and a relative humidity of 50% by applying an alternating voltage having an amplitude of 1 V between the electro-conductive outer surface of the support and the platinum electrode while changing a frequency thereof between $1.0 \times 10^{-2}$ Hz and $1.0 \times 10^{7}$ Hz, in a double logarithmic plot with a frequency on an abscissa and an impedance on an ordinate, a slope at frequencies of $1.0 \times 10^{6}$ Hz to $1.0 \times 10^{7}$ Hz is −0.8 or more and −0.3 or less, and an impedance at a frequency of $1.0 \times 10^{-2}$ Hz to $1.0 \times 10^{1}$ Hz is $1.0 \times 10^{4} \Omega$ to $1.0 \times 10^{11} \Omega$, and when a platinum electrode is directly provided on an outer surface of the electrophotographic electro-conductive member, and impedance is measured under the environment having a temperature of 23° C. and a relative humidity of 50% by applying an alternating voltage having an amplitude of 1 V between the electro-conductive outer surface of the support and the platinum electrode while changing a frequency thereof between $1.0 \times 10^{-2}$ Hz and $1.0 \times 10^{7}$ Hz, an impedance at a frequency of $1.0 \times 10^{-2}$ Hz to $1.0 \times 10^{1}$ Hz is $1.0 \times 10^{5} \Omega$ to $1.0 \times 10^{11} \Omega$.

\* \* \* \* \*